(12) United States Patent
Oswald et al.

(10) Patent No.: US 7,750,841 B2
(45) Date of Patent: Jul. 6, 2010

(54) DETERMINING POSITIONAL INFORMATION

(75) Inventors: Gordon Kenneth Andrew Oswald, Huntingdon (GB); Alexandra Joanna Geoghegan, Cambridge (GB); Charles Peter Bell, Cambridge (GB); Nicholas Simon Russ, Paris (FR); Mario Del Mistro, Cottenham (GB); Michael Hugh Burchett, Cambridge (GB); Desmond Keith Phillips, Impington (GB); Vincent Arne Utsi, Cambridge (GB)

(73) Assignee: Cambridge Consultants Limited, Cambridge (GB)

( * ) Notice: Subject to any disclaimer, the term of this patent is extended or adjusted under 35 U.S.C. 154(b) by 699 days.

(21) Appl. No.: 10/577,941

(22) PCT Filed: Nov. 3, 2004

(86) PCT No.: PCT/GB2004/004648

§ 371 (c)(1),
(2), (4) Date: Apr. 5, 2007

(87) PCT Pub. No.: WO2005/045455

PCT Pub. Date: May 19, 2005

(65) Prior Publication Data

US 2008/0204322 A1    Aug. 28, 2008

(30) Foreign Application Priority Data

Nov. 3, 2003    (GB) .................................. 0325622.9

(51) Int. Cl.
*G01S 13/42*    (2006.01)

(52) U.S. Cl. ...................... 342/147; 342/126; 342/133; 342/135; 342/139; 342/140; 342/145; 342/146

(58) Field of Classification Search ................ 342/118, 342/125–128, 133–135, 139, 140, 145–147
See application file for complete search history.

(56) References Cited

U.S. PATENT DOCUMENTS 4,034,376 A    7/1977    Barton ....................... 343/112

(Continued)

FOREIGN PATENT DOCUMENTS

DE         28 43 253         4/1980

(Continued)

OTHER PUBLICATIONS

International Search Report of PCT/GB2004/004648, mailed Jun. 6, 2005.

(Continued)

*Primary Examiner*—John B Sotomayor
(74) *Attorney, Agent, or Firm*—Nixon & Vanderhye, PC

(57) ABSTRACT

Apparatus for determining positional information relating to an object, comprising: means for receiving, comprising a plurality of receiving elements; detection means for detecting signals received at the receiving elements and for generating output signals representative of the received signals; and processing means operable to apply, for each receiving element, a process to the output signal generated from the signal received at that receiving element separately from any output signal generated from a signal received at any other receiving element, so as to obtain a respective value of a parameter representative of the signal received at that receiving element, the processing means being further operable to compare the values of the parameter thus obtained so as to, obtain positional information relating to the object.

38 Claims, 21 Drawing Sheets

U.S. PATENT DOCUMENTS

| | | | | |
|---|---|---|---|---|
| 4,128,759 | A | 12/1978 | Hunt et al. | 250/199 |
| 4,236,159 | A | 11/1980 | Alpers | 343/113 |
| 5,327,144 | A * | 7/1994 | Stilp et al. | 342/387 |
| 5,361,072 | A | 11/1994 | Barrick et al. | 342/133 |
| 5,444,451 | A | 8/1995 | Johnson et al. | 342/453 |
| 5,742,252 | A | 4/1998 | Nguyen et al. | 342/156 |
| 6,037,894 | A | 3/2000 | Pfizenmaier et al. | 342/70 |
| 6,275,705 | B1 * | 8/2001 | Drane et al. | 455/456.2 |
| 6,351,235 | B1 * | 2/2002 | Stilp | 342/357.06 |
| 6,414,633 | B1 | 7/2002 | Delalat | 342/442 |
| 6,556,942 | B1 | 4/2003 | Smith | 702/150 |
| 7,050,817 | B2 * | 5/2006 | Olaker | 455/456.1 |
| 7,212,563 | B2 * | 5/2007 | Boyd et al | 375/130 |
| 7,499,711 | B2 * | 3/2009 | Hoctor et al. | 455/456.1 |
| 2003/0058971 | A1 | 3/2003 | Langford et al. | 375/343 |
| 2003/0069025 | A1 * | 4/2003 | Hoctor et al. | 455/456 |
| 2003/0197643 | A1 * | 10/2003 | Fullerton et al. | 342/387 |
| 2004/0002347 | A1 * | 1/2004 | Hoctor et al. | 455/456.1 |
| 2007/0032250 | A1 * | 2/2007 | Feher | 455/456.2 |
| 2008/0204322 | A1 * | 8/2008 | Oswald et al. | 342/465 |

FOREIGN PATENT DOCUMENTS

| | | |
|---|---|---|
| FR | 2 785 394 | 11/1998 |
| GB | 2 261 788 | 5/1993 |
| GB | 2 326 299 | 12/1998 |
| GB | 2 332 112 | 6/1999 |
| GB | 2 346 753 | 8/2000 |
| GB | 2 383 708 | 7/2003 |
| JP | 61-139770 | 6/1986 |
| WO | 99/63359 | 12/1999 |
| WO | 02/101408 | 12/2002 |

OTHER PUBLICATIONS

Fontana et al., "Ultra-wideband precision asset location system", 2002 IEEE Conference on Ultra Wideband Systems and Technologies, Mar. 21, 2002, pp. 147-150, XP002319287.

Fontana et al., "Commercialization of an ultra wideband precision asset location system", Ultra Wideband Systems and Technologies, 2001 IEEE Conference on Nov. 16-29, 2003, Nov. 16, 2003, pp. 369-373, XP010683859.

Robert J. Fontana et al. "Ultra-Wideband Precision Asset Location System" IEEE Conference on Ultra-Wideband Systems and Technologies, Mar. 21, 2002; pp. 147-150.

Robert J. Fontana et al. "Commercialization of an Ultra Wideband Precision Asset Location System" IEEE Nov. 16, 2003; pp. 369-373.

* cited by examiner

DETERMINING POSITIONAL INFORMATION

This application is the US national phase of international application PCT/GB2004/004648, filed 3 Nov. 2004, which designated the U.S. and claims priority of GB 0325622.9, filed 3 Nov. 2003, the entire contents of each of which are hereby incorporated by reference.

BACKGROUND AND SUMMARY

The invention relates to apparatus for determining positional information relating to an object incorporating a transmitter, apparatus for searching a detection volume for radiating objects, a system for locating an object, and in particular to an object incorporating a transmitter for use with an object in an object positioning system, a method of determining positional information, a computer readable medium, a computer program product, and a signal.

The invention finds particular application in the fields of object tracking systems, intrusion detector systems, inventory control, vehicle collision detection and security and workforce tracking systems.

A known prior art system for tracking 'active' transmitter tags is disclosed in the article entitled "Ultra-wideband precision asset location system" (IEEE Conference on Ultra Wideband Systems and Technologies, May 2002). In this system, several receiving antennas placed in widely spaced-apart locations at corners of a cargo space inside a ship are used to detect ultra-wideband signals emitted by transmitter tags attached to cargo objects within the cargo space. Arc-fitting techniques, relying on synchronisation of the receiving antennas with a central computer and using knowledge of the arrival times of the identification pulses at each antenna, establish the position of the object in three dimensions.

Problems arise in the prior art system if the direct signal from the object to one of the receivers is weak compared to a delayed reflection of the signal, for example where there is an obstruction between the object and the receiver. In this case, the delayed signal reflection may be incorrectly identified as the pulse arrival time, which in turn can cause the position estimation procedure to fail dramatically. Furthermore, whilst each prior art receiver unit is relatively simple, the need to precisely synchronise each receiver and the computer can require accurate and expensive timing circuitry. Additionally, the reliance on arc-fitting techniques can limit the accuracy of the system and can also introduce ambiguities.

In order to overcome problems identified in the prior art, there is provided apparatus for determining positional information relating to an object incorporating a transmitter, the apparatus comprising means for receiving a signal transmitted by the transmitter at the object; and detecting means, coupled to the receiving means, for producing an output from which the angular position of the object can be determined.

In a closely related aspect, there is provided apparatus for determining positional information relating to an object incorporating a transmitter, the apparatus comprising:
means for receiving a signal pulse transmitted by the incorporated transmitter, said means for receiving being arranged in a single housing or on a common substrate, and said signal pulse preferably being an ultra-wide band signal pulse; and
detecting means, coupled to the receiving means, for producing an output from which the angular position of the object can be determined;
wherein the means for receiving comprises a plurality of receiving elements, and the detecting means is adapted to detect the relative timing of the signal pulse as received at the plurality of receiving elements, whereby the angular position can be determined.

In either event, preferably, the receiving means is adapted to receive a pulse train having a characteristic pulse frequency, and the detecting means is adapted to output a signal representative of the received pulse train.

By producing an output to allow the angular position, rather than the range, of the object to be determined, the position of the object can be determined with greater accuracy.

The apparatus may transmit UWB pulses asynchronously (that is, not under duplex control). Range may be short, typically less than 50 meters, typically less than 10 meters. Accuracy may be less than 15 cm. Multiple tags can preferably be handled simultaneously. Separate base stations can be employed to determine accurate position.

The present apparatus may have broad coverage and may determine delay to find angular position (or angle of arrival) in 3D not 2D, in a time domain process, but not using array data processing or beamforming. Each receiver may determine angular position individually. There is no need to exploit multipath to improve performance. The apparatus may be fixed permanently or semi-permanently. The apparatus may employ two antennas (not necessarily half wavelength spaced apart), and multiple base stations to determine location.

The apparatus is preferably a receiving unit, or sensor, provided within a positioning system, such as an inventory control system which tracks active transmitter tags attached to items of inventory. Preferably the means for receiving the signal is adapted to receive signals having a typically different dynamic range than signals received in passive systems; in an active system, the signal strength varies as $1/D^2$ (where D is the distance to the object being tracked), compared to $1/D^4$ in a passive system. Preferably the receiving means has a dynamic range of greater than 15 dB, preferably greater than 20 dB, 25 dB, 27 dB or 30 dB. Preferably also the means for receiving the signal and/or the detecting means are adapted to receive and/or detect a wider range of signal shapes and/or frequencies than are typically received in passive systems, since again the generation of signal shape and/or frequency is outside the direct control of the apparatus, and will likely be more varied.

Preferably the receiving means is adapted to receive an ultra-wide band (UWB) pulse, preferably a pulse spanning a frequency range between 0.5 GHz and 24 GHz, preferably between 2 GHz and 12 GHz, and more preferably between 5.8 GHz and 7.2 GHz. This frequency range is convenient as it imparts the necessary radar characteristics whilst falling within limits specified by radio regulations. The pulse preferably is of the form of a shaped sinusoid, having a strong frequency peak at the sinusoid frequency and substantial side lobes due to the pulse shaping. Nevertheless, other frequency ranges (and consequently other pulse shapes) are possible.

As used herein (throughout), the term ultra-wide band (UWB) preferably connotes a broadband system, preferably a frequency range between 0.5 and 79 or 81 GHz. More particularly, preferred frequency ranges are: 3.1 to 10.6 GHz, 5.46 to 7.25 GHz, 5.725 to 5.875 GHz, 22 to 29 GHz, 76.5 to 77.5 GHz, and 77 to 81 Ghz variation. Whilst these ranges may be exact, they may be subject to plus or minus 1, 2 or 5 GHz. For a UWB pulse as used herein, the ratio of the bandwidth to the centre frequency is preferably greater than 10, 15, 20, 25, 30, 50, 75 or even 100%, or the bandwidth is preferably at least 100, 250, 500 or even 1,000 MHz. The pulse would typically include less than 1,000, 500, 200, 100, 50, 25, 10, 5, 2 or 1 individual cycles of radio-frequency.

Preferably the apparatus further comprises means for triggering the detecting means, wherein the triggering means is independent of the generation of the transmitted signal. The triggering means may be a timebase control unit, for example, or a simple clock (such as a crystal oscillator), and may be physically located within the detecting means or other component of the system. Preferably the triggering means is independent of the generation of the transmitted signal such that there is no defined phase relationship (such as a constantly varying phase or simply constant phase offset) between the transmitted signal and the triggering means, and/or such that the triggering means and the transmitted signal are driven by different clock sources. The term 'triggering' as used herein preferably connotes applying a stimulus (such as a pulse) to an object so as to cause the object to change state. The provision of such a triggering means can simplify and unify the control of the receivers.

The apparatus preferably also comprises means for receiving triggering control signals, wherein the triggering means is adapted to trigger the detecting means in dependence on the received triggering control signals. The means for receiving triggering control signals is preferably a communications control unit allowing external agents, such as a control mechanism, to specify parameters of the triggering. By triggering the detecting means in dependence on the received triggering control signals, the apparatus can more easily be locked on to active objects.

The triggering means is preferably adapted to trigger the detecting means at a frequency determined by the control signals. This can allow an external agent (for example) flexibility in controlling the apparatus, so as to allow it to lock onto a large range of possible signals. In particular, this gives the system greater flexibility with respect to conventional passive detection systems, which are typically confined to one detection frequency.

If the transmitted signal has a characteristic repetition frequency, the triggering means may be adapted to trigger the detecting means at a triggering frequency different to the characteristic repetition frequency. Triggering the detecting means with a frequency different to the characteristic repetition frequency of the received signal can have the effect of creating a moving 'range gate', which can avoid the need to match the phase of the receiver clock with the phase of a transmitter clock. Preferably the triggering frequency $F_{trig}$ is determined by $(F_{cr}/n)+F_{diff}$, where $F_{cr}$ is the characteristic repetition frequency, n is an integer frequency divider ratio, and $F_{diff}$ is a scan rate.

The value of n may be greater than 1, and preferably greater than 2, 3, 4 or 5. By having an integer frequency divider ratio of greater than 1, the detection means can operate at a lower frequency than the characteristic repetition frequency but without significant loss of information or accuracy (particularly at lower values of n). Also, $F_{diff}$ may be non-zero, and preferably less than 5%, 2% or 1% of the magnitude of $F_{cr}$, and more preferably less than 0.5% of the magnitude of $F_{cr}$.

Preferably the means for receiving comprises a plurality of receiving elements, and the detecting means is adapted to detect the relative timing of the signal as received at the plurality of locations, whereby the angular position can be determined. Further preferably, the plurality of receiving elements are provided at spaced-apart locations in a sensor array, but preferably the spacing between the receiving elements is small compared to the spacing between the apparatus and further like apparatuses. For example, the distance between receiving elements is preferably less than 5%, 1%, 0.5% or 0.1% of the distance between like apparatuses in a typical positioning system. This can provide a convenient and simple way to detect the angular position of the object, although other implementations, such as a single swept directional receiver, are possible.

Preferably the plurality of receiving elements is adapted to yield positional information in azimuth and elevation.

The plurality of receiving elements is preferably in the form of an electromagnetic antenna array, preferably including three (or more) receiving elements arranged non-collinearly. For example the receiving elements may be arranged substantially at the vertices of a right-angled triangular locus (that is, in an L-shaped pattern). Entirely collinear arrangements are also possible.

The receiving elements may be spaced apart by a distance that is the same order of magnitude as the wavelength $\lambda$ of the radiation that it is intended to receive. For example, the receiving elements may be spaced apart by a distance $m\lambda$ where m is less than 10, and preferably less than 8, 5, 3 or 2, and m may be greater than 0.1, and preferably greater than 0.2, 0.3, or 0.5.

The efficiency with which the elements can radiate or detect radiation decreases as the size of the elements decreases, since the radiation impedance of the elements may decrease with size, and thus the elements themselves should not be too small. On the other hand, the elements should not be too large, because they may become physically too big for the array, and because grating lobe effects may occur at larger spacings between the elements. In general, the size of the elements is preferably less than $10\lambda$ or $4\lambda$ and greater than about $\lambda/4$. In preferred embodiments, the size is in the region of $\lambda/4$ or $\lambda/2$, although other values may be used. In one particular example, the elements have a size of about 1.5 cm with a wavelength of about 5 cm. A combination of large element size and small element spacing can be achieved by vertically stacking and horizontally overlapping the elements.

More advantageously, an electromagnetic antenna array according to the present aspect may include four receiving elements arranged non-collinearly. For example, the receiving elements may be arranged substantially at the vertices of a quadrilateral locus, more specifically, a trapezoidal or rectangular locus, in which the quadrilateral has long and short parallel sides.

In accordance with this (or any) aspect the electromagnetic antenna array may include at least three receiving elements arranged non-collinearly such that there is less than two (and preferably less than one) axis of symmetry.

In embodiments where the locus is a trapezium (that is, a quadrilateral having only two sides parallel), this arrangement can ensure that two unequally-spaced pairs of antennas in parallel planes can be selected, with dissimilar artefacts (for example, grating lobes) in their sensitivity patterns. Advantageously, the short side may be between 0.5 and 1 times (or approximately three-quarters of) the length of the long side. As a specific example, where the trapezial locus has long and short parallel sides, the length of the shorter side may be approximately the wavelength $\lambda$ of the radiation that the array is intended to transmit and receive, and the length of the longer side may be approximately $3\lambda/2$. By suitable processing of signals from such an array, the effect of grating lobes can be substantially reduced.

Alternatively, the quadrilateral may have two opposing angles which are substantially right angles, while the other two angles are not right angles. This arrangement can ensure that the main grating lobe for each will point in the correct 3-D direction, while the artefacts will be different, and thus will cancel out.

The plurality of receiving elements are preferably arranged in a substantially planar configuration, whereby the geometry of the receiving elements can allow a more straightforward calculation of angular positions in dependence on signals received at the receiving elements. It is also possible to have one or more receiving elements arranged out of a plane in which the others are arranged, but the angular computations can become more complicated and potentially more ambiguous. In particular, conformal arrangements, with the elements arranged on and conforming with a non-planar surface, are also possible.

The means for receiving may be arranged in a single housing or on a common substrate. Preferably the total physical extent of the means for receiving is less than 10%, 5%, 1% or 0.5% of the maximum detection range of the apparatus, but larger physical extents are possible. The 'means for receiving' preferably refers to the receiving means in a single apparatus, such as a plurality of receiving elements as aforesaid. By providing the means for receiving (and indeed preferably the apparatus itself) in a single housing or on a common substrate, construction of the apparatus can be made cheaper and simpler. Two or more receiving units may be provided, at separate locations (say on a vehicle) and these can assist in providing greater accuracy and sensitivity.

Preferably the apparatus further comprises a communications interface for communicating with a processing means. The communication means may be a conventional communications port, utilising connections including, but not limited to, RS232, Bluetooth, ethernet and radio-frequency links. Alternatively, the communication means may be a simple electric connection, for example if the processing means is provided in the same housing as the detecting means. This can facilitate the passing to the processing means of the data representative of the signal received at the apparatus.

The communications interface may be adapted to output a plurality of signals representative of signals received at the apparatus. The communications interface may also be adapted to output the plurality of signals in separate channels (physical or otherwise), or in an analogue or digital multiplexed signal. By outputting a plurality of signals representative of signals received at the apparatus, the processing means can be provided with the maximum amount of information to assist it to determine the displacement of the object.

Preferably the communicating means is adapted to receive control signals from the processing means. This can allow the apparatus to be more easily controlled by the processing means.

Preferably the apparatus further comprises processing means for processing the output of the detection means to determine positional information relating to the object. Furthermore, the processing means may be adapted to process the output of the detection means in conjunction with a further angular position so as to determine the displacement of the transmitter associated with the object.

This feature is also provided independently. Accordingly, in a related aspect of the invention there is provided apparatus for determining positional information relating to an object incorporating a transmitter, the apparatus comprising input means for receiving from a detection means an output from which the angular position of the transmitter associated with the object can be determined; and processing means for processing the output of the detection means in conjunction with a further angular position so as to determine the displacement of the transmitter associated with the object.

Preferably the further angular position is the angular position of the object as determined with respect to a location substantially remote from the apparatus, such as a location at which a like apparatus is provided, for example. The displacement is preferably an absolute displacement in two or three Cartesian dimensions, but may alternatively be a displacement relative to the location of the apparatus or other object. The term 'displacement' as used herein preferably connotes a Cartesian vector quantity (or equivalent thereof) representing the position of an object with respect to a (preferably fixed) datum. The term may in a strict sense cover a relative movement of an object over the course of a period of time, but preferably also covers a substantially instantaneous and independent positional measurement. Preferably 'displacement' covers positional information which is more detailed than a single angular measurement, and more preferably is distinct from a plurality of angular measurements.

The processing means is preferably adapted to process the output from the detection means to determine the angular position of the object. Preferably the angular position is calculated as a function of the differential timings of signals received at a plurality of locations in the means for receiving.

More preferably the processing means is adapted to compute timing differentials between a plurality of signals received from the detection means, and to determine the angular position in dependence on the timing differentials between at least two of the plurality of signals. Thus the angular position can be determined with reference only to the signal as received, rather than necessarily needing to consider other information.

Alternatively, or additionally, the processing means may be adapted to process the output from the detection means to determine the pseudorange of the object. The term "pseudorange" as used herein preferably connotes the length of the shortest measured path to a target, often computed with reference to the time taken for a round-trip to the target and back (this time being proportional to the distance traveled). Due to effects such as path reflections and so on, the pseudorange is not necessarily equal to the shortest distance to the target. Preferably the term "pseudorange" further encompasses a measurement of range derived from a timing signal which incorporates an unknown time offset, which offset preferably arises from an asynchronous relationship between a transmitter and receiver involved in the measurement of the signal.

Preferably the pseudorange is calculated as a function of the signal amplitude received by the means for receiving. Typically, due to multi-path effects, target occlusion and so on, the calculation of pseudoranges can be less accurate than the calculation of angular position, but for many applications the level of accuracy is acceptable.

Advantageously, by combining the features of determining the angular position and determining the pseudorange of the object, a functional active object tracking system can be constructed using only one sensor installation, whereas prior art systems can require a minimum of two (or even three) sensor installations in order to function unambiguously.

The processing means may be adapted to process the output from the detection means to determine the amplitude of a received signal, and to determine the pseudorange in dependence on the amplitude. This can provide a relatively quick and easy, although not necessarily highly accurate, determination of the pseudorange.

Preferably the apparatus further comprises means for outputting a signal representative of the displacement of the object. Preferably the outputted signal comprises two-dimensional or three-dimensional cartesian coordinates, but alternatively the outputted signal may comprise a distance measurement, or may alternatively comprise polar or intrinsic coordinates which can readily be converted into two- or three-dimensional Cartesian coordinates.

If the received signal comprises a pulse train having a characteristic pulse frequency, the detecting means is preferably adapted to output a signal representative of the received pulse train. Preferably the pulse frequency can vary within a predetermined tolerance limit. By outputting a signal representative of the received pulse train, rather than, say, a measurement derived from, but not representative of, the pulse train (such as an output from a peak detector, for example), more information can be made available to later processing stages, and thus the accuracy of the system can be improved.

The detecting means may be adapted to output a signal representative of the waveform of the received pulses. This can provide substantially all the information which may be required by later stages in order to effect the most accurate processing of the signal.

The characteristic pulse frequency may be between 2 MHz and 20 MHz, preferably between 5 MHz and 15 MHz, and more preferably between 10.5 MHz and 13.5 MHz. In one embodiment, a characteristic pulse frequency of between approximately 9 MHz and 12 MHz is chosen. Preferably the characteristic pulse frequency may vary in use, thereby allowing flexibility in the detection of the relevant signal.

The detecting means preferably comprises means for sampling the received pulse train and producing an output having a characteristic sampling frequency related to the characteristic pulse frequency. By sampling the received pulse train, the necessary complex processing can be carried out in the digital domain, rather than in the computationally-limited analogue domain.

The sampling means preferably comprises a downsampler, such that the output sampling frequency is lower than the characteristic pulse frequency. By producing an output sampling frequency lower than the characteristic pulse frequency, conventional circuitry can be employed in later stages, avoiding the expensive and complication of high-speed circuits.

The output sampling frequency may be between 5 kHz and 100 kHz, preferably between 25 kHz and 90 kHz, and more preferably between 60 kHz and 85 kHz. The output sampling frequency may be in the audio frequency range (although preferably not limited to frequencies which are readily audible to humans). Preferably a frequency of 80 kHz is chosen. Such a range of output sampling frequencies is considerably easier to process using conventional circuitry than radio-frequency signals.

The apparatus preferably further comprises an input sampling clock operating at substantially a given multiple of the characteristic pulse frequency, an output sampling clock operating at the output sampling frequency, and the sampling means is preferably adapted to sample the signal on receipt of the input sampling clock signal and produce a sample output on receipt of the output sampling clock signal. This can provide a simple and effective basis for downsampling the signal.

The given multiple of the characteristic pulse frequency may be an integer multiple (such as 1, 2, 3, and so on), or preferably an integer fraction (such as ½, ⅓, ¼, and so on), or possibly any other non-integer multiple. Preferably a multiple of 0.25 is used. It will be understood that the sampling clock frequency will typically be a multiple of the characteristic frequency, except that there can be a frequency offset/deviation which will vary from system to system.

The sampling means is preferably adapted to produce the sample output as an average of the input samples taken since the previous output sampling clock signal. Preferably a sample-and-hold unit is provided in order to produce the average of the input samples, and preferably the average is a mean average, although it may also be a median or mode average. Thus signals coinciding with the input sampling clock frequency are reinforced, and other (noise) frequencies tend to cancel out, thereby potentially increasing the signal-to-noise ratio of the system. Preferably between 10 and 60 input samples, more preferably between 20 and 50 input samples, and more preferably still between 30 and 40 input samples are taken are used to produce each output sample.

Preferably the sampling means is adapted to advance the phase of the input sampling clock by a predetermined amount after the sample output is produced. This feature can create a time-stretching effect, whereby the output samples are a time-stretched representation of the input signal waveform. This can also allow a range of time/space to be scanned sequentially. Preferably the predetermined phase shift is substantially smaller than the input sampling clock frequency, and preferably less than 20%, 10%, 5% or 1% of the input sampling clock frequency.

The receiving means may be adapted to receive at least one signal further to the signal transmitted at the object, and further comprise means for discriminating between the signal transmitted at the object and the or each further signal. Preferably the means for discriminating is adapted to discriminate between the signal and more than 1, 2, 5, 10, 20 or 50 further signals.

This feature is also provided independently. Accordingly, in a further aspect of the invention there is provided apparatus for determining positional information relating to an object incorporating a transmitter, the apparatus comprising means for receiving a plurality of signals transmitted by a plurality of transmitters including the transmitter associated with the object; means for discriminating between the signal transmitted at the object and any further received signals, in dependence on identification information received by the discriminating means; and means for determining the angular position of the object in dependence on the discriminated signal, whereby the positional information relating to the object can be determined. The discriminating means is preferably adapted to discriminate in respect of the signal in dependence on a characteristic property of the signal.

The invention provides in a closely related aspect apparatus for determining positional information relating to an object incorporating a transmitter, the apparatus comprising: means for receiving a plurality of signals, each signal being transmitted by a respective one of a plurality of transmitters and said plurality of transmitters including the incorporated transmitter; and means for discriminating between a received signal transmitted by the incorporated transmitter and any further received signals, in dependence upon a pulse repetition frequency of the signal transmitted by the incorporated transmitter, said received signal transmitted by the incorporated transmitter preferably comprising at least one ultra-wide band pulse.

Preferably, the signal transmitted by the incorporated transmitter is time-division multiplexed.

Preferably, the discriminating means comprises a detection clock operable to drive the detection of the signal transmitted by the incorporated transmitter, and means for setting the detection clock in dependence on a selected signal frequency, whereby signals having the selected signal frequency are preferentially detected by the apparatus.

The system may be a short pulse/impulse system that allows multiple asynchronous transmissions of very short pulses, preferably via pulse repetition frequency channelisation. The pulse repetition frequency may be between 1 and 10 MHz, preferably before 2 and 6 MHz, preferably roughly 3 MHz, with a pulse duration of typically less than ins. The system may have an ability to locate an object/tag/target on a minimum of three baseband detections.

The characteristic property may be a pulse repetition frequency of the signal. The pulse repetition frequency is preferably the characteristic frequency. Preferably a range of pulse repetition frequencies (PRFs) is used, having a relative frequency offset which may be, for example, n×250 kHz at a 6 GHz carrier frequency, where n is an integer greater than or equal to 1. This can allow up to 12 different objects to occupy the same detection space. Narrower frequency bins can be provided, increasing the number of objects which can be discriminated between, provided sufficiently high signal-to-noise ratio can be achieved, and vice versa.

The characteristic property may be a pulse position modulation characteristic. Preferably the modulation involves 'jittering' the pulses, in a form of binary phase shift keying (BPSK) or any other suitable modulation technique.

Alternatively, or additionally, the signal may be time-division multiplexed. Preferably conventional TDMA algorithms, standards and chipsets are used. FDMA and CDMA standards and chipsets may also be used. Advantageously, the use of modulation techniques and frequency shifts may be combined to create a large range of unique, identifiable object 'signatures'.

Preferably the discriminating means comprises a detection clock operable to drive the detection of the signal, and means for setting the detection clock in dependence on a selected signal frequency, whereby signals having the selected signal frequency are preferentially detected by the apparatus. Preferably the detection clock is an input sampling clock as aforesaid.

The apparatus may further comprise means for detecting a frequency error between the selected signal frequency and the received signal, and means for compensating for the frequency error. Preferably the means for detecting a frequency error is a frequency estimation routine. This can help to mitigate the effects of short-term frequency variations.

The means for detecting a frequency error is preferably adapted to estimate the signal frequency in dependence on the interval between successive peaks in the received signal corresponding to the peaks of successive pulses, and to compare the estimated signal frequency with the detection frequency. This can provide a relatively easy way to determine a frequency error between the detection and signal frequencies, and can be used, for example, for coarse tuning of the apparatus.

The means for detecting a frequency error may be adapted to compute an estimated signal frequency in dependence on the phase difference of consecutive samples, and to compare the estimated signal frequency with the detection frequency. By considering the phase differences of consecutive samples (for example by averaging the phase differences), a more precise estimation of the frequency error can be produced. This can be appropriate for fine-tuning the apparatus, preferably in conjunction with the peak-detecting feature.

Preferably the means for compensating for the frequency error is adapted to create a matched filter prototype representing an expected signal shape as effected by the estimated frequency error. The matched filter prototype is preferably suitable for use with a comparative method of identifying certain signal waveforms in the received signal, as mentioned later. This can avoid the need to alter the detection frequency to match the selected signal frequency if the two differ, which can in turn simplify the sampling circuitry.

Preferably the processing means comprises means for determining the interval between the reception of the signal at a plurality of receiving elements, thereby allowing the angular position of the object to be determined. Preferably the receiving elements are as aforesaid and/or provided in the apparatus. The interval may represent a temporal or spatial difference, but preferably represents a data offset with respect to sampled data representing the signals as received at the receiving elements, the data offset being linked to the corresponding temporal difference by the relevant sampling rate.

The processing is preferably carried out in the time rather than frequency domain.

In one embodiment, the means for determining the interval is operative to cross-correlate the signals received at least one pair of receiving elements, and to determine the interval in dependence on the cross-correlation results. Preferably the cross-correlation method is a truncated cross-correlation process, whereby, for example, knowledge of the maximum signal delay between receiving elements is used to limit the range of the cross-correlation computation. Truncated cross-correlation is taught in WO 01/59473.

In a further embodiment (which may be combined with the previous embodiment), the means for determining the interval is operative to apply a matched filter to the signals received at the plurality of receiving elements, and to determine the time difference in dependence on the output of the matched filter. Preferably the matched filter is programmed with a matched filter prototype, the matched filter prototype preferably corresponding to at least a portion of the generated pulse waveform and preferably being used to set the filter coefficients such that the closer the filter inputs match the filter prototype, the larger is the filter output.

The surprising discovery was made that, whilst theoretically not appropriate in the context of broadband signals (such as those typically emitted by active tracking devices), matched filters nevertheless achieved useful performance levels. This important feature is also provided independently.

Accordingly, in a related aspect of the invention there is provided apparatus for determining positional information relating to an object, comprising means for receiving, comprising a plurality of receiving elements; detection means for detecting signals received at the receiving elements and for generating output signals representative of the received signals; and processing means operable by application of a matched filter to detect the interval between signals received by a plurality of the receiving elements, whereby to determine an angular position of the object.

In a closely related aspect, there is provided apparatus for determining positional information relating to an object, comprising: means for receiving signals, said receiving means comprising a plurality of receiving elements; and processing means comprising a matched filter, operable to detect an interval between a signal received by one of the receiving elements and the or a signal received by at least one other of the receiving elements, whereby to determine an angular position of the object.

According to another closely related aspect, there is provided apparatus for determining positional information relating to an object, comprising:—means for receiving, comprising a plurality of receiving elements; detection means for detecting signals received at the receiving elements and for generating output signals representative of the received signals; and processing means operable to apply, for each receiving element, a process to the output signal generated from the signal received at that receiving element separately from any output signal generated from a signal received at any other receiving element, so as to obtain a respective value of a parameter representative of the signal received at that receiving element, the processing means being further operable to compare the values of the parameter thus obtained so as to obtain positional information relating to the object.

In any of these aspects, the apparatus may be able to determine angular position using matched filtering in the digital domain, rather than for example using delay lines.

Preferably, the parameter is one of phase and time (thus either phase or time or both).

Preferably, the process to be applied by the processing means is dependent upon a characteristic, or an expected characteristic, of the signals. Preferably, the characteristic, or expected characteristic, is at least one of frequency, phase, bandwidth, and pulse width.

Preferably, the process to be applied by the processing means is dependent upon a characteristic, or expected characteristic, of the object, and preferably is dependent upon the distance, or the expected distance, of the object from the receiving means.

Preferably, the apparatus further comprises a selecting means adapted to select the process to be applied by the processing means from a plurality of possible processes. The process may filtering which may for example be adapted so as to be optimal for the frequency range of the signal itself.

Preferably, the apparatus comprises means for storing a plurality of sets of process data; and the selecting means is adapted to select one set of process data from the plurality of sets of process data, thereby to select the process to be applied by the processing means.

Preferably, the apparatus further comprises a means for changing the process to be applied by the processing means in dependence upon at least one previously obtained value of the parameter and/or in dependence upon previously obtained positional information relating to the object.

Preferably, the process comprises a matched filter. A matched filter is preferably defined in terms of a waveform which has a characteristic which is the inverse response of the pulse to be filtered, and which complex multiplies to yield a delta function. The matched filter is preferably synthesised electronically.

Preferably, the process comprises applying a filter to the output signal at a plurality of different time offsets and selecting a time offset in dependence upon the outputs from the filter.

Preferably, the operation of the processing means comprises application of a matched filter to detect the interval between signals received by a plurality of the receiving elements, whereby to determine an angular position of the object.

Preferably, the apparatus further comprises means for generating the matched filter in dependence upon the shape of the at least one time varying signal, and preferably in dependence upon the shape of the envelope of the at least one time varying signal.

Preferably, the generating means is adapted to fit the shape of the at least one time varying signal, or the envelope of the at least one time varying signal to a function, preferably to a quadratic function.

Preferably, the receiving and detecting means are adapted to receive and detect a signal having a bandwidth greater than 5%, 10% or 20% of its frequency.

Preferably, each signal has a characteristic frequency of between 0.5 GHz and 24 GHz, preferably between 2 GHz and 12 GHz, and more preferably between 5.8 GHz and 7.2 GHz.

Preferably, the signals are pulsed signals.

Preferably, each pulsed signal comprises at least five cycles, and preferably comprising at least 10, 20, 50, 100 or 500 cycles.

Preferably, each pulsed signal has a pulse length of greater than 2 ns, preferably greater than at least one of 5 ns, 10 ns, 20 ns, and 50 ns.

Preferably, the signals comprise a pulse train having a characteristic repetition frequency of between 2 MHz and 20 MHz, possibly between 5 MHz and 15 MHz, and possibly between 10.5 MHz and 13.5 MHz.

Preferably, the positional information is an angular position of the object.

Preferably, the or each object includes or comprises an object incorporating a transmitter.

Preferably, the signals are signals transmitted by a transmitter associated with the object.

Preferably, the signals transmitted by the transmitter associated with the object are Ultra Wide Band (UWB) signals.

In any matched filter aspect (at least), preferably the receiving and detecting means are adapted to receive and detect a signal having a bandwidth greater than 5%, 10%, 20%, 30% or 40% of its frequency. Alternatively, the receiving and detecting means may be adapted to receive and detect a signal having a bandwidth less than 5% of its frequency. Preferably the matched filter is adapted to match a portion of a received pulse substantially smaller than the duration of the pulse, and the matched portion is substantially sinusoidal.

The apparatus may further comprise means for transmitting a probe signal towards the object, and the means for receiving is adapted to receive a reflection of the probe signal from the object.

This feature may be provided independently, in the form of apparatus for determining positional information relating to an object, comprising: means for receiving a signal pulse, said signal pulse preferably being an ultra-wide band signal pulse; detecting means, coupled to the receiving means, for producing an output from which the angular position of the object can be determined; and means for transmitting a probe signal towards the object; wherein said receiving means and said transmitting means are arranged in a single housing or on a common substrate, and said signal pulse is one of a reflection of the probe signal from the object and a signal transmitted by a transmitter associated with the object.

The means for transmitting a probe signal is preferably adapted to transmit a different signal to the signal transmitted by the transmitter associated with the object. Preferably, such a different signal is different in frequency, phase or other signal characteristic, such as the pulse waveform and associated frequency spectrum.

The apparatus may further comprise means for encoding the probe signal, whereby it can be distinguished from the signal received from the object. Preferably the means for encoding is as aforesaid in respect of the signal transmitted by the transmitter associated with the object.

The apparatus preferably further comprises means for determining the positional information of an object irradiated by the probe signal. This can provide increased awareness of the environment surrounding the apparatus. Preferably the positional information so determined is in one of the forms which the positional information as aforesaid relating to the object incorporating a transmitter is.

Preferably the detection of irradiated objects is operable simultaneously with the detection of radiating objects (that is, objects incorporating transmitters), but may alternatively be operable while the detection of radiating objects is disabled (at night, for example) and vice versa.

Preferably (in any aspect) the apparatus further comprises means for comparing the positional information of the irradiated object to positional information relating to at least one known object, whereby anomalous objects can be identified. Such anomalous objects may be intruders, lacking the necessary transmitting tags, for example. Preferably 'known objects' include any or all of objects detected by the apparatus, reference objects (such as structural features in the vicinity of the apparatus), either pre-programmed or deduced from prior measurements, and pre-programmed or measured detection zones which may or may not comprise further objects.

The apparatus preferably further comprises means for generating an alert signal in dependence on the result of the comparison. This can with minimal alteration provide an intrusion detection system to complement the object tracking system. Preferably the or each object includes the object incorporating a transmitter, and preferably the reference objects include a plurality of known objects and/or objects detected by the apparatus.

Accordingly, in a further aspect of the invention there is provided apparatus for searching a detection volume for an object transmitting a signal, comprising an array comprising a plurality of receiving elements; detecting means for detecting signals arriving at the receiving elements and for generating output signals representative of the received signals; and processing means for determining the interval between signals received at a plurality of the receiving elements, whereby the existence of the object and its angular position can be determined.

In a closely related aspect, there is provided apparatus for searching a detection volume for an object transmitting a signal, comprising: an array comprising a plurality of receiving elements; detecting means for detecting at least one signal from a given range gate arriving at the receiving elements and for generating an output signal representative of the at least one received signal; means for varying the range gate; and processing means for determining the interval between the at least one signal being received at one of the plurality of receiving elements and the at least one signal being received at the or each of the other of the plurality of receiving elements, whereby the existence of the object and its angular position can be determined regardless of whether transmission of the signal from the object is synchronised with the apparatus.

Accordingly, a system for searching in unlocked radar can be implemented.

Preferably the apparatus further comprises a receiver clock, coupled with the detecting means, which is not used to generate the transmitted signal.

Preferably the detecting means is operable to detect signals within a given range gate, and the apparatus further comprises means for varying the range gate, whereby objects which are not synchronised with the apparatus can be detected.

Preferably the objects not being synchronised with the apparatus implies that the objects and the apparatus are asynchronous. The term 'asynchronous' as used herein preferably connotes a lack of common timing or synchronisation, particularly in respect of an interaction between objects (such as the transmission of a pulse from one to the other) where the elements associated with the interaction (a transmitter and a receiver, for example) are not driven by the same timing signal. Preferably 'asynchronous' implies an arbitrary phase difference between such timing signals, but may also imply an arbitrary difference in frequency or (correspondingly) a time period.

The term "range gate" as used herein in the context of a passive radar system (that is, a system where the receiver transmits probe pulses) preferably connotes a region of space defined by the distance that would be traveled by a pulse after a certain range of time had elapsed. For example, prior art passive radar systems, which take receiver readings at a predetermined delay after transmission of a pulse, have fixed range gates located at, say, dc/2, (T+d)c/2, (2T+d)c/2, and so on, where c is the speed of light, d is the delay between the transmission of a pulse and the sampling of the received signal, and T is the delay between consecutive pulses (typically much larger than d).

In the context of an asynchronous signal, where the receiver and transmitter are 'unlocked' (that is, not synchronised), the term "range gate" preferably refers to the combination of space and phase offset of transmitter which would be detected by the receiver at a given offset from a receiver clock. Thus, for a given offset d at a pulse repetition period P (that is, the time elapsing between transmitted pulses), transmitters at a distance of n(P+d)c having a phase relative to the receiver of d/P×360° will theoretically fall within the range gate, where n is an integer and c is the speed of light. It is noted that essentially range gates are produced in the same fashion in both the synchronous and asynchronous gate, but that in the asynchronous case the range gate is a more abstract property.

It can be seen from the above that objects whose distance from the apparatus does not vary and objects whose phase relative to the receiver does not vary may both avoid detection if a fixed range gate is used. This important feature is also provided independently.

Preferably the apparatus further comprises means for calibrating the apparatus with a like apparatus (that is, preferably apparatus as aforesaid). This can improve the detection accuracy of the apparatus. This feature is also provided independently.

Accordingly, in a related aspect of the invention, there is provided apparatus for determining positional information relating to an object incorporating a transmitter, the apparatus comprising means for receiving a signal transmitted by the transmitter at the object; detecting means, coupled to the receiving means, for detecting signals received by the receiving means and generating output signals representative of the received signals; and means for calibrating the apparatus with a like apparatus.

The calibrating means may be adapted to receive a signal from a reference transmitter and to output signals representative of the received reference signals. By providing signals representative of received reference signals, the apparatus can allow an external agent to deduce additional properties of signals received from objects, such as the relative timing of reception of the signal between two such apparatuses. This feature is advantageous because it can allow such relative timings to be determined without providing a common clock to the receiving units.

Preferably the calibrating means is adapted to output signals representative of a timing difference between the arrival time of a signal from the transmitter associated with the object and a signal from the reference transmitter. This can assist in carrying out the calibration.

Alternatively (or additionally), the calibration means may comprise means for triggering the detection means in dependence on a common clock signal. Such clock signals can be relatively easy to produce, and can be sent via connections already existing for the purpose of outputting signal data from the apparatus. Preferably the triggering means is adapted to initiate a scan of the received signal at a predetermined time offset from receipt of the common clock signal.

Preferably the apparatus further comprises the object (incorporates the object itself). This can create a stand-alone system. The apparatus preferably further comprises means for determining the displacement of the object in dependence on a plurality of angular position measurements, and preferably comprises means for receiving angular position information from a remote position determining apparatus.

In a further aspect of the invention there is provided a system for locating an object incorporating a transmitter, comprising at least one apparatus as aforesaid, and means for determining the displacement of the object in dependence on a plurality of determined angular positions.

In a closely related aspect, there is provided a system for locating an object incorporating a transmitter, comprising at least one apparatus including means for receiving signals from the object and outputting a signal representative of the received signals, means for determining the angular position of the object with respect to the or each apparatus, and processing means for determining the displacement of the object in dependence on the determined angular position information. Preferably the or each apparatus contain any or all compatible features of any other apparatus as aforesaid.

Preferably the system comprises a plurality of apparatuses, preferably less than 4, and preferably less than 3. The number of apparatuses is preferably at least one less than that required in an equivalent system based on arc-fitting distance methods.

Preferably the or each means for receiving are asynchronous, and preferably the system further comprises at least one object and associated transmitter.

In another aspect of the invention there is provided a vehicle including apparatus as aforesaid.

In a yet further aspect of the invention there is provided apparatus as aforesaid, operable to receive and detect signals transmitted via an attenuating medium. Preferably the apparatus is operable to receive and detect signals through walls or floors, within walls or floors, from under the ground or otherwise without having line-of-sight contact between the means for receiving and the object.

In another aspect of the invention, there is provided apparatus for transmitting a positioning signal, comprising means for generating a signal and means for transmitting the signal, wherein the signal generating means is adapted to generate a signal which is suitable for use with apparatus as aforesaid.

Preferably the signal generating means is adapted to generate a signal comprising a pulse train having a characteristic repetition frequency. The characteristic repetition frequency may be between 2 MHz and 20 MHz, preferably between 5 MHz and 15 MHz, and more preferably between 10.5 MHz and 13.5 MHz. The pulses may have a characteristic frequency of between 0.5 GHz and 24 GHz, preferably between 2 GHz and 12 GHz, and more preferably between 5.8 GHz and 7.2 GHz.

The signal generating means may be adapted to vary a characteristic property of the generated signal in dependence on a discrimination input. The characteristic property may be a pulse repetition frequency of the signal, or it may be a pulse position modulation characteristic. The apparatus may further comprise means for time-division multiplexing the signal.

The signal generating means is preferably adapted to generate a signal having a bandwidth greater than 5%, 10%, or 20% of its frequency.

In another aspect of the invention, there is provided a method of determining positional information relating to an object, the method comprising generating a signal; transmitting the signal from the object to a receiving apparatus; detecting the signal at the receiving apparatus; and producing an output from which the angular position of the object relative to the receiving apparatus can be determined.

In a closely related aspect, there is provided a method of determining positional information relating to an object incorporating a transmitter, the method comprising: generating a signal pulse, preferably an ultra-wide band signal pulse; transmitting the signal pulse from the incorporated transmitter to a receiving apparatus, said receiving apparatus being arranged in a single housing or on a common substrate and comprising a plurality of receiving elements; detecting the relative timing of the signal pulse as received at the plurality of receiving elements; and producing an output from which the angular position of the object relative to the receiving apparatus can be determined.

The method may further comprise triggering the detection of the signal at the receiving apparatus, wherein the triggering is independent of the generation of the transmitted signal. Preferably the method further comprises triggering the detection of the signal in dependence on received triggering control signals. Preferably the detection of the signal is triggered at a frequency determined by the control signals. More preferably, the signal is generated with a characteristic repetition frequency and the detection of the signal is triggered at a triggering frequency different to the characteristic repetition frequency.

The triggering frequency $F_{trig}$ is preferably determined by $(F_{cr}/n)+F_{diff}$, where $F_{cr}$ is the characteristic repetition frequency, n is an integer frequency divider ratio, and $F_{diff}$ is a scan rate. n may be greater than 1, and is preferably greater than 2, 3, 4 or 5. $F_{diff}$ is preferably non-zero, and preferably less than 5%, 2% or 1% of the magnitude of $F_{cr}$, and more preferably less than 0.5% of the magnitude of $F_{cr}$.

The method preferably further comprises receiving the signal at a plurality of receiving elements, and detecting the relative timing of the signal as received at the plurality of locations, whereby the angular position of the object relative to the receiving apparatus can be determined. The method also preferably further comprises outputting a plurality of signals representative of signals received at the receiving apparatus. The method may further comprise receiving control signals at the receiving apparatus, and may further comprise processing the signals received from the object to determine positional information relating to the object.

The step of processing the received signals may comprise processing the signals in conjunction with a further angular position so as to determine the displacement of the object relative to the receiving apparatus. The method preferably further comprises computing timing differentials between a plurality of signals received at the receiving apparatus, and determining the angular position in dependence on the timing differentials between at least two of the plurality of signals.

The method may further comprise determining the pseudorange of the object. Preferably the step of determining the pseudorange comprises determining the amplitude of a received signal, and determining the pseudorange in dependence on the amplitude. The method may further comprise outputting a signal representative of the displacement of the object.

Preferably the step of generating the signal comprises generating a pulse train having a characteristic pulse frequency. The method may further comprise outputting at the receiving apparatus an output representative of the received pulse train, and the method may further comprise outputting a signal representative of the waveform of the received pulses.

The characteristic pulse frequency may be between 2 MHz and 20 MHz, preferably between 5 MHz and 15 MHz, and more preferably between 10.5 MHz and 13.5 MHz.

The method preferably further comprises sampling the received pulse train and producing an output having a characteristic sampling frequency related to the characteristic pulse frequency. The output sampling frequency may be lower than the characteristic pulse frequency. The output sampling frequency may be between 5 kHz and 100 kHz, preferably between 25 kHz and 90 kHz, and more preferably between 60 kHz and 85 kHz.

Preferably the method further comprises generating an input sampling clock signal at substantially a given multiple of the characteristic pulse frequency, generating an output sampling clock signal at the output sampling frequency, and sampling the signal on receipt of the input sampling clock signal and producing a sample output on receipt of the output sampling clock signal. The method preferably further comprises producing the sample output as an average of the input samples taken since the previous output sampling clock signal, and the method may further comprise advancing the phase of the input sampling clock by a predetermined amount after the sample output is produced.

The method preferably further comprises discriminating at the receiving unit between the signal transmitted at the object and at least one further signal.

In a related aspect of the invention, there is provided a method of determining positional information relating to an object, the method comprising receiving a plurality of signals transmitted by a plurality of transmitters including a transmitter associated with the object; discriminating between the signal transmitted at the object and any further received signals, in dependence on identification information; and determining the angular position of the object in dependence on the discriminated signal, whereby the positional information relating to the object can be determined.

In a closely related aspect, there is provided a method of determining positional information relating to an object incorporating a transmitter, the method comprising: receiving a plurality of signals, each signal being transmitted by a respective one of a plurality of transmitters and said plurality of transmitters including the incorporated transmitter; and discriminating between a received signal transmitted by the incorporated transmitter and any further received signals, in dependence upon a pulse repetition frequency of the signal transmitted by the incorporated transmitter, said received signal transmitted by the incorporated transmitter preferably comprising at least one ultra-wide band pulse.

The discriminating step preferably comprises discriminating in dependence on a characteristic property of the signal. The characteristic property may be a pulse repetition frequency of the signal, and the characteristic property may be a pulse position modulation characteristic, and the signal may be time-division multiplexed.

Preferably the method further comprises detecting the signal in dependence on a detection clock, and setting the detection clock in dependence on a selected signal frequency, whereby signals having the selected signal frequency are preferentially detected. The method preferably further comprises detecting a frequency error between the selected signal frequency and the received signal, and compensating for the frequency error. The step of detecting a frequency error may comprise estimating the signal frequency in dependence on the interval between successive peaks in the received signal corresponding to the peaks of successive pulses, and comparing the estimated signal frequency with the detection frequency. The step of detecting a frequency error may also or alternatively comprise computing an estimated signal frequency in dependence on the phase difference of consecutive samples, and comparing the estimated signal frequency with the detection frequency. The step of compensating for the frequency error may comprise creating a matched filter prototype representing an expected signal shape as effected by the estimated frequency error.

The method preferably further comprises determining the interval between the reception of the signal at a plurality of locations, thereby allowing the angular position of the object to be determined. The step of determining the interval may comprise cross-correlating the signals received at least one pair of locations, and determining the interval in dependence on the cross-correlation results. Alternatively, the step of determining the interval may comprise applying a matched filter to the signals received at the plurality of locations, and determining the time difference in dependence on the output of the matched filter.

In a related aspect of the invention, there is provided a method of determining positional information relating to an object, comprising receiving a signal at a plurality of locations; detecting signals received at the locations generating output signals representative of the received signals; and applying a matched filter to detect the interval between signals received at a plurality of the locations, whereby to determine an angular position of the object. The received signal may have a bandwidth greater than 5%, 10%, or 20% of its frequency.

In a closely related aspect, there is provided a method of determining positional information relating to an object, comprising: receiving a signal at a receiving apparatus, said receiving apparatus comprising a plurality of receiving elements; and applying a matched filter so as to detect an interval between receipt of the signal at one of the receiving elements and receipt of the signal at least one other of the receiving elements, whereby to determine an angular position of the object.

If the method further comprises transmitting a probe signal towards the object, and receiving a reflection of the probe signal from the object, the step of transmitting a probe signal may comprise transmitting a signal different to the signal transmitted at the object. The method may further comprise encoding the probe signal, whereby it can be distinguished from the signal received from the object.

The method may also further comprise determining the positional information of an object irradiated by the probe signal. Preferably the method then further comprises comparing the positional information of the irradiated object to positional information relating to at least one known object, whereby anomalous objects can be identified. The method may further comprise generating an alert signal in dependence on the result of the comparison. The or each object preferably includes the object transmitting the signal received at the receiving apparatus.

The invention also provides a method of determining positional information relating to an object, comprising: arranging a receiving means and a transmitting means in a single housing or on a common substrate; transmitting a probe signal towards the object using the transmitting means; receiving a signal pulse with the receiving means, said signal pulse being one of a reflection of the probe signal from the object and a signal transmitted by a transmitter associated with the object, and said signal pulse preferably being an ultra-wide band signal pulse; and producing an output in dependence upon the received signal pulse from which the angular position of the object can be determined.

In another aspect of the invention, there is provided a method of searching a detection volume for an object transmitting a signal, comprising receiving a signal at a plurality of locations; detecting signals arriving at the locations generating output signals representative of the received signals; and determining the interval between signals received at a plurality of the locations, whereby the existence of the object and its angular position can be determined.

In a closely related aspect, there is provided a method of searching a detection volume for an object transmitting a signal, comprising the steps of: setting a range gate; detecting at least one signal, if such at least one signal has been received at an apparatus comprising a plurality of receiving elements; determining the interval between the at least one signal being received at one of the plurality of receiving elements and the at least one signal being received at the or each of the other of the plurality of receiving elements; varying the range gate; and repeating the detecting and determining steps, whereby the existence of the object and its angular position can be determined regardless of whether transmission of the signal from the object is synchronised with the apparatus.

The method may further comprise detecting signals within a given range gate, and varying the range gate, whereby objects which are not synchronised with the receiving apparatus can be detected.

The method preferably further comprises calibrating the receiving apparatus with a like apparatus.

In a related aspect of the invention, there is provided a method of determining positional information relating to an object, the method comprising detecting at a receiving apparatus signals transmitted at the object; generating output signals representative of the received signals; and calibrating the receiving apparatus with a like apparatus. The method preferably further comprises receiving a signal from a reference transmitter and outputting signals representative of the received reference signals. The method may further comprise outputting signals representative of a timing difference between the arrival time of a signal transmitted at the object and a signal transmitted at the reference transmitter.

The step of calibrating the receiving apparatus may comprise triggering the detection means in dependence on a common clock signal, in which case the method may further comprise initiating a scan of the received signal at a predetermined time offset from receipt of the common clock signal.

Preferably the method further comprises determining the displacement of the object in dependence on a plurality of angular position measurements. The method may further comprise receiving and detecting signals transmitted via an attenuating medium.

In another aspect of the invention there is provided a method of transmitting a positioning signal, comprising generating a signal and transmitting the signal, wherein the signal is suitable for use with apparatus as aforesaid.

In a yet further aspect of the invention there is provided a method of transmitting a positioning signal, comprising generating a signal and transmitting the signal, wherein the signal is suitable for use with a method as aforesaid.

The signal may comprise a pulse train having a characteristic repetition frequency, as mentioned above.

The method may further comprise varying a characteristic property of the generated signal in dependence on a discrimination input. The characteristic property may be as aforesaid. The method may further comprise time-division multiplexing the signal. The signal bandwidth may be as aforesaid.

In another aspect of the invention, there is provided a signal suitable for use with apparatus as aforesaid.

In a related aspect of the invention, there is provided a signal comprising a pulse train having a characteristic pulse frequency, wherein the characteristic pulse frequency is between 2 MHz and 20 MHz, preferably between 5 MHz and 15 MHz, and more preferably between 10.5 MHz and 13.5 MHz, and the pulses have a characteristic frequency of between 0.5 GHz and 24 GHz, preferably between 2 GHz and 12 GHz, and more preferably between 5.8 GHz and 7.2 Ghz.

Preferably, the method further comprises varying a characteristic property of the generated signal in dependence with on a discrimination input. Preferably, the characteristic property is a pulse repetition frequency of the signal. Preferably, the characteristic property is a pulse position modulation characteristic. Preferably, the method further comprises time-division multiplexing the signal. Preferably, the signal has a bandwidth greater than 5%, 10%, or 20% of its frequency.

As before, the signal may be encoded using time-division multiplexing, and may be encoded using pulse-position modulation.

According to a further aspect of the present invention, there is provided apparatus for use in a system for determining positional information relating to an object, the apparatus including a transmitter for transmitting a sequence of pulses for detection by a receiver of the system, wherein the transmitter is adapted to vary a characteristic of the pulse sequence to transmit data to the receiver.

By varying a characteristic of the sequence of pulses emitted by the transmitter, it is possible to transmit data between the transmitter and receiver.

Preferably the rate of varying the characteristic of the pulse sequence is significantly lower than the pulse frequency. In this way, the data rate of the message can be made much lower than the radio-frequency of the system itself.

The transmitter may be adapted to vary the pulse repetition frequency (PRF) of the pulse sequence. For example, by using two pulse repetition frequencies, a "0" or "1" can be transmitted by the transmitter. The PRF is preferably varied pseudo-randomly. If there is a plurality of transmitters, each with a different PRF in order to avoid interference, the modulation may be different for each transmitter, and the bandwidth of the modulation may be less than the frequency band of each PRF channel.

The sequence of pulses may be interrupted periodically. By analysing the pattern of interruptions at the receiver, information transmitted by the transmitter can be determined. For example, the transmission can be switched on and off for predetermined periods of time corresponding to a particular code.

Thus, in addition to positional information which may be determined at the receiver from the pulses received, further information transmitted by the transmitter may be determined by analysing the varying characteristic of the pulse sequence.

In this way, an encoded message may be transmitted by the transmitter.

Data transmission is preferably achieved by PRF modulation. This can be used, for example, for discriminating between multiple transmitters: each transmitter can transmit information by this method including information identifying the transmitter. The mechanism can be used generally to transmit data between the transmitter and the receiver system.

The transmitter may be associated with the object. In this way, positional information relating to the object as well as the additional information can be determined from the sequence of pulses transmitted. The transmitter may be associated with a tag, preferably a tag according to any of the aspects of the invention described above.

The pulse sequence including the transmitted data may be transmitted at substantially the same frequency as the signal transmitted for use in determining the positional information.

Preferably the pulse sequence containing the data is also used to determine positional information.

The transmitted data may include information relating to the identity of the transmitter. For example, the data may comprise an identifier of the transmitter. Where the transmitter is associated with an object, the information may be used to identify the object.

The information may comprise an identifier for use in establishing communication between the transmitter and the receiver.

The apparatus may further comprise means for effecting a communication between the transmitter and the receiver. For example, the apparatus may comprise a separate radio transmitter, for example at the transmitter or receiver systems, to effect additional communications.

Such communications can be used, for example to transmit further information from the transmitter, for example relating to the object. Alternatively, or in addition, the communications can be used to enable the system to alter system settings. For example, where the transmitter comprises a tag associated with an object, the communication may be used to change system settings such as tag update rate.

The apparatus may comprise a component for both effecting the transmission of the sequence of pulses as well and for use in effecting the communication between the transmitter and the receiver.

For example, where the frequency of transmission is similar or the same for transmitting the signal for use in positional determination and for transmitting the communication, substantially the same components can be used for both transmissions. This has a potential benefit of significantly reducing the size and complexity of the system.

According to this invention there is further provided apparatus for use in a system for determining positional information relating to an object, the apparatus comprising a transmitter for transmitting a signal for use in determining the position of the object, and further comprising a transmitter for transmitting a communication to a receiver, wherein a component of the transmitter for transmitting the signal is common to the transmitter for transmitting the communication.

Preferably more than one component is common to the transmitters. Any, or all, of an antenna, or signal generation circuitry, or the front end may be common.

According to the invention, there is further provided apparatus for use in a system for determining positional information relating to an object, the apparatus comprising a receiver for receiving a signal for use in determining the position of the object, and further comprising a receiver for receiving a communication from a transmitter, wherein a component of the receiver for receiving the signal is common to the receiver for receiving the communication.

Preferably more than one component is common to the receivers. Any, or all of an antenna, or signal reception circuitry, or the front end may be common componentry.

Preferably the signal and the communication are at substantially the same frequency, preferably radio frequency.

Preferably the signal includes an identifier, preferably of the object, preferably encoded or modulated in the signal possibly by way of pulse repetition frequency modulation. Preferably the identifier is a MAC address.

Preferably, the signal and the communication are UWB. Preferably the communication uses a standard communications protocol. Examples of such protocols currently include DSRC and IEEE 802.11A. Preferably the communication is two way.

In any of the apparatus described above, the distance between the transmitter and the receiver is preferably less than 100 m.

Techniques described herein are particularly effective where the distance between the receiver and the object including the transmitter device is not great. Preferably the distance is less than 50 m, preferably less than 20 m.

The apparatus may comprise a transceiver adapted to receive data, and to detect a characteristic of other transceivers or receivers and to transmit data selectively to them depending on that characteristic. Preferably the characteristic is position.

This aspect of the invention may be provided independently, so providing apparatus for use in a system for determining positional information relating to an object, the apparatus comprising a transceiver adapted to receive data, and to detect a characteristic of other transceivers or receivers and to transmit data selectively to them depending on that characteristic. Preferably the characteristic is position.

For example, a transceiver mounted on a vehicle on one lane of a motorway could receive and transmit data regarding road works to vehicles on the relevant side of the road only.

The transmitter and/or the receiver may be mounted on a vehicle.

Techniques described have particular application to determining position and bearing of vehicles and can also be used, for example to transfer information between vehicles, from a vehicle to a static roadside system, and/or from a static roadside system to a vehicle.

The apparatus may be adapted to transmit data regarding a characteristic of a vehicle.

For example, where the object is a vehicle and the transmitter is mounted on the vehicle, the transmitter may transmit information regarding the vehicle, for example driving performance or, for example, that it is performing hard braking. This information can be used for example by another vehicle close to the vehicle transmitting the information to determine driving strategy, for example braking strategy or accident avoidance strategy.

The transmitter may be mounted on a road and the receiver may be mounted on a vehicle. A radar system in the vehicle may thereby determine the location of the side of the road, which information may be used to alter the driving strategy of the vehicle.

The apparatus may be adapted to transmit data regarding a characteristic local to the position of the transmitter. For example, the transmitter could transmit information about traffic conditions, weather conditions, local radio stations, and so on.

According to this invention there is further provided apparatus for use in determining positional information relating to a vehicle, the apparatus comprising a receiver for receiving a signal for use in determining the position of the vehicle, and further comprising a receiver for receiving a communication from a transmitter associated with the vehicle relating to information regarding a characteristic of the vehicle, the apparatus further including a control system for determining a driving strategy using the received information.

According to this invention there is further provided a stock control system comprising apparatus as described above in which the transmitters are used to locate packaged goods, and are adapted to transmit data regarding characteristics of the packaged goods, the apparatus further including a control system for determining where the goods should be stored, or when they should be retrieved using the received data.

According to this invention there is further provided a method for determining positional information relating to an object, comprising generating a sequence of pulses, varying a characteristic of the sequence of pulses to transmit data, and transmitting the sequence of pulses for detection by a receiver of the system.

According to this invention there is provided a computer program product adapted to perform the above method and a computer readable medium tangibly embodying the computer program product.

According to this invention there is provided a signal for use with the above apparatus and methods.

In any and all aspects of the invention described above, some or all of the transmissions, that is for example to determine positional information, to transmit an identifier, and to communicate, may be ultra-wide band.

In another aspect of the invention there is provided a computer program product adapted to perform any of the methods and implement any of the apparatuses as aforesaid. The term "computer program product" as used herein preferably connotes data in a computer-readable form which, when executed by a processor (such as a microprocessor, DSP, custom integrated circuit, or a microcontroller) causes the relevant method to be performed. The term preferably comprises interpreted languages (such as JAVA), compiled languages (such as compiled C++) and machine code.

In a further aspect of the invention there is provided a computer readable medium tangibly embodying a computer program product as aforesaid.

In a yet further aspect of the invention there is provided a signal tangibly embodying a computer program product as aforesaid.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

BRIEF DESCRIPTION OF THE DRAWINGS

Preferred features of the present invention will now be described, purely by way of example, with reference to the accompanying drawings, in which:—

DETAILED DESCRIPTION OF EXAMPLE EMBODIMENTS

A system for determining the position of an active object (that is, an object incorporating a transmitter, or 'tag'), is described below. The system, in certain embodiments, can be used to determine the position of a passive object (that is, an object not incorporating a transmitter).

The configuration of the system is first described, with descriptions being given of a receiving unit (a sensor used to detect tag signals), a transmitting object (the tag itself), and a control unit.

Later on, the principles underlying the design of the positioning system are described, including information on the relative timings of the system components, the calibration of the receiving units, and the channelisation of the transmitted signals.

Later still, there is a more detailed explanation relating to the processing of the signals in the control unit (in particular the matched filtering process), the construction of the differential timing sensor array, operation of the system in passive mode, and a description of possible applications of the positioning system. Then, details are provided regarding an implementation of a suitable detection algorithm. Finally there is some discussion of alternative features of the detection algorithm.

First, the positioning system is described in overview.

The Configuration of the Positioning System

Figure 1:
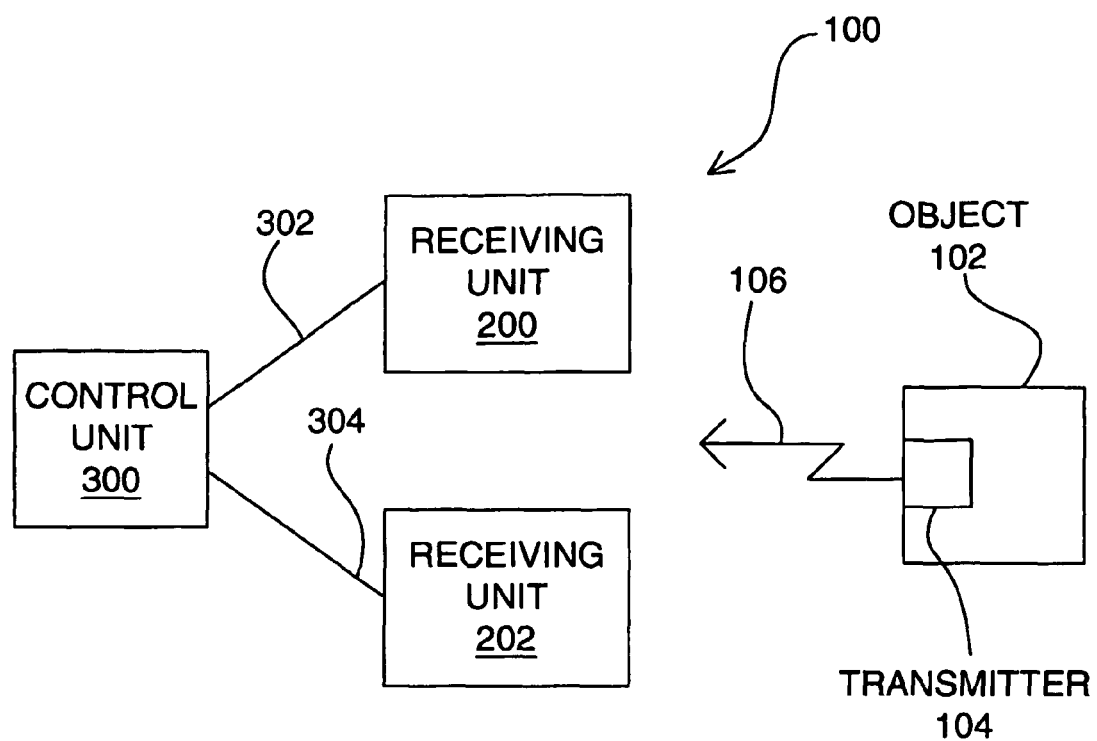
FIG. 1 is an overview of a first embodiment of a positioning system.

FIG. 1 is an overview of a first embodiment of the positioning system. With reference to FIG. 1, the positioning system 100 comprises an object to be located 102, a transmitter 104 associated with or contained in the object 102 and outputting a signal 106, a pair of receiving apparatuses 200, 202, and a control unit 300. The receiving apparatuses 200, 202 are connected to the control unit 300 by data links 302, 304. As discussed in more detail later variants of the system may be operated in passive mode, in which the transmitter is located remote from the object, and the signals received at the receivers are reflections from the object of transmitted signals.

The receiving units 200, 202 pass to the control unit 300 via the links 302, 304 data representative of the signal 106 received at the receiving units. The control unit then processes the data received from the receiving units so as to determine the angular position of the object with respect to each receiving unit. The angular position is measured in terms of an azimuth angle and an elevation angle. Finally, the control unit, knowing the location of the receiving units, is able to triangulate the angular positions so as to compute the three-dimensional position of the object 102. The use to which the three-dimensional position is then put depends on the particular application of the system, as is described further later.

In order to compute the displacement (for example, the three-dimensional position) of an object using angular position information, only two angular position measurements are required (such as two pairs of azimuth and elevation angles), and therefore only two receiving units are required (as shown in FIG. 1). Furthermore, if certain refinements are made (see below) only one receiving unit may be required. However, improvements in the accuracy and range of the system can be achieved if two or more receiving units are used.

Figure 2:
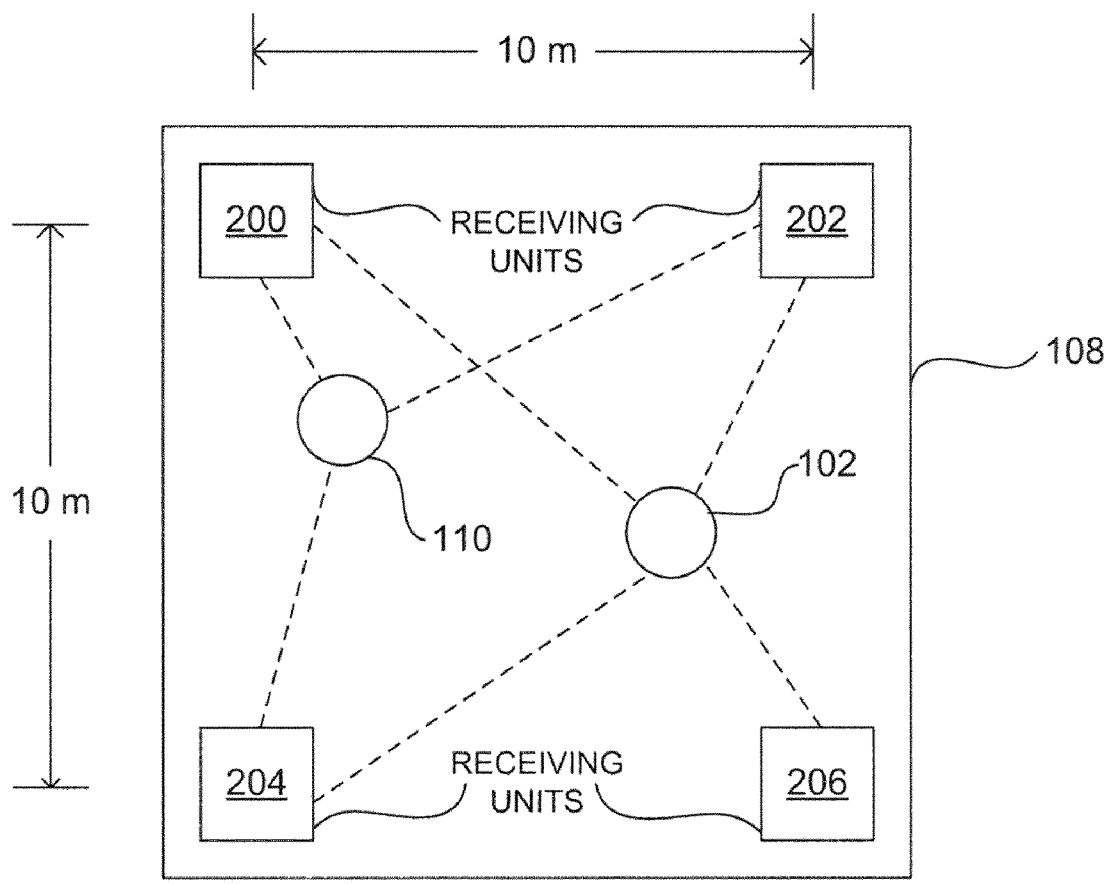
FIG. 2 is a schematic of a positioning system in which more than two receiving units are used.

FIG. 2 is a schematic of a positioning system in which more than two receiving units are used. In FIG. 2, four receiving units 200, 202, 204, 206 are located within a detection area 108 approximately in the shape of a square of side 10 meters. Two active objects 102, 110 are shown in the detection area. The receiving units 200, 202, 204, 206 have an effective range of 10 meters. Dashed lines are shown between the objects and receiving units to indicate the receiving units within whose detection range each object is located.

Figure 3:
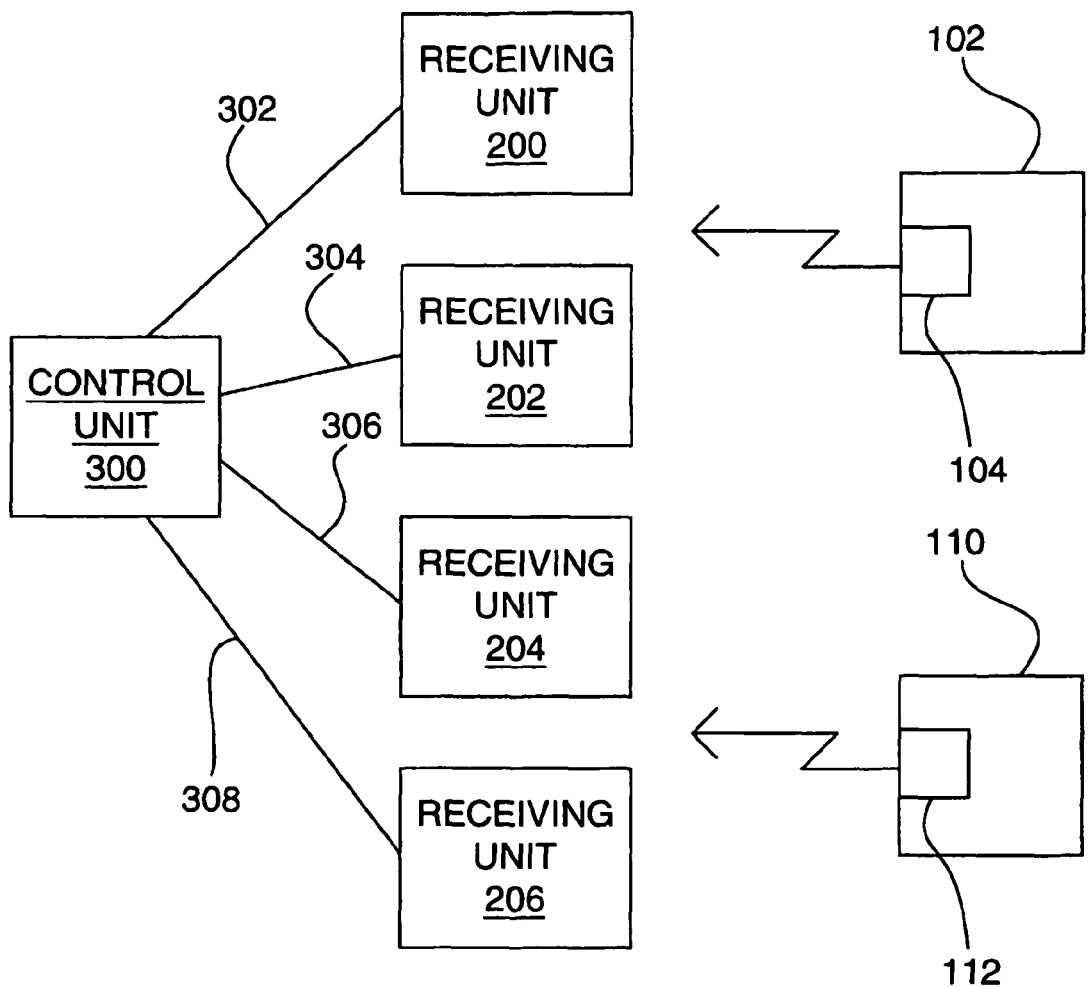
FIG. 3 is a schematic showing the interconnection of the components shown in FIG. 2.

FIG. 3 is a schematic showing the interconnection of the components shown in FIG. 2. With reference to FIG. 3, a first object 102 and associated transmitter 104, a second object 110 and associated transmitter 112, four receiving units 200, 202, 204, 206 and a control unit 300, connected via data links 302, 304, 306, 308 to the four receiving units 200, 202, 204, 206 respectively, are shown.

It can be seen that due to the geometrical arrangement of the receiving units and the objects, the first object 102 is detected by all four receiving units 200, 202, 204, 206, and that the second object 110 is detecting by only three receiving units 200, 202, 204. In both cases, at least one angular position measurement is redundant, and can be used to improve the accuracy of the overall position measurement.

Other numbers and configurations of receiving units are of course possible.

With reference again to FIG. 1, the data links 302, 304 connecting the receiving units 200, 202 to the control unit 300 are electrical wires. In a variant of the first embodiment, the data links 302, 304 are constituted by radio links between the receiving units 200, 202 and the control unit 300; other combinations are of course possible.

Figure 4:
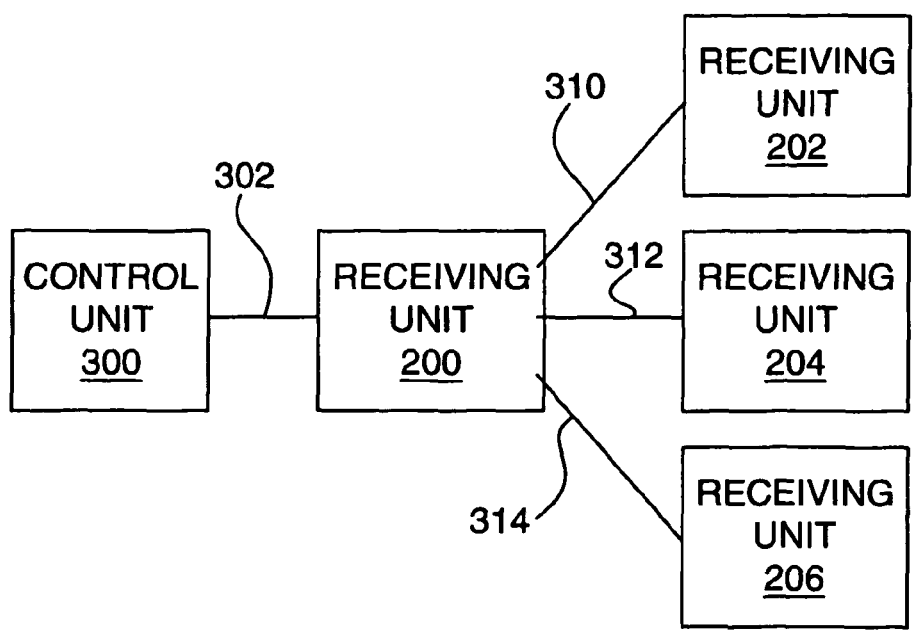
FIG. 4 is a schematic of a second embodiment of a positioning system.

FIG. 4 is a schematic of a second embodiment of the positioning system, in which the receiving units and the control unit are interconnected in an alternative configuration. In FIG. 4, a first receiving unit 200 serves as a communications hub between the further receiving units 202, 204, 206 and the control unit 300. The data links 310, 312, 314 between the first 200 and further receiving units 202, 204, 206 and the data link 302 between the first receiving unit 200 and the control unit 300 may as before be electrical wires, radio links or otherwise.

Figure 5:
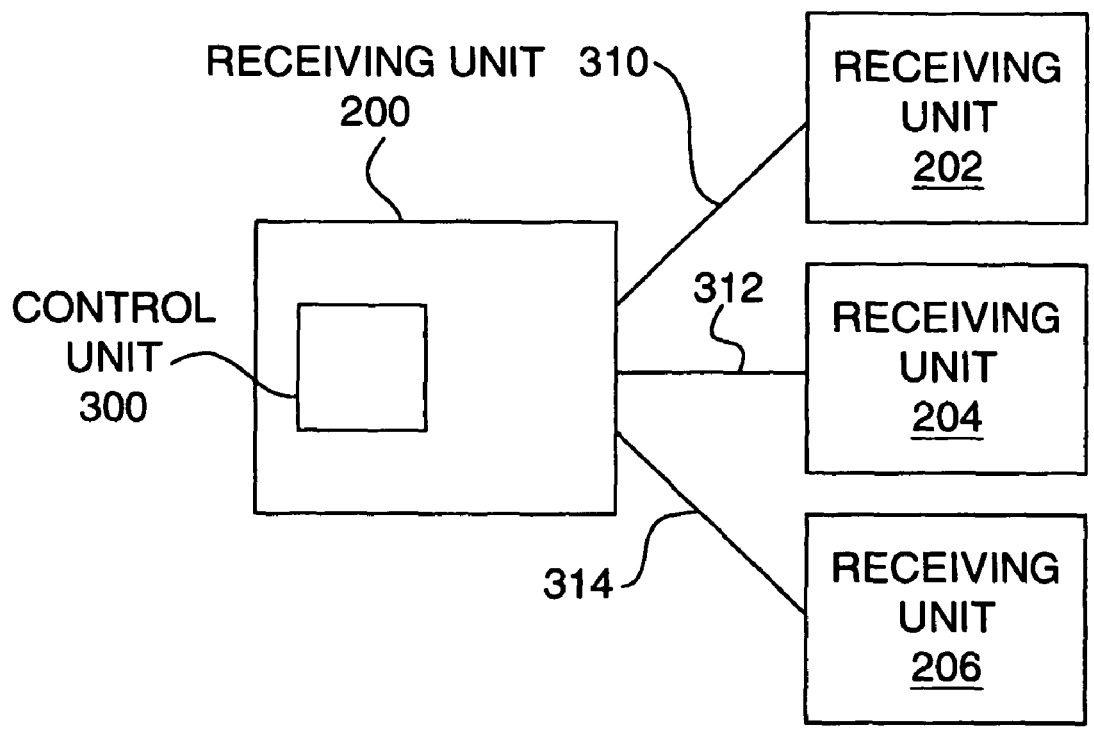
FIG. 5 is a schematic of a third embodiment of a positioning system.

FIG. 5 is a schematic of a third embodiment of the positioning system. In FIG. 5, a control unit 300 is located within a first receiving unit 200, which receiving unit 200 is connected to the further receiving units 202, 204, 206 via data links 310, 312, 314 as before.

The operation of the control unit and receiving units will be described further later. First, the active object 102 will be described in more detail, with reference to FIGS. 6 and 7.

Description of the Active Object

Figure 6:
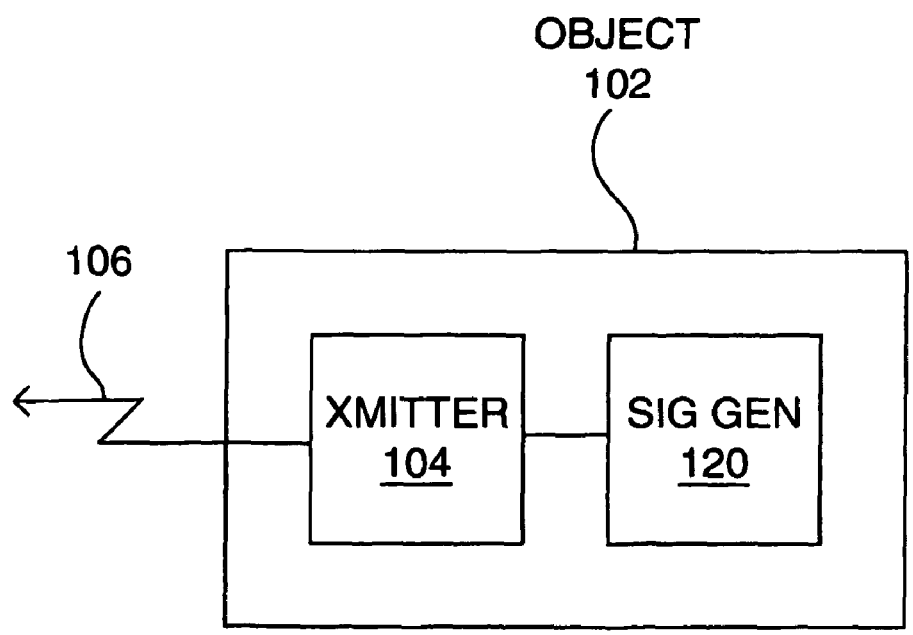
FIG. 6 is an overview of an active object in the positioning system.

FIG. 6 is an overview of an active object in the positioning system. In FIG. 6, the object 102 comprises a transmitter unit 104 coupled to a signal generation unit 120, which units together produce the signal 106.

Figure 7:
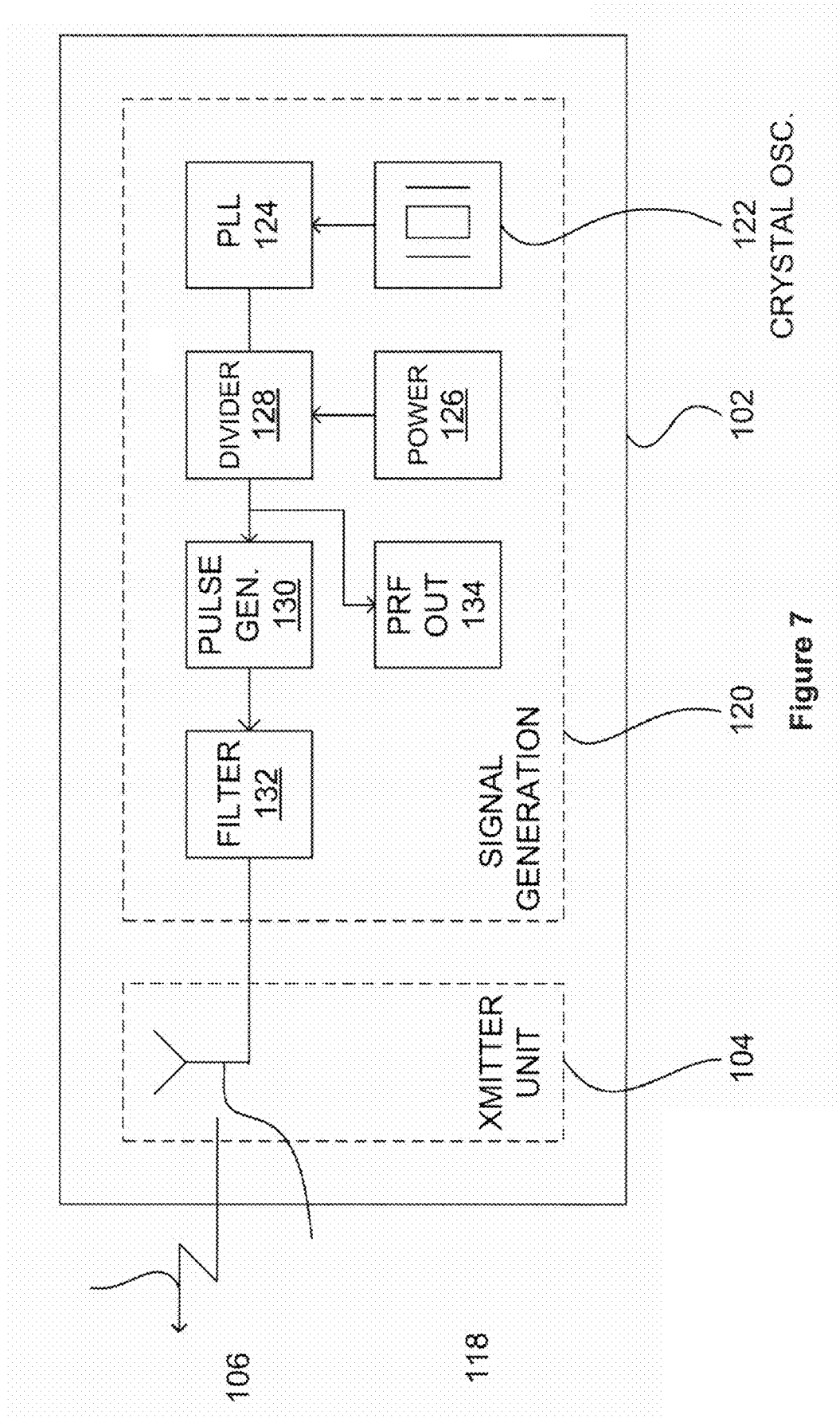
FIG. 7 is a schematic showing the object of FIG. 6 in more detail.

FIG. 7 is a schematic showing the object of FIG. 6 in more detail. With reference to FIG. 7, the transmitter unit (or 'tag') 104 comprises a single antenna 118, and the signal generation unit 120 comprises a crystal oscillator 122, phase-locked loop (PLL) circuitry 124, a pulse repetition frequency (PRF) selector and power interface 126, programmable divider 128, pulse generator 130, filter 132 and pulse repetition frequency (PRF) output unit 134. The programmable divider 128 is driven by the crystal oscillator 122 (via the PLL circuitry 124) in accordance with a PRF frequency provided by the PLL selector and power interface 126, and in turn drives the pulse generator 130, the output of which is filtered by the filter 132 before being transmitted by the antenna. A PRF output unit 134 provides the object with a means for reporting its current PRF setting. In the preferred embodiments, the PRF output unit 134 is not used, and may be omitted.

In the preferred embodiments, the object 102 is attached to an item of interest, such as a stock item or a member of staff in a company, for example. Accordingly, the object 102 may in use be affixed to such an item by any suitable means, such as an adhesive or a mechanical attachment. Alternatively, the object 102 may include such an item. The object 102 may also include additional circuitry for other (possibly related) purposes.

The operation of the transmitter unit 104 and signal generation unit 120 (and in particular the use of PRFs) is described later. First, the receiving unit 200 will be described in more detail with reference to FIGS. 8 and 9.

Description of the Receiving Unit

Figure 8:
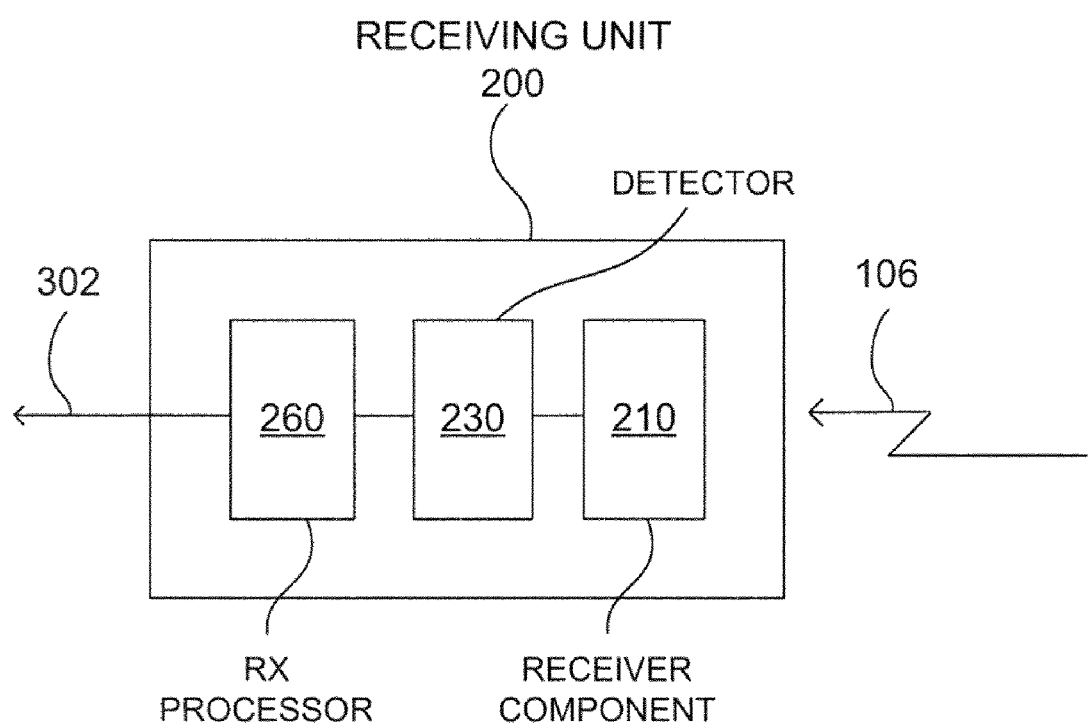
FIG. 8 is an overview of a receiving unit in the positioning system.

FIG. 8 is an overview of a receiving unit in the positioning system. In FIG. 8, the receiving unit 200 comprises a receiver component 210 for receiving the transmitted signal 106, a detector component 230, coupled to the receiver component, for detecting the signal 106, and a receiver-side processing unit 260 for processing the signal and output the processing results to the control unit 300 (not shown) via the data link 302.

Figure 9:
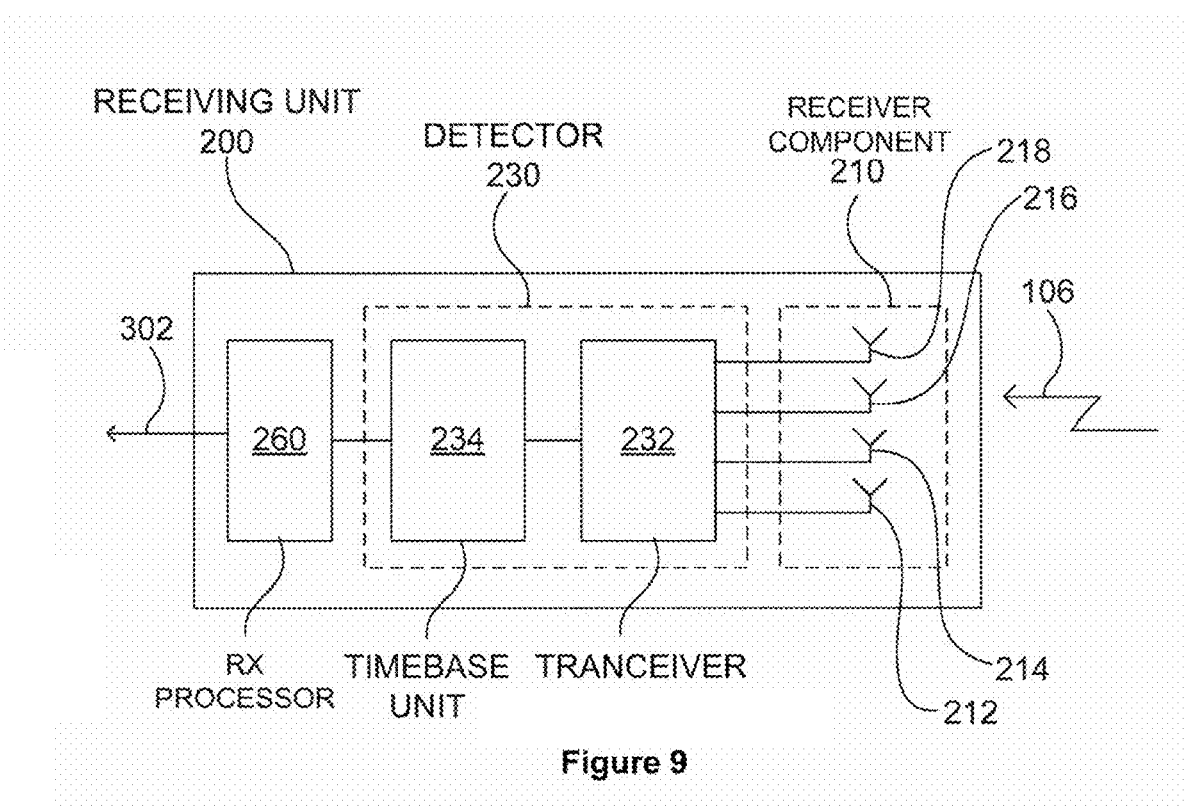
FIG. 9 is a schematic showing the receiving unit of FIG. 8 in more detail.

FIG. 9 is a schematic showing the receiving unit of FIG. 8 in more detail. In FIG. 9, the receiver component 210 in the receiving unit 200 comprises four antennas 212, 214, 216, 218 for receiving the transmitted signal 106 at carefully chosen spaced apart locations, and the detector component 230 in turn comprises a transceiver unit 232 coupled to the antennas 212, 214, 216, 218, and a timebase unit 234 coupled to the transceiver unit 232 and to the receiver-side processing unit 260, which is in turn connected to the data link 302.

As is described in more detail later, differential timing techniques are used to compute the angular position of transmitting objects whose signals are received at the receiving unit, which requires the analysis of a plurality of received signals. Accordingly, the antennas 212, 214, 216, 218 are provided, each having its own separate channel in the detector component 230 such that separate outputs are provided by the detector component 230 for each antenna.

In variants of the preferred embodiments, different systems are used to detect the angular position of objects. In one such variant, a directional antenna is provided which is swept continuously across the detection space.

Figure 10:
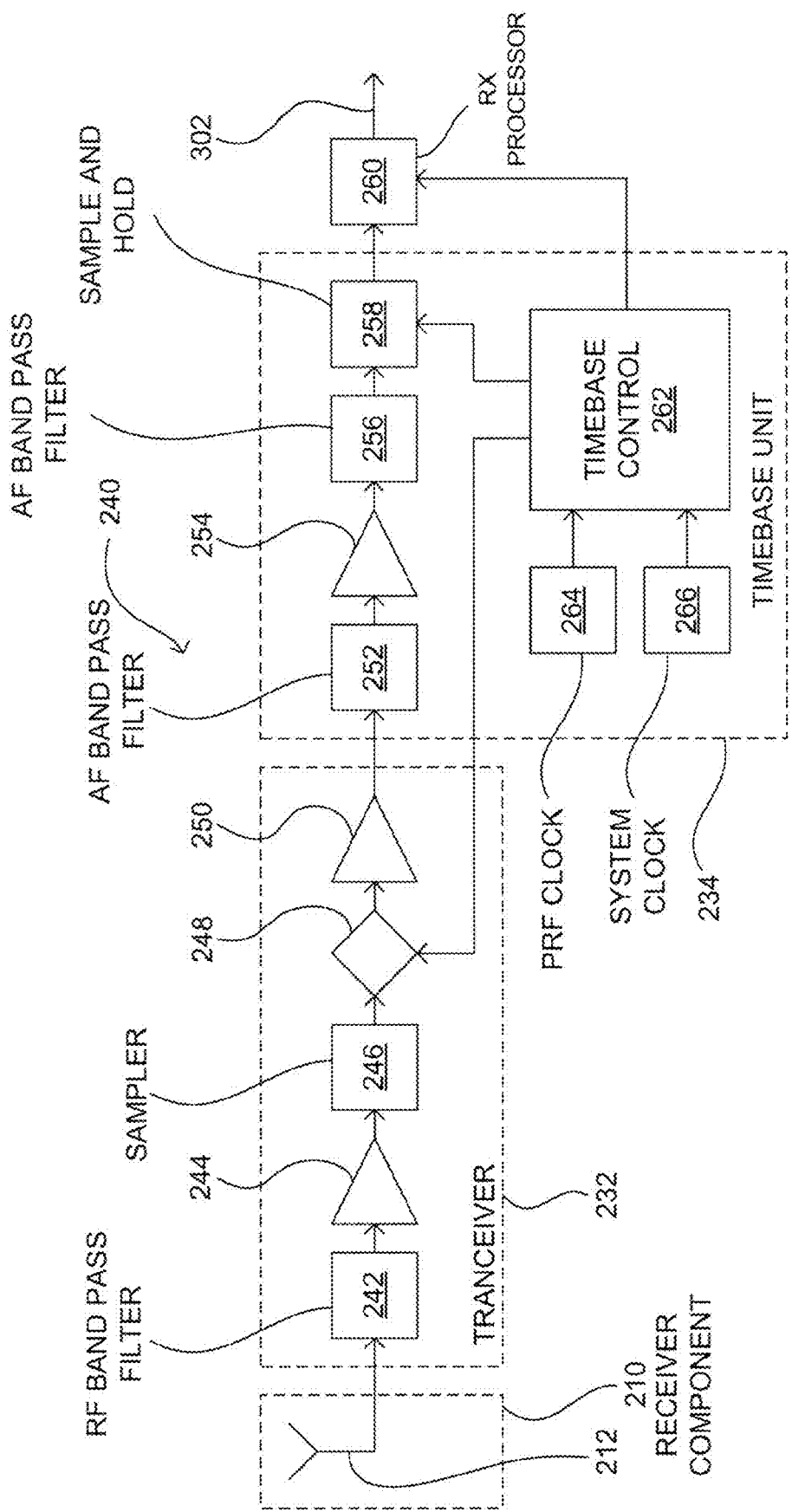
FIG. 10 is a schematic of one of the four receiver channels in the receiving unit of FIG. 9.

FIG. 10 is a schematic of one of the four receiver channels. With reference to FIG. 10, the channel 240 in the receiver component 210, transceiver unit 232 and timebase unit 234 comprises an antenna 212 which is connected in series with a radio-frequency (RF) band-pass filter (BPF) 242, a low-noise amplifier (LNA) 244, a further radio-frequency band-pass filter 246, a sampler 248, an audio buffer amplifier 250, an audio band-pass filter (BPF) 252, an audio amplifier 254, a further audio band-pass filter 256, a sample-and-hold stage 258 and the receiver-side processing unit 260. A timebase control unit 262, driven by a receive pulse repetition frequency (PRF) clock 264 and a receive system clock 266, is connected to the sampler 248, sample-and-hold stage 258 and the receiver-side processing unit 260.

In a variant of the preferred embodiments, a single clock source replaces the PRF clock 264 and receive system clock 266, with clock dividing circuitry being used to obtain the necessary clock frequency at each relevant stage.

In operation, radio frequency signals arriving at the antenna 212 are converted into audio-frequency digital signals and output to the control unit 300 by the data link 302. A low-bandwidth control data link (not shown) is provided in addition to the main data link 302, in order to allow the control unit 300 to interrogate the system status of the receiving unit 200 and to carry out system maintenance tasks as required.

The receiver-side processing unit 260 contains an analogue-to-digital converter (ADC) connected to the sample-and-hold stage 258 of each channel 240, and also connected to processing circuitry (such as a high-speed microcontroller and associated memory). The processing circuitry takes the output from each of the four channels, and undertakes the relevant processing in relation to the signals received from the antennas 212, 214, 216, 218—namely to determine azimuth and elevation angles relating to detected signal sources. The processing unit 260 sends to the control unit 300 via the data link 302 a digital representation of the detected angles, for further processing in conjunction with similar data sent from the other receivers 202, 204, 206.

In a variant of the preferred embodiments, the receiver-side processing unit 260 is omitted, and instead analogue signals from the sample-and-hold stage 258 are sent via the link 302 to an analogue-to-digital converter (ADC) provided at the control unit 300. The ADC may be driven by the timing signal from the timebase control unit 262, or by a timing signal generated at the control unit 300. In this variant, the control unit 300 undertakes all of the azimuth and elevation angle processing for all of the receivers.

In a further variant, the receiver-side processing unit 260 comprises essentially just an analogue-to-digital converter (ADC), so that the signals representative of the signal received at each antenna 212, 214, 216, 218 are sent to the control unit in a digitised form.

Before various aspects of the positioning system are explained further, the control unit 300 will be described in more detail, with reference to FIG. 11.

Description of the Control Unit

Figure 11:
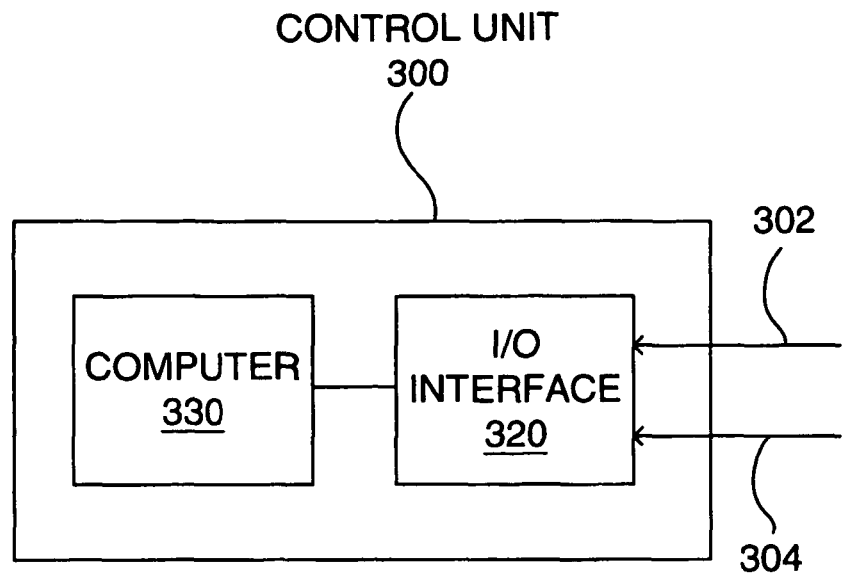
FIG. 11 is a schematic of the control unit in the positioning system.

FIG. 11 is a schematic of the control unit in the positioning system. In FIG. 11, an input/output interface 320 is connected to the two receiving units (not shown) via the data links 302, 304. The input/output interface 320 is coupled to a computer 330.

In the preferred embodiments, the computer 330 includes a central processor unit (CPU) and a storage medium (a combination of a hard disk and/or memory) and a connection to the input/output interface 320. The relevant processing is carried out by the CPU using custom processing software, and the results of the processing are made available either visually or in computer-readable form.

In a variant of the preferred embodiment, suitable for a low-cost implementation, the computer 330 is a standard PC, and the input/output interface 320 is a 2×4 channel analogue data acquisition PCI card, which may or may not have an output functionality, for example depending on the type of data link required to the receiving units (see above). The processing may in some variants be carried out principally by mathematical programming software (such as interpreted programs, such as those running on the Matlab program, or compiled stand-alone programs, for example) running on the PC. Other combinations are of course possible. In configurations having different numbers of receiving units, data acquisition cards having a greater number of inputs and/or greater numbers of data acquisition cards may be used. In variants of the preferred embodiments, the receiving units may multiplex and/or route the relevant information to the PC so as to reduce the number of physical inputs into the control unit 300. In further variants, the outputs of the receiving units are multiplexed in the analogue domain and demultiplexed inside the control unit 300.

In a further variant of the preferred embodiment, the computer 330 comprises dedicated hardware, such as an ASIC chip, or a microcontroller chip and associated circuitry for processing the information received from the receiver unit or units. For example the computer 330 may be used to determine the object/objects' displacement and/or to carry out further application specific tasks, and in the receiver-side processing unit 260 of the receiver unit 200 the angular position is determined.

In the preferred embodiments, the computer 330 is connected to a further computer and/or network to allow the results of the processing to be shared in an appropriate context.

Communication interfaces are provided in the receiving units, additional to the interfaces transmitting the outputs of the four receiver and detector channels, and also in the control unit, so as to allow control signals (such as clock signals—see below) to be passed between the control unit and receiving units. The communication interfaces are simple RS232 serial links, but in variants of the preferred embodiments protocols and systems such as Ethernet, Bluetooth (and other wireless protocols) and parallel connections are used.

There now follows a discussion of the basic principles underlying the positioning system design.

Principles Underlying the Design of the Positioning System

The system is designed to have a maximum detection range of the active object (or 'tag') of 10 m. Greater detection ranges (such as 30 m and above) are possible, but at the expense of greater cost and complication due to the higher powers and greater complexity that can be required.

For efficiency and performance reasons, the tags signal their position using pulses whose relative bandwidth (that is, the size of the pulse bandwidth compared to the pulse frequency) is greater than, say, 10% and may be even greater (such as 20%, 30%, 40% or even higher). The propagation characteristics of such pulses can be relatively favourable in indoor applications, for example, where so-called narrowband pulses can propagate poorly and/or highly unpredictably. The pulses are emitted at a characteristic pulse repetition frequency (PRF). An equivalent pulse repetition period (PRP), which is the inverse of the PRF, defines the delay between successive pulses.

Nevertheless, in variants of the preferred embodiment, where a relatively low spatial resolution is acceptable, the pulses can be limited to these 'narrowband' frequencies. In these cases the relative bandwidth of the pulses may be substantially less than 10% (and even less than 1%), for example.

The differential timing detection system does not need to consider the time delay between the transmission of pulses at the transmitter and reception of the pulses at the receiver (which delay would give an indication of the distance between the transmitter and the receiver), but instead considers the relative timings of reception of individual pulses (which relative timings can allow the angular position of the transmitter to be determined). Using the different timing detectors to compute the angular position of the object with respect to each sensor and then triangulating the measured angular positions can determine the displacement of the object to an accuracy of approximately 60-80 centimeters in a typical system (although this can vary according to factors such as the number of and proximity of the receiving units, the magnitude of frequency errors, and the signal-to-noise ratio of the received signals), which is adequate resolution for many tracking tasks.

However, the accuracy of the system can be improved by synchronising the receiving units in the system, so as to measure the differential timing of received pulses between the individual receiving units, in addition to measuring the differential timing of received pulses between the multiple receiver channels in each receiver unit. In order to synchronise the receiving units (see below), a constraint is placed on the transmitter PRF so as to avoid ambiguities in respect of which pulse was received by which receiving unit.

In order to avoid such ambiguities, the Pulse Repetition Period (PRP), being the inverse of the Pulse Repetition Frequency (PRF), must exceed twice the maximum difference in arrival times of a pulse, where the maximum difference in arrival times of a pulse is the time taken for a pulse to travel the maximum detection range (that is, n/c, where m is the maximum detection range and c is the speed of light).

For a system having a 10 meter maximum detection range, the maximum difference between the time of arrival of a signal between two receivers is approximately 33 nanoseconds (ns), and the Pulse Repetition Period (PRP) of the transmitter therefore has to exceed 66 ns in order to avoid ambiguities in the resolved range.

For a system having a greater maximum detection range, such as 30 meters or greater, the time of arrival of a signal between two receivers will be greater (approximately 100 nanoseconds in the case of a 30 meter range), and a consequently higher PRP will be required (for example, at least 200 ns in the case of the 30 meter range). By making similar changes to the calculations dependent on the PRP, the principles discussed herein can apply equally to such larger maximum ranges.

The Relative Timings of the System Components

Figure 12:
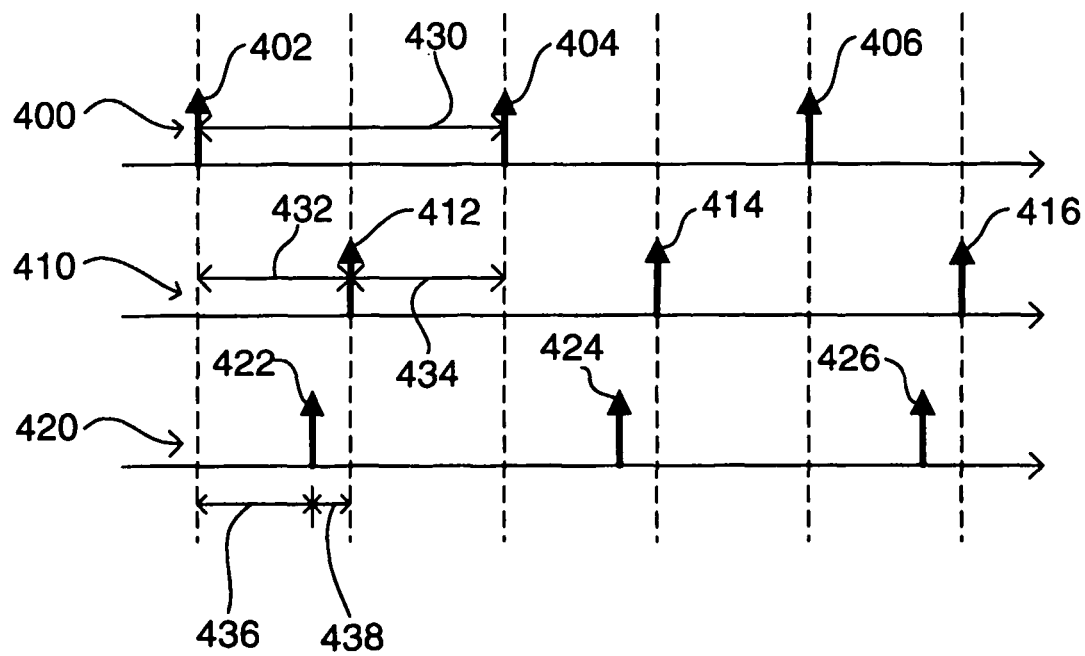
FIG. 12 is a timing diagram showing example timings for a receiving unit in the positioning system.

FIG. 12 is a timing diagram showing example timings for a receiving unit in the positioning system. In FIG. 12, transmitted pulses 400, corresponding received pulses 410, and receiver PRF clock pulses 420 are plotted against time. The transmitted pulses 402, 404, 406 are separated by a PRP 430. The received pulses 412, 414, 416 are received at a time offset 432 with respect to the transmitted pulses 402, 404, 406. The potential range ambiguity 434 is also shown. The lower plot shows the output of the receiver PRF clock used to start a scan of the receiver. Due to the asynchronous relationship between the transmitter PRF clock and the receiver PRF clock, the receiver PRF clock has an arbitrary time offset 436 with respect to the transmitter clock. The time offset 438 elapses between the PRF clock pulses 422, 424, 426 being transmitted, and the same pulses 412, 414, 416 being received.

In FIG. 12, the receiver starts sweeping before the nearest pulse (in terms of time) is received, and it can be seen that the range delay (that is, the delay between transmission and reception of a pulse, proportional to the range between transmitter and receiver) 432 is equal to the sum of the measured time 438 and the time offset 436 (that is, Actual Range=Measured+Offset).

Figure 13:
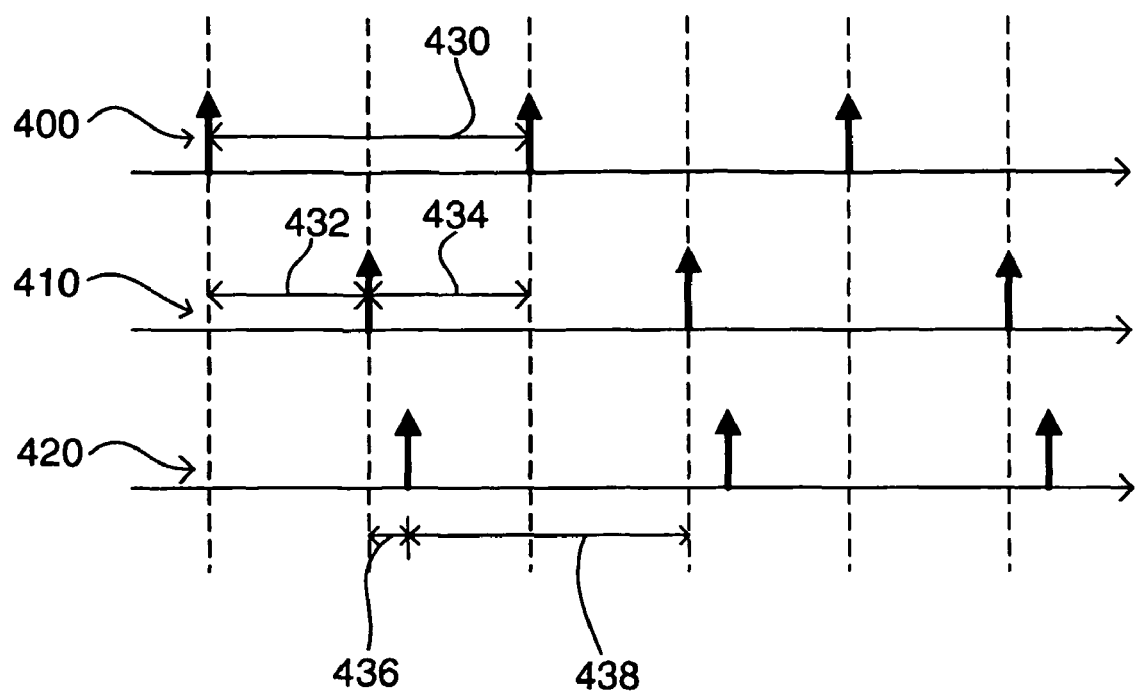
FIG. 13 is a timing diagram showing alternative example timings for a receiving unit in the positioning system.

FIG. 13 is a timing diagram showing alternative example timings for a receiving unit in the positioning system. FIG. 13 shows the timings for a receiving unit having the same configuration as FIG. 12, except that the receiver starts sweeping after the nearest pulse (in terms of time) is received. In FIG. 13, transmitted pulses 400, corresponding received pulses 410, and receiver PRF clock pulses 420 are again plotted against time. In this case, it can be seen that the range delay (that is, the delay between transmission and reception of a pulse, proportional to the range between transmitter and receiver) 432 is equal to the sum of the measured time 438 and the time offset 436, but less the PRP (that is, Actual Range=Measured+Offset−PRP).

When the receiving units are synchronised, the control unit uses information received from several receiving units to determine for each receiving unit the delay between the transmission of a pulse and the reception of the pulse at the unit in question (that is, the time offset 438, or 'Offset' in the above formulae). Using this information, the two possible range delays 432 ('Actual Range') are then computed in accordance with the above formulae. Because of the constraints placed on the PRP (see above), one of the computed range delays 432 will exceed the maximum possible delay (33 ns, in the present example) and can be eliminated. The (now unambiguous) computed range delay 432 is multiplied by the speed of light to obtain a measure of the distance between the relevant receiving unit and the transmitter. By using the range measurements to refine the position estimates produced using the angular position information, the resolution of the system is increased to an accuracy of approximately 1-2 centimeters.

Further information can be deduced, to allow the accuracy to be improved, by measuring the delay between successive received signals. Accordingly, a sampling duration is chosen such that at least two received pulses fall within the sampled data.

For good margin a maximum Pulse Repetition Frequency (PRF) of 12 MHz giving a PRP of 83 ns is used in the preferred embodiments. Without knowledge of the relative timing of the transmitter (which is the case if the receiving units are not synchronised), the receiver has to sweep the whole transmitter PRF period twice (to cover at least two pulses, as mentioned above) and a small overlap to make sure no parts of the transmit pulses are lost. Hence a time sweep of 230 ns is chosen. To allow the detection components a recovery time after each time sweep, the detection component operates at a frequency of 3 MHz (that is, equivalent to a PRP of 333 ns). However, in variants of the preferred embodiments, the detection components run at the same frequency as the signal PRF, or at different multiples of the signal PRF, for example at a half, a third, or a fifth (and so on) of the signal PRF.

Figure 14:
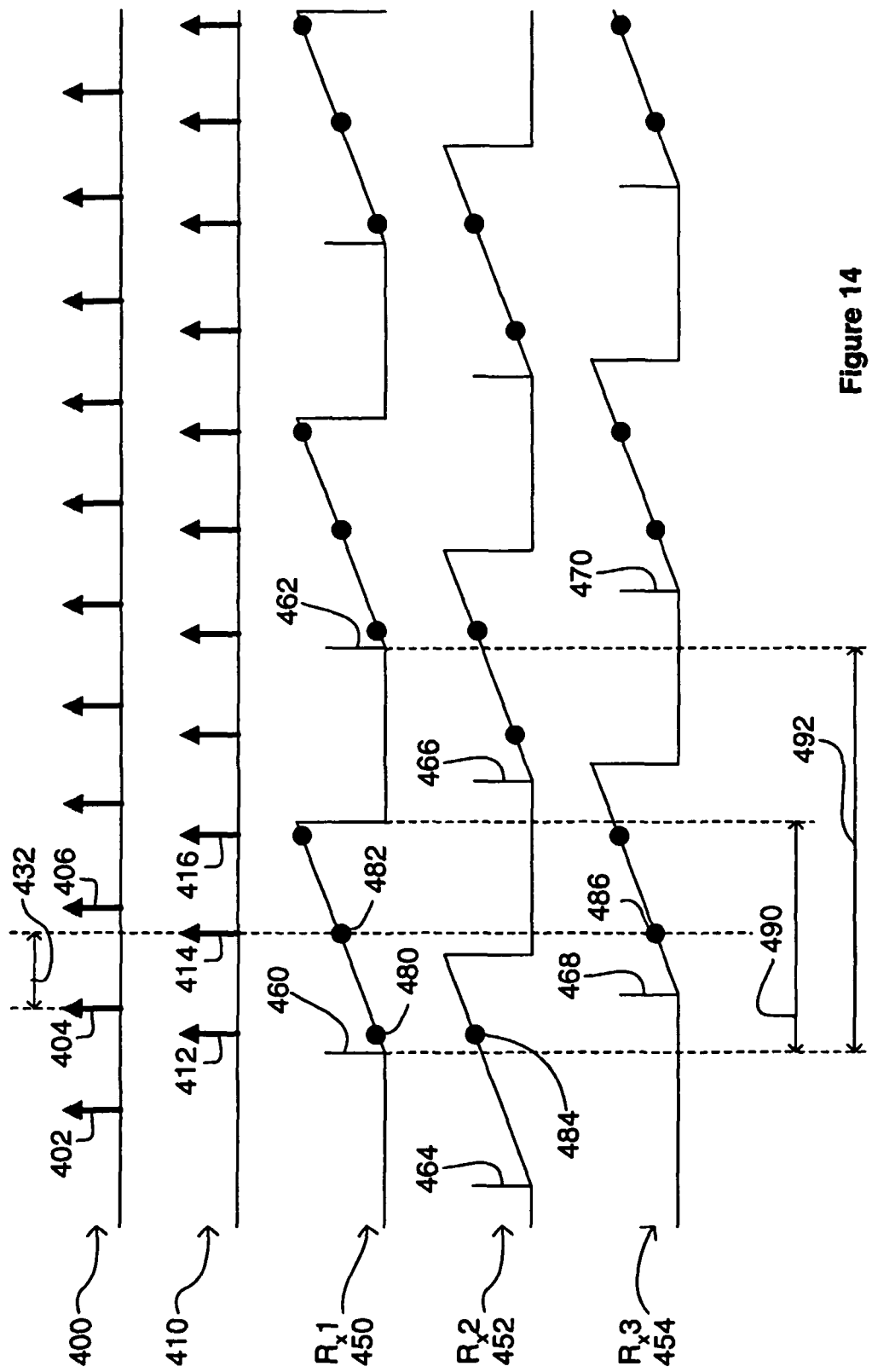
FIG. 14 is a timing diagram illustrating three different signal detection scenarios for receivers equidistant from a transmitter.

FIG. 14 is a timing diagram illustrating three different signal detection scenarios for receivers equidistant from a transmitter. In FIG. 14, transmitted pulses 400, corresponding pulses 410 received simultaneously at three receiving units Rx1, Rx2, Rx3 equidistant from the transmitter, and representations 450, 452, 454 of the sampling state of the three different receiving units are plotted against time. The transmitted pulses 402, 404, 406 are separated by a PRP (not shown) which, as noted above, is equal to 83 ns. The received pulses 412, 414, 416 are received at a time offset 432 with respect to the transmitted pulses 402, 404, 406. The receiving unit plots 450, 452, 454 show the Start of Scan (SoS) positions (including the first two Start of Scan positions 460, 462, 464, 466, 468, 470 for each receiver), and represent the duration of each scan as an upward ramp. Some of the points at which the received pulses can be detected (because they occur during sample scans) are indicated with markers 480, 482, 484, 486. The duration of a single scan 490 and the duration of a single sampling cycle 492 are also indicated on the figure.

It can be seen that in each of the three signal detection scenarios, at least two pulses are detected during the sample scan. Each 230 ns sample sweep is effectively scanning a distance of 69 meters (derived from 230 ns×c, the speed of light) in incremental steps, each such step being referred to as a range bin.

Figure 15:
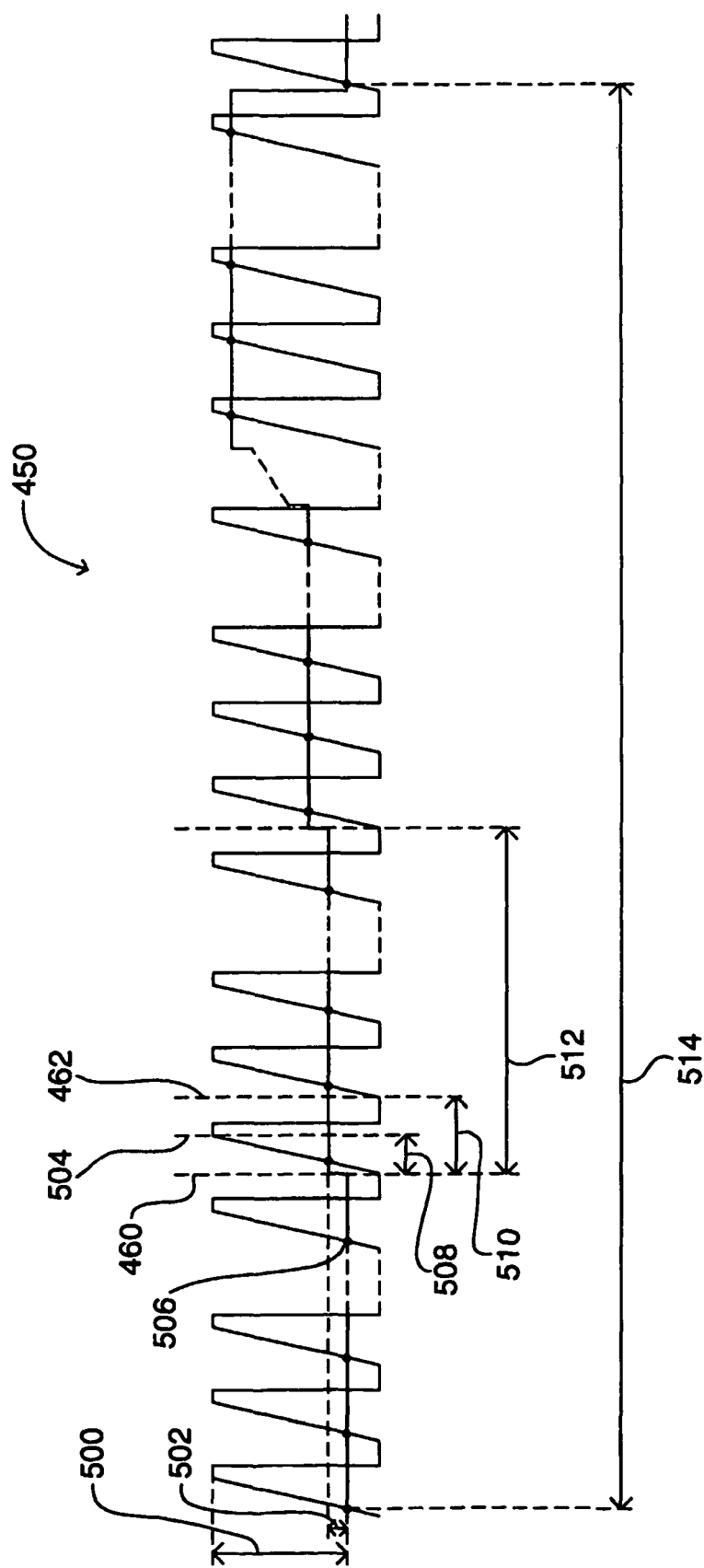
FIG. 15 is a timing diagram showing the sampling activity of the Rx1 receiving unit of FIG. 14 over the course of one detector cycle.

FIG. 15 is a timing diagram showing the sampling activity of the Rx1 receiving unit of FIG. 14 over the course of one detector cycle (that is, over the course of producing one set of data for outputting to the control unit). In FIG. 15, a representation 450 of the sampler state of the receiving unit is shown, plotting the scan range 500 (derived from the time offset from the Start of Scan, SoS) against time. A given height 502 in the plot corresponds to a certain range bin. As before, the scan sweeps are shown with Start of Scan (SoS) positions 460, 462 and an end of scan position 504 (and so on) defining a ramp. The duration of the sample sweep 508 (in this case 230 ns, as mentioned above) and the sample sweep period 510 (in this case 333 ns, as mentioned above) are shown. A dwell time 512 and a total sweep time 514 are also shown.

As mentioned above, the range in space over which the sensor scans and samples is divided into range bins. The receiving unit scans this range by adding a small time offset to each sample, effectively offsetting the receiver unit's PRF clock, and the rate at which the range is scanned is determined by this offset. The update rate for the sensor is 40 Hz.

The timebase control 262, which controls the timing of the sampler 248 and sample and hold 258 components shown in FIG. 10 (as well as providing a sample pulse for the receiver-side processing unit 260), performs the necessary clock adjustments mentioned above.

The bandwidth of the detector output is 40 kHz (in the same order of magnitude as audio frequencies). The sample output bandwidth is determined by the scan rate, the receiver and transmitter clock difference (which can be kept to within 1 part per million, or ppm) and any Doppler frequency shift caused by movement of the transmitter relative to the receiving unit.

Assuming a maximum relative speed of 10 meters per second between the transmitter and receiver (which a safe assumption for the majority of applications), a Doppler frequency shift of only 400 Hz would be produced, which is negligible. The sample output bandwidth is also determines the time spent in each range bin—the dwell time, or number of samples taken at a single range bin. The preferred embodiments employ a dwell time of 12 μs, corresponding to 36 samples per range bin, but other dwell times may be used.

The remaining factor influencing the choice of sample output bandwidth, the clock difference between the receiver and transmitter, will now be discussed.

The frequency accuracy of the tag (that is, the closeness of the match between the receiver and transmitter clocks) determines, amongst other things, the amount of processing which is required for a given bandwidth signal in order to give a good signal-to-noise ratio (SNR). Higher SNRs can provide greater accuracy and increase the detection range of the system; lower SNRs can cause the system progressively to fail.

After investigation, it was found that a frequency difference between the receiver and transmitter of less than 1 part per million (ppm) was possible to achieve and gave a sufficiently high SNR to achieve a 10 meter detection range. At the nominal 12 MHz pulse repetition frequency (PRF), the 1 ppm frequency difference creates a 6 kHz frequency error at 6 GHz. The effect of the frequency error is that during the time the receiver sampler sits at a range 'bin' (that is, throughout the 12 μs dwell time during which 36 subsamples are taken), the received (radio frequency range) signal phase changes, effectively modulating the sampler output.

For example, during the 'integration time' of 12 μs as the signal is sampled and held, the phase of the 6 GHz input signal has changed approximately by 26°. The principal effect of the phase change is to reduce the amplitude of the detected signal, in the process worsening the SNR of the system, but the amplitude reduction caused by the 260 phase change over the 12 μs dwell time was found to be acceptable. Significantly larger phase changes, for example caused by increasing the dwell time, can deteriorate the SNR to the extent that the signal is effectively no longer detected.

Another consequence of the frequency drift is range error. This range error is apparent when the transmitting tag is close to one sensor and far from another. This range error is caused by the sequential time sampling of the receivers: the time taken to measure a time difference of 33 ns (corresponding to the 10 meter range) is 3.5 milliseconds (ms). During this time, the tag will have drifted 3.5 ns (1 ppm of 3.5 ms) relative to the short-range receiver, giving a range error of 1 meter. This range error is acceptable for some purposes, but not for others. However, this error can be compensated for by measuring the transmitter and receiver PRF difference accurately from the information present in the receiver data. This can be measured to better than 1 ns in one sweep of 24 ms, giving a frequency error of 0.02 ppm and a range error of 1.4 cm.

Calibration of the receiving units is used significantly to improve the expected range error, as is now described below.

The Calibration of the Receiving Units

The range error mentioned above can be compensated for by determining the transmitter and receiver clock phase differences from the information present in the data output by the plurality of receiving units in the system, and then correcting for the phase difference thus found.

In the preferred embodiment, a common clock is provided to all of the receiving units, to synchronise the detection. With reference to FIG. 14, the effect of the common clock signal is to align the Start of Scans (SoSs) 460, 464, 468 and 462, 466, 470, and so on, so that the sample sweeps of different receiving units can be directly compared.

In a variant of the preferred embodiment, at least one reference tag is provided, with the receiving units being asynchronous (that is, not linked by a common clock signal). The reference tag(s) are transmitters of the type used in the objects to be tracked, and which are fixed to known reference locations. The reference tag(s) are channelised (that is, they transmit with a characteristic PRF, for example) in the same way as the active object being tracked. Each receiving unit not only tunes in to the signal of the object of interest, but also tunes in to the reference tag(s) as well, and passes all of the information to the control unit.

The selection of PRF so as to switch between the reference tag(s) and the object of interest is undertaken under the control of the control unit, although in variants of the preferred embodiments the receiving unit is able to multiplex and output substantially simultaneously the received signals relating to the reference tag(s) and object of interest. In a yet further variant, the PRFs relating to the reference tag(s) and the object of interest are detected simultaneously, for example using multiple detection paths and/or detection clocks, under the control of the receiving unit.

The clock signal is provided from a detection clock located in the control unit and is set at a predetermined multiple of the desired PRF frequency. The timebase circuits in the receiving units then drive an internal clock using the external detection clock, dividing down as appropriate and occasionally ignoring pulses so as to advance the phase of their internal clock (to move to another range bin, as described above).

Since the positions of the reference tag(s) and the receiving units are known, so too is the interval between the arrival of the reference tag pulse at the different receiving units. Using the data received from the receiving units, the control unit can then compare the measured intervals to the theoretical intervals and so determine the relative phases/clock offsets of the detection clocks in each receiving unit.

By using either calibration method to synchronise the receiving units, the control unit can then produce a more accurate estimate of the clock offset between each receiving unit and the transmitter and also obtain a secondary position estimate by analysing the interval between reception of the object transmitter signal at each receiving unit. In the preferred embodiments, the clock offset between each receiving unit and the object transmitter can be measured with an accuracy of 1 ns, giving a frequency error of approximately 0.02 ppm and a resulting range error of approximately 1.4 cm.

A positioning accuracy in the order of 1-2 cm, which is a considerable improvement over the uncalibrated accuracy of approximately 70 cm, is adequate for the vast majority of applications.

The channelisation of the transmitted signals will now be described in more detail.

The Channelisation of the Transmitted Signals

In the preferred embodiments, tag identification (that is, the identification of signals transmitted by a transmitter associated with a particular object) is achieved by having each object transmit a signal at a different pulse repetition frequency (PRF). The receiving units are then 'tuned in' to the relevant PRF by the timebase circuitry under the control of the control unit, optionally via a common clock signal (see above).

The desired tag signal, corresponding to the selected object, whose PRF matches that of the receiving unit detection clock (albeit at a different integer frequency multiple), will be received normally, as described above. Other tag signals, having different, incompatible PRFs, will have a different base band frequency to the matched signals, and these signals will be rejected by the frequency filtering in the receiver.

With a receiver PRF of 3 MHz (chosen to be a quarter of the 12 MHz transmitter PRF, as explained above) giving spectral line spacing at 3 MHz, up to 12 different tags can be discriminated, with each tag PRF having a frequency separation of 250 kHz. Given a pulse frequency of approximately 12 MHz, the 250 kHz frequency separation is designed to result in a rejection of at least 48 dB for a 3rd order lowpass filter with a 40 kHz cut-off frequency. As mentioned above, the dynamic range required by the receiver for a maximum-range tag (at 10 meters) with a near interfering tag (at 0.5 meters, say) is 26 dB. Thus a closer tag spacing can be chosen, but at the expense of signal-to-noise ratio.

In the preferred embodiments, with reference to FIG. 10, a fixed receiver PRF of 3 MHz is generated by the timebase control 262, irrespective of the transmitter PRF. The PRF frequencies between 9 MHz and 12 MHz are shifted to baseband frequencies between 0 and 3 MHz due to sampling aliasing effects. As noted, the signal is then downsampled into the audio frequency range, and the signal of interest is filtered out by the audio-frequency band pass filters 252, 256 of the receiving unit, which filters are tuned to the frequency band of interest.

The detected signal lies within the bandpass-filtered frequency range, but because the receiving unit and transmitter are asynchronous (leading to the frequency errors mentioned above), its exact frequency may vary within the filtered frequency range, causing potentially reduced signal-to-noise ratios (SNRs). In order to improve to SNR (and hence the performance overall), the processing unit undertakes certain preprocessing of the signal, including obtaining an estimation of the frequency error, and then tailoring the processing routines to the expected signal frequency. Further details of the preprocessing are given later.

In a variant of the preferred embodiment, the band pass filters 252, 256 are instead fixed, and instead the receiver PRF is varied between 0 and 3 MHz to match the transmitter PRF. Due to the high frequencies involved, this can be more difficult to achieve but by matching to the input frequency can reduce the bandwidth required in later stages.

The processing applied to the signals will now be described.

The Processing of Signals

As mentioned above, the receiver-side processing unit 260 for each receiving unit 200 (or, in variants mentioned above, the control unit 300 itself) takes as its input a plurality of sampled, filtered and time-stretched signals corresponding to each receiver channel (one per antenna in the receiving unit sensor array). Each of the signals input into the receiver-side processing unit 260 contains a narrow band of frequencies corresponding to the desired tag signal. Information is then passed to the control unit 300 by each receiving unit 200, 202 (and so on) to allow the processing to be completed.

A detection algorithm is applied by the receiver-side processing units 260 and control unit 300 (as appropriate) to the radar data, and an output is produced which specifies the location of the object being tracked.

For computation efficiency, the radar data is divided into in-phase (I) and quadrature (Q) components, and deinterleaved into complex number pairs. This can reduce the range sweep time.

In variants of the preferred embodiment, further audio frequency filtering is applied to the sequence ($I_N$, $Q_N$, $I_{N+1}$ . . . etc).

Matched Filter

Another part of the detection algorithm uses a matched filter to enhance the detection of the pulse waveforms. The output y[n] of the matched filter for a given input x[n] is given by:

$$y[n] = h[n] * x[n] = \sum_{k=0}^{N-1} h[n-k]x[k]$$

where h[n] is the impulse response of the filter.

By setting the impulse response h[n] as the reverse of the expected signal waveform (that is, the shape of the individual pulses transmitted by the transmitter, otherwise known as the matched filter prototype), it can be shown that the output of the filter is equivalent to cross-correlating the input signal with the expected signal waveform. This can provide a computationally efficient method of detecting received pulse waveforms, and is used as a preprocessing method to improve the signal-to-noise ratio of the signal being processed.

The more narrowband a system using a matched filter is, the more it improves the SNR. It gives the optimal SNR in additive white Gaussian noise. There is an offset in range equal to the length of the matched filter impulse response. For narrowband signals the range resolution is smeared in time by a factor of two, leading to a halving of the resolving power in range.

In practice, the impulse response of the matched filter is set by fitting the expected signal waveform, or the reverse of the expected signal waveform, to a function. Good results can be obtained by fitting a number of points, say 10 or an appropriate number for the particular waveform, on the envelope of the expected signal waveform, or the reverse of the expected signal waveform, to a quadratic or exponential function.

The matched filter is applied separately to the radar data produced by receipt of a pulse at each receiving unit. For the radar data of each receiving unit the matched filter is applied at a series of time shifts with respect to the radar data, and the output of the filter for each time shift is compared. By finding the time shift corresponding to the maximum output of the filter, a time of receipt, or a phase, for the received pulse is ascertained; by comparing in phase and quadrature components at the maximum output of the filter, a phase for the received pulse is ascertained.

Thus times of receipt or phase for received pulses at each receiving unit are ascertained, and those times of receipt are then used to obtain positional information as described, namely by comparing those times of receipt/phases from each receiver to determine angular positional information.

In the preferred embodiment, a number of different matched filter prototypes and/or corresponding impulse responses are stored, and the appropriate matched filter prototype or impulse response is selected in dependence upon the expected characteristics of the pulses received at the receiving units. The technique functions more successfully where the form of the prototype matches closely the form of the received signal.

Matched filtering is used in both the passive and active modes of operation of the system.

In the active mode, different matched filter prototypes correspond to different tags, in the case where different tag transmitters transmit pulses with different characteristics.

As described in more detail below, in the passive mode the pulse length of pulses transmitted towards the object is varied, in particular embodiments, in dependence upon the distance of the object from the receiver or in dependence upon the particular application of the system. The matched filter prototype or impulse response is varied so as to match the particular pulse length employed.

If the object or receiver is moving then the pulse length is changed, in certain circumstances, in the course of a set of measurements, depending on the change in relative distance of the object from the receiver. A corresponding change is made in the matched filter prototype or impulse response used.

By way of example, the qualitative effect of some matched filtering on radar data in an I and Q sampled system is now discussed with reference to FIGS. 19 to 25.

It is assumed for the purposes of the example that the IQ signal is basebanded first such that a received pulse appears in I and Q channels with constant phase (ie zero frequency offset). Matched filtering is then applied to I and Q in parallel.

In the present example a single I or Q channel is considered, and the impulse response is obtained by fitting the reverse of the expected signal waveform to the function $y=\exp(x*a)*(x^b)$ over the interval $x=[0,1]$, where a and b are shaping constants which allow rise and fall times to be tuned. The sampled impulse response is normalised for 0 dB gain at DC.

Figure 19:
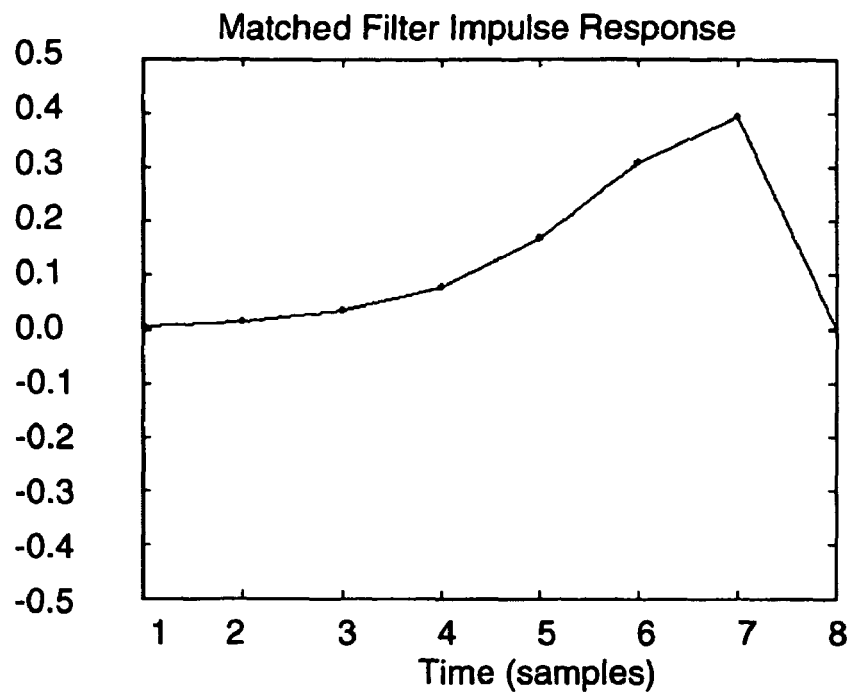
FIGS. 19 to 24 are various signals illustrating the operation of a matched filter.

FIG. 19 shows a fitted matched filter impulse response for a 2 ns, 6 GHz pulse with 12 cycles in the pulse. Using a sampling rate of $3\pi$ radians per sample, 8 points were obtained including end zero points. The reverse of the pulse was fitted to $y=\exp(x*a)*(x^b)$, giving $a=-8$ and $b=1.3$ as plotted in FIG. 19.

Figure 20:
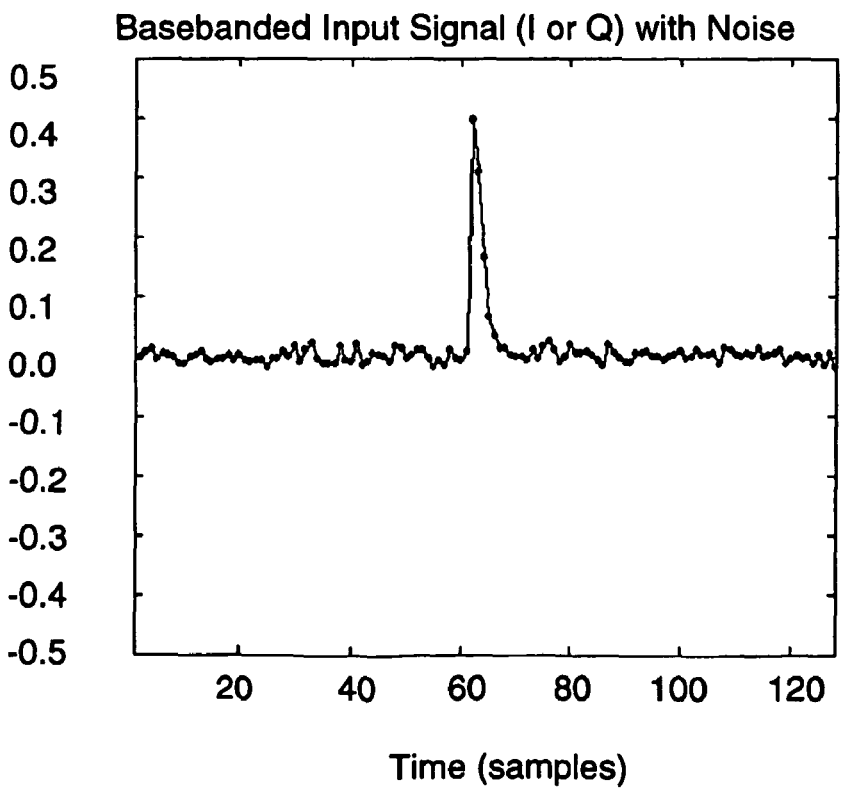
Figure 21:
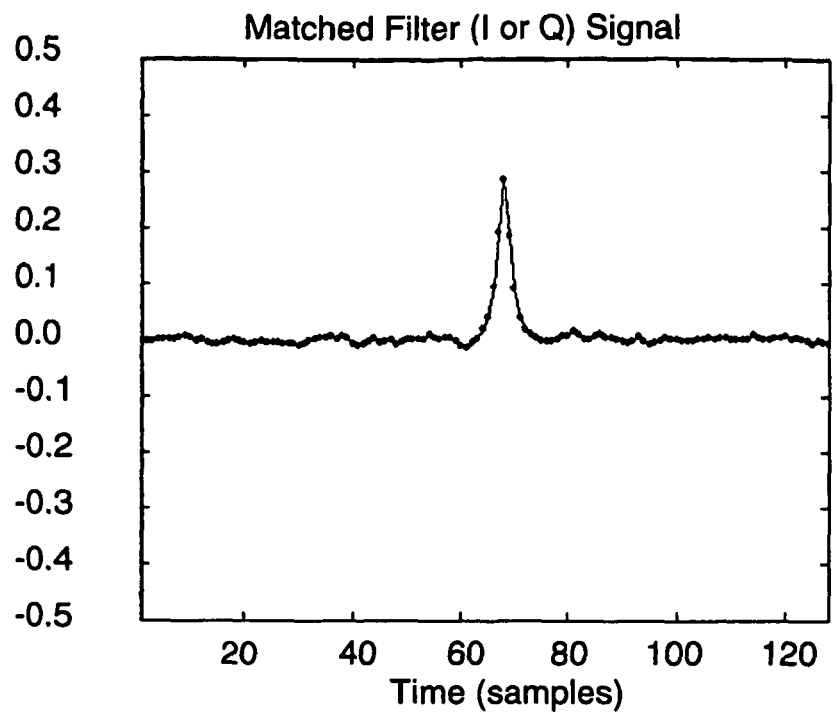

FIG. 20 shows a basebanded input signal (I or Q) with noise, for a 2 ns, 6 GHz pulse with 12 cycles in the pulse, and FIG. 21 shows the signal of FIG. 20 after application of the matched filter using the matched filter impulse response of FIG. 19.

Figure 22:
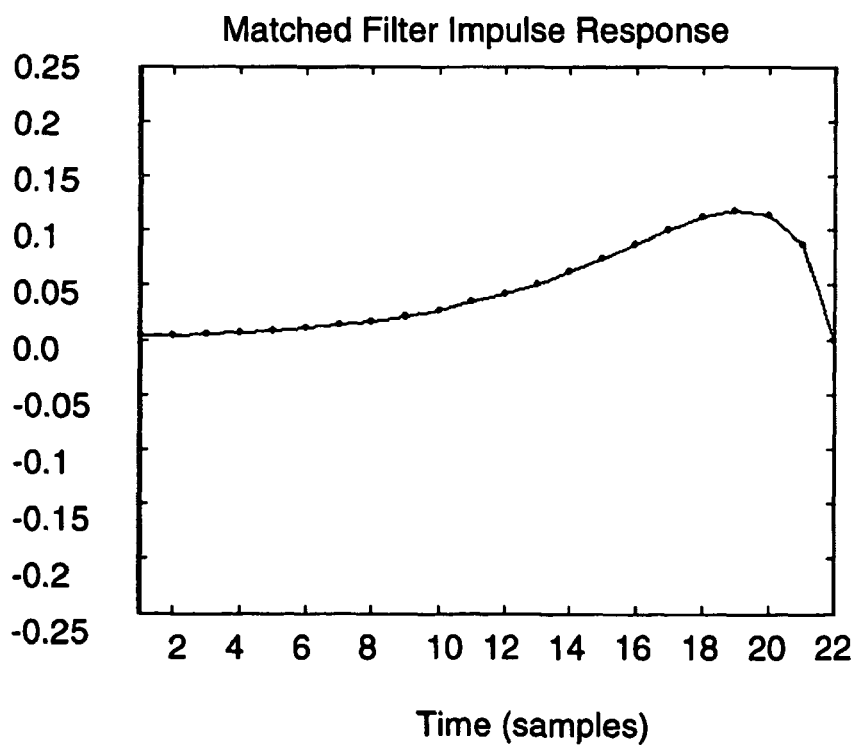

FIG. 22 shows a shows a fitted matched filter impulse response for a 20 ns, 6 GHz pulse with 120 cycles in the pulse. Using a sampling rate of $12\pi$ radians per sample, 22 points were obtained including end zero points. Again, the reverse of the pulse was fitted to $y=\exp(x*a)*(x^b)$, giving $a=-6$ and $b=0.8$ as plotted in FIG. 23.

Figure 23:
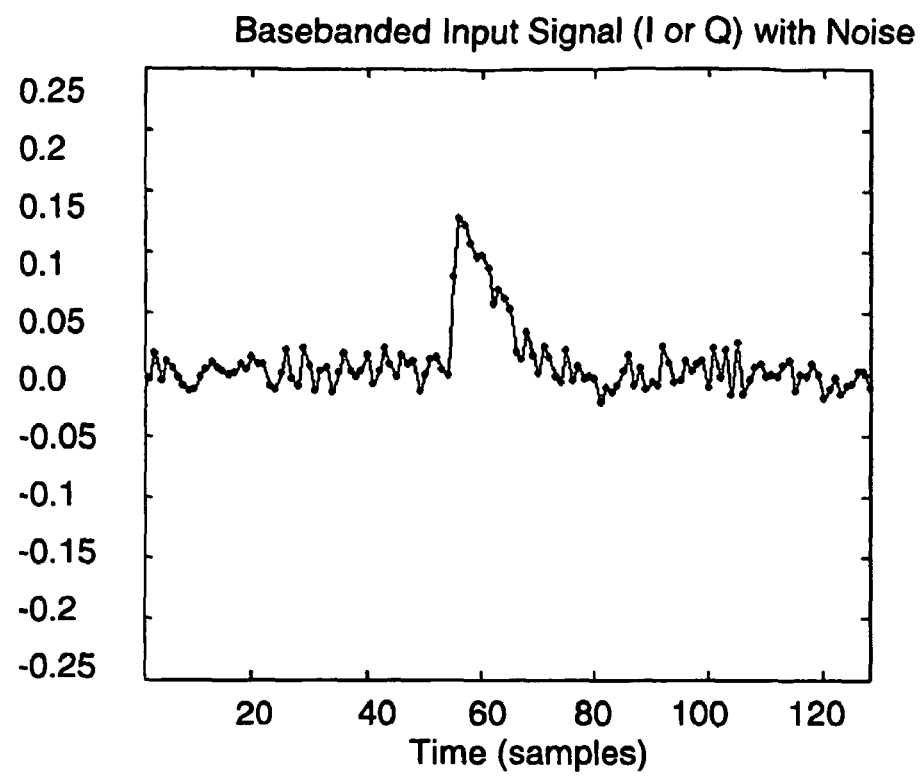
Figure 24:
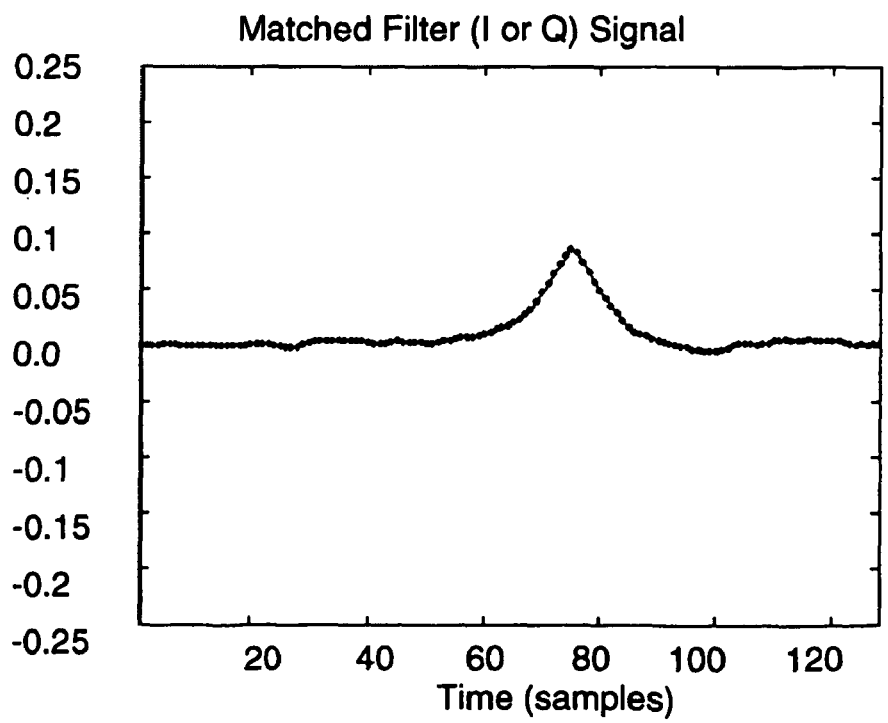

FIG. 23 shows a basebanded input signal (I or Q) with noise for a 20 ns, 6 GHz pulse with 120 cycles in the pulse, and FIG. 24 shows the signal of FIG. 23 after application of the matched filter using the matched filter impulse response of FIG. 22.

Figure 25:
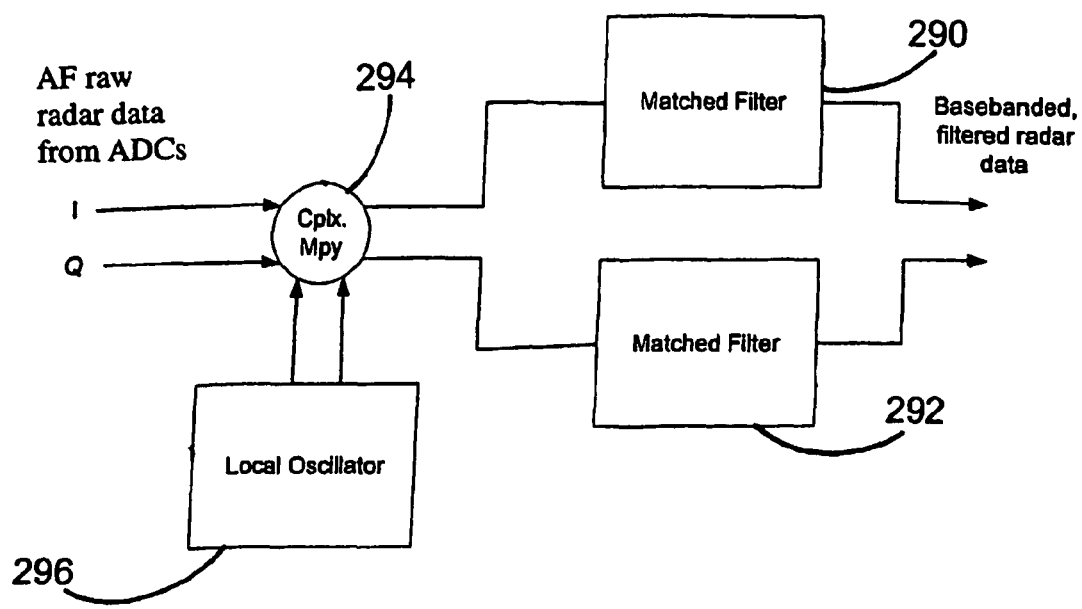
FIG. 25 illustrates the processing for data from one sensor using matched filters.

FIG. 25 illustrates the preprocessing for data from one sensor using matched filters 290 and 292; for N sensors, the figure would be replicated N times. Raw data frequency down-converted to the audio frequency domain is passed in In-phase and Quadrature form to a complex multiplier 294 fed by a local oscillator 296. The output is I and Q basebanded, filtered radar data bearing both phase and amplitude information.

In variants of the preferred embodiments, the matched filter operating on a signal received signal is replaced by cross-correlation between pairs of received signals. In one variant, a truncated cross-correlation process is used, using known properties of the received signals (such as the maximum interval which can be measured due to geometrical properties of the sensor array) in order to limit the computational expense of the cross-correlation process.

More details relating to the detection algorithm are given later. Now, the construction and operation of the differential timing sensor array will be described in more detail.

The Construction of the Differential Timing Sensor Array

Figure 16:
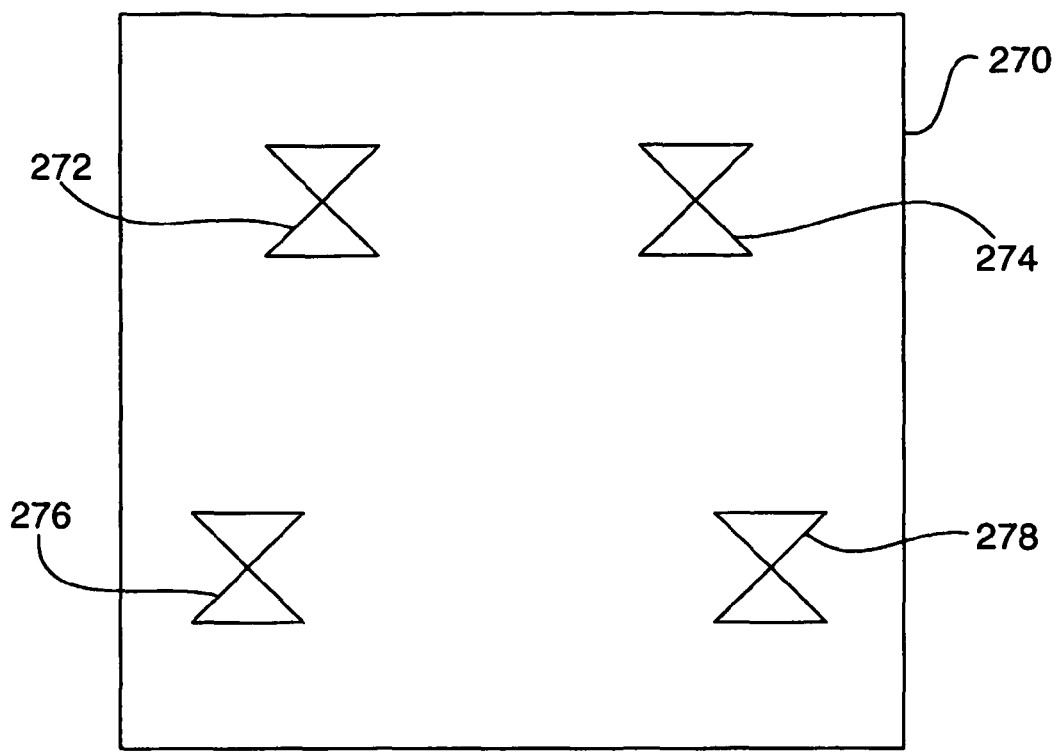
FIG. 16 is a plan view of a sensor array in a receiving unit.

FIG. 16 is a plan view of a sensor array in a receiving unit. In FIG. 16, the array substrate 270 contains four antennas 272, 274, 276, 278 formed on the substrate. The antennas 272, 274, 276, 278 are arranged in the shape of a non-rectangular quadrilateral in the plane of the array substrate 270 but different configurations are possible, bearing in mind that less symmetrical arrangements reduce the potential for ambiguity when measuring angular positions.

Figure 17:
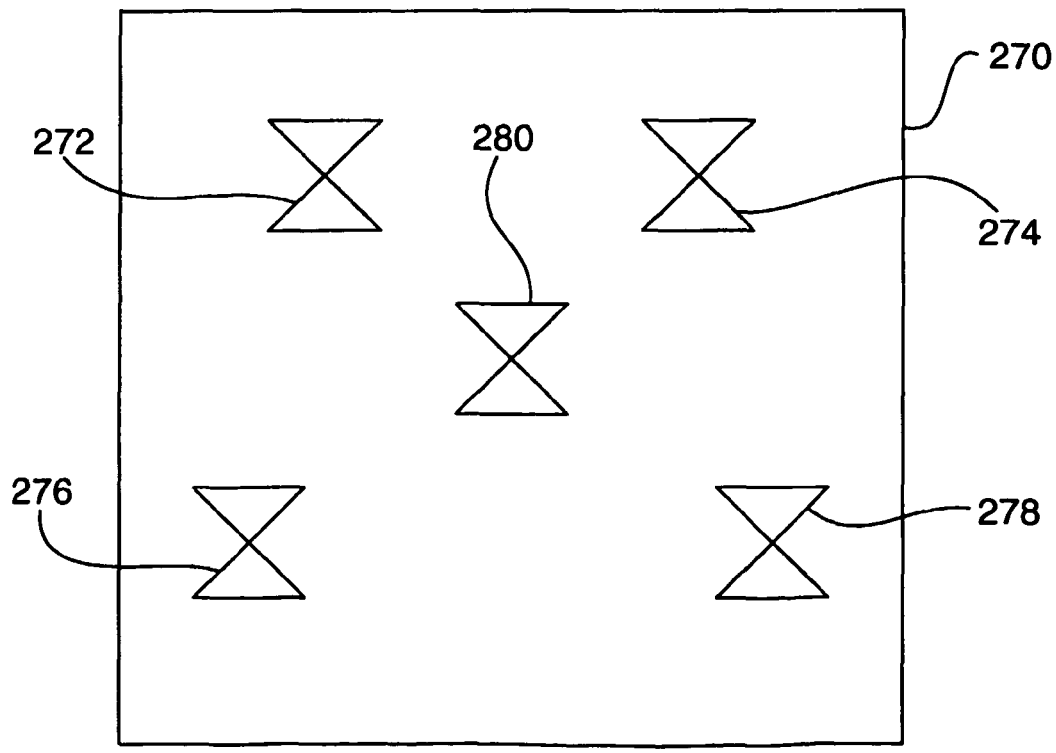
FIG. 17 shows a variant of the system of FIG. 16 including a transmitting component.

FIG. 17 shows a variant of the system of FIG. 16 including a transmitting component, to allow the radar system to operate in either passive or active mode (or both). In FIG. 17, an array substrate 270 contains five antennas 272, 274, 276, 278, 280 formed on the substrate in a non-rectangular quadrilateral formation. The central antenna 280 serves as a dedicated transmitting antenna, but it may also serve as a fifth receiver. Alternatively, a fifth (or further) receiver may be provided to operate in receive mode only (increasing the complexity of the receiving unit but also increasing the accuracy).

With respect to the system of FIG. 16, assume now that there is an object located at distances R1, R2, R3 and R4 from the receiving elements 272, 274, 276, 278 respectively.

If an object is located on the axis of the array 270 (sometimes referred to as "the boresight"), it is equidistant from all four antennas 272, 274, 276, 278, with the result that it will arrive at all four antennas 272, 274, 276, 278 simultaneously.

On the other hand, if the object is located off-axis, for example at a location with azimuth φ and elevation θ, there will be a time difference of approximately Dv sin θ/c between the signals arriving at vertically spaced receiving elements of the array 270 and a time difference of approximately Dh sin φ/c between the signals arriving at horizontally spaced receiving elements of the array 270 where Dv and Dh are, respectively, the vertical and horizontal distance between receiving elements in the array 270. In the above, c is the speed of light.

More specifically, the times at which the reflected signals will be received by the receiving elements are times Tr1, Tr2, Tr3, Tr4, respectively:

$$Tr1=(2R5+(-D14\sin(\theta)+D12\sin(\phi)/2)/c$$

$$Tr2=(2R5+(-D23\sin(\theta)-D12\sin(\phi))/2)/c$$

$$Tr3=(2R5+(D23\sin(\theta)-D34\sin(\phi)/2)/c$$

$$Tr4=(2R5+(D14\sin(\theta)+D34\sin(\phi)/2)/c$$

where Dxy is the distance between different sensors x and y, and R5 is the distance between the transmitter (not shown) and the sensor array 270, these equations being approximations for small angles. The above equations can be solved (without knowledge of R5, which cannot easily be determined due to the asynchronicity of the transmitter and receiving unit) to obtain the angles θ and φ.

Figure 18:
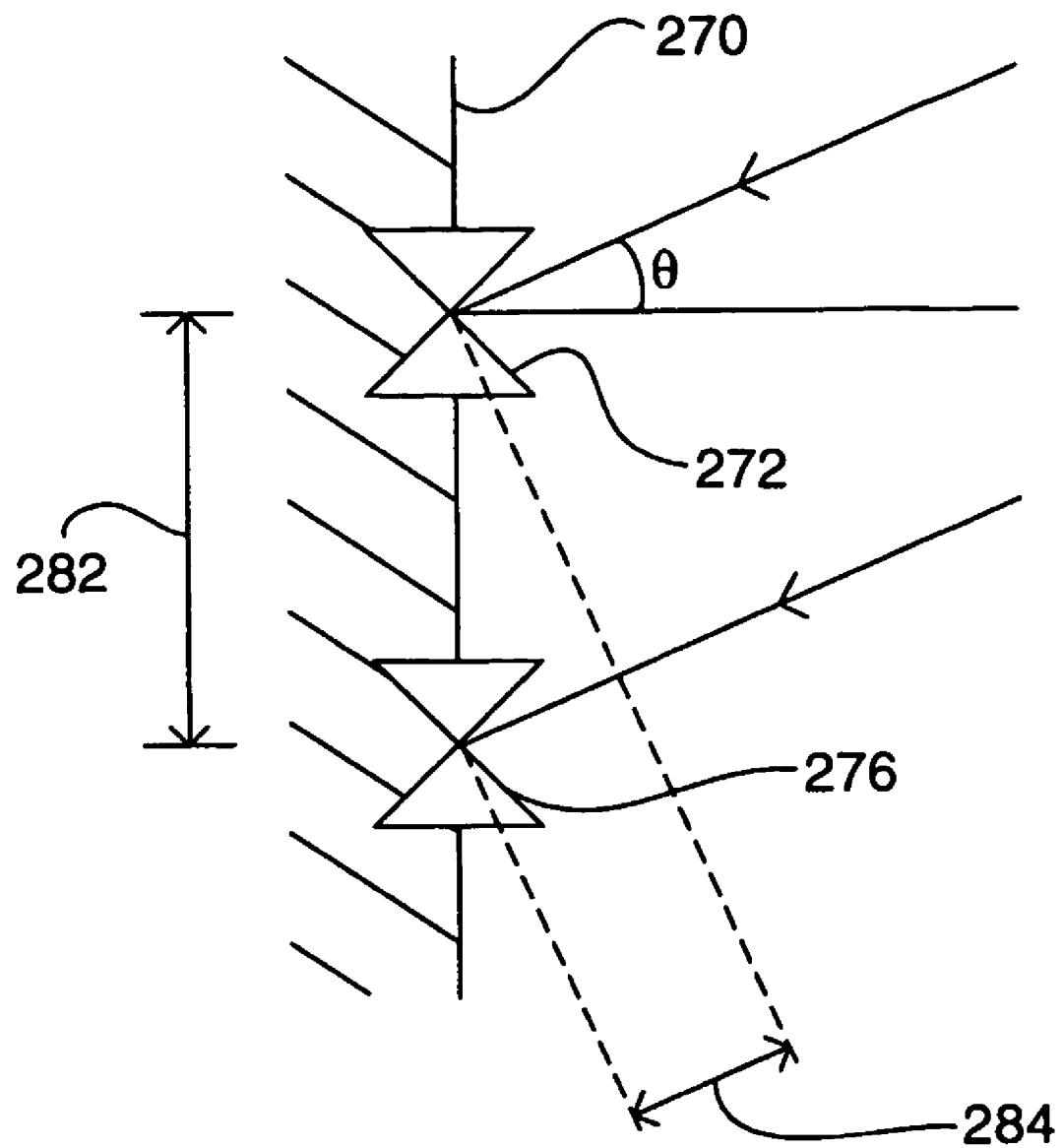
FIG. 18 is a side-view of the sensor array in operation.

FIG. 18 is a side-view of the sensor array in operation. In FIG. 18, the antennas 272, 276 are again mounted on the substrate 270, and receive a signal from an object as indicated. The spacing between the antennas 282 is sufficiently small compared to the chosen minimum detection range that the incident signal paths are essentially parallel. It can be seen that the signal arrives at the antennas 272, 274, 276, 278 at different times dependent upon the transmitting object's three-dimensional location with respect to the receiving unit. The elevation angle θ and the signal path length difference 284 (which is proportional to the time delay between reception of the signal at both antennas 272, 276) are shown.

It will be observed that there is some redundancy in the information received from an array 270 of four or more elements. This may be dealt with by selection or by an averaging or a weighting process.

It is also observed that the resolution of the array begins to degrade as the angle-of-arrival exceed 45 degrees off boresight. At 90 degrees off boresight the angular resolution is reduced (since, as can be appreciated from the geometry of the system, relatively large angular perturbations of an object around this position causes relatively small changes in the differential timing).

Correspondingly, if an object in the system is close to 90 degrees off boresight with respect to one of the receiving units, the displacement resolution can be reduced. This problem can be overcome by careful placement and orientation of the receiving units in the system so as to ensure that the transmitting objects fall as close as possible to above 45 degrees off boresight in respect of at least two receiving units, for all possible locations of the object.

Passive Mode Operation of the System

The system is designed to operate in one of two modes: active and passive. In the active mode, the system scans for signals transmitted by active objects (the tags) and determines the position of the tags using a minimum of two sensors. In the passive mode, operable concurrently with the active mode, the system scans for anomalous passive objects, that is, unknown objects which do not have an active transmitter associated with them. In variants of the preferred embodiment, the system operates in passive mode only.

In the passive mode, the transmitting element 280 in the sensor array 270 of a receiving unit 200 radiates a sequence of pulses. Part of this radiation is reflected back from the intruder and received by the array of receiving elements 272, 274, 276, 278 in the sensor.

The radiation received by the array of receiving elements in the passive mode is processed in similar ways to that received by the receiving elements in the active mode, and angular position is similarly obtained.

One significant difference between operation of the system in active and passive modes is that, in the active mode, the distance of the object from which radiation is reflected can be obtained from the time difference between transmission of a pulse from the transmitter and reception of the reflection of the pulse at the receiving units. A measurement of the distance of the object from the receiving units can be combined with a measurement of angular position to obtain the position of the object.

The matched filtering process, mentioned above, is used in passive mode operation as well as active mode operation.

Typically, a digital baseband conversion process followed by a matched filter (in the form of a digital low pass filter) is applied to the in-phase and quadrature sequences.

The matched filter impulse response is obtained by fitting of the expected signal waveform, or an envelope of the expected signal waveform, as described above.

The expected signal waveform is of course dependent upon the waveform of the transmitted signal, and it is a feature of the preferred embodiment operating in passive mode that the transmitted signal is varied depending on the conditions of the measurement and characteristics of the object to be detected.

In variants of the preferred embodiment, various aspects of the system are varied, or chosen, to suit particular applications. Such aspects include pulse length, the series of pulses (for instance the length or pulse spacing of the series), and the matched filter (for instance in the form of a digital low pass filter) used. All can be varied and optimised to suit a particular radar or tag tracking application.

Selection of appropriate pulses and other system characteristics depends on, for example, the requirements for signal to noise and resolution for an intended application. The transmitted pulse width can be extended and the matched filter (in the form of a digital low pass filter) extended to increase mean transmitted power and reduce effective noise bandwidth, or the local oscillator pulse width can be extended to reduce actual RF noise bandwidth.

In a variant of the preferred embodiment, an FIR filter can be applied to an extended pulse to whiten the response and enhance the leading edge of the received signal.

Typically, a short or long transmitted pulse is selected, and then corresponding short or long local oscillator pulses and different matched filter impulse responses are chosen. The choice of transmitted pulse, local oscillator pulse and matched filter impulse response is made to give optimised responses in terms of range, resolution and precision depending on the application.

For certain applications, the pulse length is varied in dependence upon distance of the object from the receiving elements. A longer, higher power pulse might be used if the object is a relatively long way from the receiving elements (that is, for extended range) and a shorter, lower power pulse might be used if the object is a relatively short distance from the receiving elements.

The longer, higher power pulse will typically give higher signal to noise but lower resolution, and the shorter, lower power pulse will typically give higher resolution but lower signal to noise.

In the case of automotive applications for instance, if the system is to be used as a parking aid a short pulse is chosen, and a series of pulses and a low pass filter appropriate for motion at say 0.5 m/s are used. For pre-crash sensing a longer pulse can be used to give less fine range resolution, but to accommodate speeds up to 70 m/s.

The matched filter used is varied in accordance with the change in pulse characteristics, and typically various matched filter impulse responses are stored corresponding to the various pulses which may be used.

Some examples of pulses used in one particular application of the system, for detecting the presence of a vehicle at different ranges, are provided in the Table 1 below.

TABLE 1

| Range | 50 m | 25 m | 10 m | 5 m |
|---|---|---|---|---|
| Resolution | 3 m | 1.5 m | 0.6 m | 0.3 m |
| Pulse Length | 20 ns | 10 ns | 4 ns | 2 ns |
| Bandwidth | 100 MHz | 200 MHz | 600 MHz | 1 GHz |
| No of cycles in pulse at 6 GHz | 120 | 60 | 24 | 12 |
| No. of cycles in pulse at 24 GHz | 480 | 240 | 80 | 48 |
| Mean power increase | 10 (10 dB) | 5 (7 dB) | 2 (3 dB) | 1 (0 dB) |
| Local oscillator pulse | 20 ns | 10 ns | 4 ns | 2 ns |
| Relative sensitivity compared with short local oscillator pulse | 10 (10 dB) | 5 (7 dB) | 2 (3 dB) | 1 (0 dB) |
| R.F bandwidth | 100 MHz (10 dB) | 200 MHz (7 dB) | 500 MHz (3 dB) | 1 GHz (0 dB) |

Figure 26:
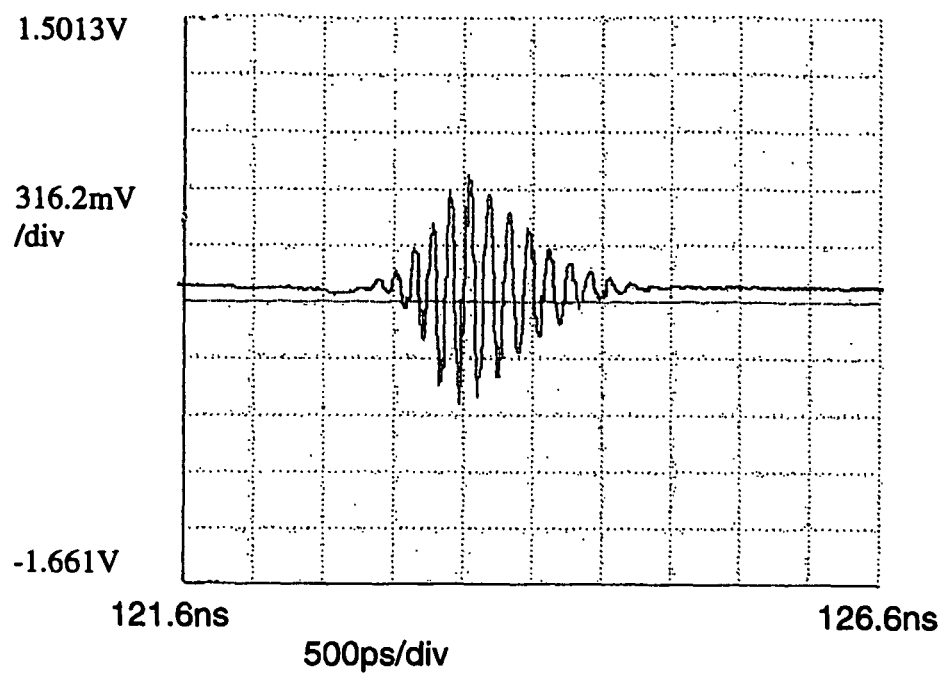
FIGS. 26 and 27 are examples of pulses transmitted in a passive mode of operation.
Figure 27:
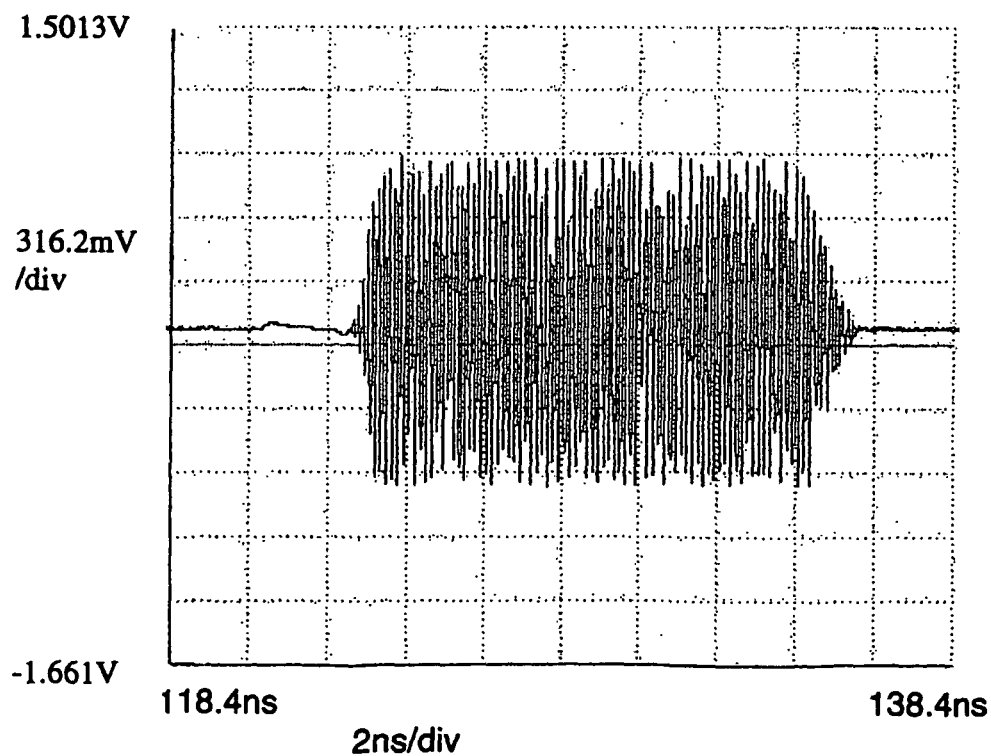

Examples of pulses transmitted in passive mode operation of the system are illustrated in FIGS. 26 and 27. FIG. 26 shows a roughly 2 ns, 6 GHz pulse, and FIG. 27 shows a roughly 10 ns, 6 GHz pulse with 60 cycles in the pulse.

Various applications of the positioning system will now be discussed.

Applications of the Positioning System

The positioning system described above is particularly suited for high security environments where it may be necessary to be able to track staff and objects around a designated area. In addition to tracking staff and objects it may also be required that the system detect intruders.

The positioning system described above can be used to fulfill these requirements. In such a system, both staff and objects in the designated secure area are fitted with transmitting tags according to the design set out above. As previously mentioned, the tags have a radiating element 104, radiating a sequence of pulses, and the receiving units 200, 202 and so on are of the type incorporating a transmitting element 280, as shown in FIG. 17.

The system is designed to operate in one of two modes: active and passive. In the active mode, the system scans for signals transmitted by active objects (the tags) and determines the position of the tags using a minimum of two sensors. In the passive mode, operable concurrently with the active mode, the system scans for anomalous passive objects, that is, unknown objects which do not have an active transmitter associated with them.

As mentioned above, in the passive mode, the transmitting element 280 in the sensor array 270 of a receiving unit 200 radiates a sequence of pulses. Part of this radiation is reflected back from the intruder and received by the array of receiving elements 272, 274, 276, 278 in the sensor. The signals are then processed to identify candidate objects. These candidate objects are then compared to known objects, such as fixed structures in the vicinity of the receiving unit, or objects already identified by transmitting tags. An alert is generated if any objects are detected which do not correspond to the list of known objects (that is, objects identified as intruders). The anomalous object can then be tracked around the detection space surrounding the receiving unit, for example so that the exit route taken by the intruder can be ascertained.

A system consisting of two or more receiving units may be used to cover the designated area and provide positional information on tags and intruders. However, only one receiving unit is required in the passive mode, since in that case the transmitter and receiver are synchronised, allowing a pseudorange to be determined which is proportional to the measured interval between transmitting and receiving a pulse.

In this example, the multiple sensors communicate with each over a communications link, which is either wireless or wired depending on the specific location of each receiving unit. One receiving unit acts as a master sensor, receiving all of the measurement information from each receiving unit and calculating the object position. As explained above, the pulse trains transmitted by the object tags and the transmitting element in the receiving unit are coded (channelised) to prevent interference with other tags.

Another example of use of the positioning system is in the context of a vehicle. In this case, the technology and functional operation is essentially the same in the previous example. However, in this system the sensors are used as a reversing aid, or as an intrusion detection system.

In this example the sensor operates in a passive mode (that is, detecting objects which do not incorporate a transmitter) to track objects surrounding the vehicle while the vehicle is in motion. In a second mode of operation, operable concurrently with the first mode, the sensor detects active tags such as a key fob. In this case, the vehicle may be parked and the driver armed with the tag could be approaching the vehicle. Once the driver is within a designated area relative the vehicle, the receiving unit mounted in the car, having detected the position of the key fob and thus authenticated the driver, can activate an array of functions, such as unlocking the door closest to the driver.

The positioning system has many further potential uses, including, but not limited to, location-based information delivery systems, mobility-based commerce systems, precision measurement systems for surveying and measurement. The system can also enable portable high performance, high-resolution radar systems which can be range gated, have clutter rejection, possess high resolution, attain penetration results, and function as both imagers and sensors.

Further applications include through-wall sensing, radar security systems tracking movement, industrial sensing for robotic controls, automotive sensing for collision avoidance sensors, and monostatic and bistatic security bubbles for home and industrial security systems.

Furthermore, the system can be used where the is a requirement to determine positional information relating to both passive and active objects, particularly when there is no cabling to connect the objects and the receiving unit(s), and especially when the receiver and transmitter are asynchronous.

The positioning system can also be used in environments with multiple transmitting elements such as multiple tags and/or transmitter(s) within a receiving unit in the system, and when an ability to resolve range ambiguity is required (since, for example, the combined angular and differential timing readings can be combined). As noted elsewhere, in its simplest form, the system is able to resolve the position of an active object where the transmitter and receivers are all operating asynchronously with each other. There is no need to know the relative timing offsets between receiver and receiver and transmitter and receiver.

Communication with the Tag

In this section of the description, some terms are used in a different sense to the rest of the description. The element for which positional information is desired is referred to as a "tag", rather than an "object". The device which calculates position is referred to as a "base station" as well as a "control unit", and the "base station" incorporates the functions of the "receiving unit" of the rest of the description.

In addition to determining the position of the tag or active object as described herein, in many cases, there will be benefit in establishing communication with the tag such that messages can be transferred between the tag and the sensor/base station. This communication may in some cases be one-way communication of messages, but in many applications, two-way communication may be provided.

In one application a system includes multiple tags and a base station comprising sensors fitted with an UWB transmitter and receiver. The transmissions of the UWB transmitter may be time multiplexed. By doing so, channel density may be increased and/or battery power of the tag may be saved.

In such a case the base station or control unit may send a message to the tag. Such message may, for example, include a command for the tag to wake up, go into idle state or change PRF.

In another application, the tag may be associated with sensors which are adapted to collect data, for example data relating to the object associated with the tag transmitter. For example, a tag may be worn by an ill patient. The tag may be associated with a device for collecting ECG information relating to the patient. This ECG information can, using the method described, be relayed to a central monitoring system.

The base station may be adapted to send a periodic message to the tag, the message including a command for the tag to transmit information from the ECG sensor to a remote location. For example, the ECG data may be transmitted wirelessly back to the base station, or to a separate control/data collection unit.

In other applications, communication between different tags or the control unit is desirable. This communication could consist of data collected from sensors fitted to the tag, tag control information and/or real time audio/video data.

For these and other applications, a wireless radio link between the tag and receiver or between one tag and another tag would be provided to allow communication to take place.

One way of achieving this would be to fit a separate radio transceiver to the tag and receiving or control unit as necessary. This transceiver could work independently of the UWB transmitter used to determine positional information. Depending on the application, this transceiver could comprise a simple analogue radio or could comprise a more complicated digital radio system using, for example, BLUETOOTH or ZIGBEE technology. This secondary transceiver could be used to manage all the data flow and communications between tags and control unit. While the UWB transmitter and receiver (connected to the control unit) would continue to detect the tag, determine the position of the tag and/or track the tag.

Thus, in the example described above, where a tag is worn by a patient and is associated with ECG or other physiological sensors, information can be obtained both relating to the location of the patient and the patient's ECG information.

Transmitting Data with a UWB System Using Modulation or Encoding

In a preferred alternative approach to achieving communications between tags and the sensor/control unit using a separate radio transceiver, the UWB transmitter and receiver is used also as a radio link. In such an approach, the UWB radio system would provide both tag positioning/tracking functions and enable communication between the tags and control unit. An advantage of this is that only a single radio standard would be required, hence reducing hardware complexity, tag size, cost and or power consumption. Should the communications be in both directions the tag would require a UWB receiver in addition to the UWB transmitter.

Using PRF Modulation

To achieve the communications between the tag and control unit using a UWB radio system, the UWB emissions from the transmitter are modulated. In a first example, a pulse repetition frequency modulation technique is used.

Using the PRF modulation technique, two or more PRFs are used. By using two pulse repetition frequencies, a '0' or a '1' can be transmitted by the UWB transmitter, one bit at a time. Further, by using four PRFs, two bits may be transmitted at a time. In such a case PRF1 could represent a '0' and PRF2 could represent a '1'.

For example, in response to the data signal, the UWB transmitter is triggered at a rate of PRF1 or PRF2, so that when transmitting a '0' the UWB transmitter would be triggered n times at a rate determined by PRF1. The number of times n that the transmitter is triggered for a single bit and the PRF sets the data rate. Typically but not always, having a PRF of 2.5 MHz can support a data rate of 100 kHz.

Alternative Methods

In one alternative method for achieving communications between the tag and control unit using a UWB radio system, the tag (and/or control unit) transmits a pulse sequence which is interrupted periodically. From the transmitted pulse sequence, the positional information can be determined as before, but in addition to the directional information obtainable from transmitted pulse sequence, other information can be obtained by analysing the pattern of interruptions in the pulse sequence.

For example, a tag transmitter is arranged to transmit pulses in a particular sequence comprising emitting 10 pulses, followed by a period corresponding to 20 pulses when nothing is transmitted, followed by emitting a further 10 pulses, and so on. The control unit samples a period of 1000 pulses transmitted by the tag to track the position of the object. In the present example, the control unit receives the initial 10 pulses transmitted by the tag from which positional information can be determined and then nothing is detected for a period corresponding to 20 pulses, then a further 10 pulses are seen when further positional information can be determined.

Thus, in addition to the positional information determined, further information can be determined from an analysis of the pattern of pulses and no-pulses. In this case the pattern of 10 pulses, 20 no-pulses, 10 pulses can provide information. For example, the information may comprise an address code, for example relating to identity of the tag.

In a further example, the tag first transmits a start bit, followed by 8 pulses in succession. From analysis of the 8 pulses, an accurate determination as to the time between pulses can be made. Subsequently, the tag transmits a sequence of pulses in which two consecutive pulses (having the time between pulses as previously determined) indicates a "1" and in which two consecutive absent pulses (no-pulse) indicates a "0" (ie switch 2 pulses to indicate an on and 2 to indicate an off).

According to this alternative method, the nominal pulse frequency may remain constant.

By these various methods, information may be transmitted between the tag and the control unit.

One important piece of information which can be communicated from the tag to any receiver that might be in the vicinity using one of these methods relates to the identity of the tag. Thus the tag may be adapted to transmit pulse sequences to enable both its position and its identity to be determined.

A typical identifier is a MAC address or an IEEE 802.11A address; each device that is to communicate using such a protocol has an individual identifier. These individual identifiers can be determined using the methods described above.

In the case of such an identifier, and in other examples, the information to be communicated using the modulation or encoding of the rf transmission is usefully significantly lower in quantity than the resolution required from the tag encoding process itself. Hence it is often useful to modulate or encode the information at a rate that is slow by comparison with the rf pulse repetition rate, but which is of course still fast enough to transmit the relevant information.

A MAC address is useful if the system is in "localisation mode" for example where the tag is transmitting a UWB signal and the radar unit of the control unit is in receive mode so that the location of the tag can be determined accurately. The UWB radar signal transmitted by the tag is used at the same time to transmit an identifier relating to the tag. Hence one can determine very accurately where the signal is coming from and thus the location of the tag and also have an identifier for the tag so when later a broadcast message is received from that tag, but the position of the tag cannot be determined from the message, the MAC address can be used to identify the source of the message.

Messaging and Positioning

In overview, a method of coding (for example PRF coding described above) is used to transmit identification information, for example a MAC address, of the transmitting device to the receiving device. The receiving device receives the transmission including the MAC address and the information is subsequently decoded to determine the MAC address of the transmitting device.

The transmitting device, after transmitting the information relating to the MAC address, then switches itself into a communications mode, for example a standard DSRC mode, and broadcasts information to the receiving device, with information regarding the transmitting device. DRSC stands for Dedicated Short Range Communications, which is a block of spectrum in the 5.850 to 5.925 GHz band, allocated by the USFCC to enhance the safety and the productivity of the transportation system.

In accordance with this example, there are 2 different modes of operation:

1) UWB localisation mode in which the position of the transmitting device (tag) and its MAC address can be determined;

2) Standard communication mode in which messages can be transmitted from the transmitting device.

The standard communications mode may use a standard communications protocol (such as DSRC or IEEE 802.11A). The protocol is being used in the same spectrum as the signals used in the UWB localization mode. Such protocols use a different encoding to PRF encoding proposed above.

Implementation

Figure 28:
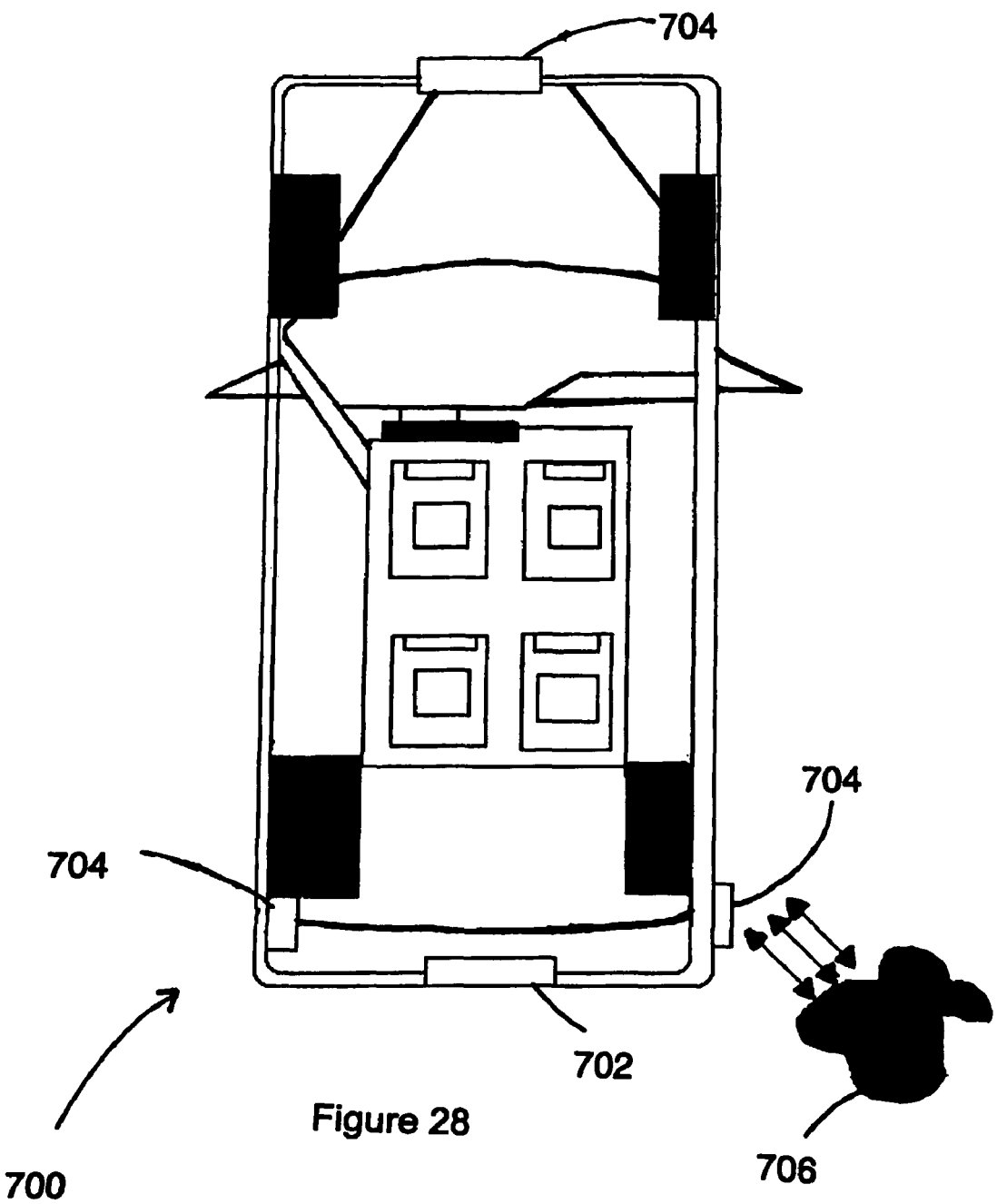
FIG. 28 shows an example of a combined position location and communication system.

In an example, illustrated as a vehicular application in FIG. 28, a short range radar 700 contains a transmitter 702 and a multi-channel receiver 704, and detects signals scattered by objects within its field of view.

The receiver is also capable of measuring the direction of emitters 706 (tags) within the same frequency range, even though they may not operate coherently with the transmitter. In this way, a key tag may be detected and its direction estimated, independently from the operation of the radar itself. Operation of the radar may be interrupted by the presence of such a tag.

The transmitter may be operated in such a way that the sequence of transmitter pulses is modulated, for example in delay, by modulating the pulses as to their pulse repetition frequency, perhaps in a pseudo-random sequence (as described above).

Where the sequence does not match that of a tag transmitter, the result of the presence of the tag will be an increase in noise depending on the length of the code and the power of the tag transmitter—in effect a pseudo random sequence will be received.

Where it does match, the output will be coherent, so, in effect, correlating sequences will be received, and an output provided from the receiver with the direction of the tag. This can then be used for identification and direction. In particular, the ID may be a Media Access Control address (MAC address), so as to enable the system then to communicate via a protocol such as DSRC.

Once identification has taken place, further (usually a different type of) modulation of the tag transmitter (for example in amplitude) can then be used to send messages. The modulation might be in the form of a DSRC communication or an IEEE 802.11A communication, which is a standard communication protocol for example, for vehicles. The transmitter may still transmit at essentially the same carrier frequency as for the steps of determining positional information and sending identification messages. Thus the same transmitter may be used for all of these steps and thus the apparatus can use the same front ends and antennas, at the least, to carry out all of these steps. This has the benefit of reducing the number of components required in the apparatus, which is particularly advantageous.

The DSRC protocol requires that both parties to the communication provide a MAC address, and hence requires that both parties include a transmitter in order that their address be transmitted to the other party. Thus, in such examples, both the tag arrangement and the base station arrangement include a transmitter and a receiver. In other examples, the communication is uni-directional, with the receiving party requiring no transmitter.

Taking the example of DSRC, the radar can be configured (a) to minimise the interference effect of the system, and (b) to communicate with the system.

(a) To minimise the mutual effects of the systems, the radar pulse repetition rate is adjusted to exactly 5 MHz. This will place a limit of 30 meters on unambiguous range.

(b) DSRC operates with signals that have spectral nulls at harmonics of 5 MHz, and the radar signals, when operating with fixed PRF, occupy very narrow bands at the harmonics of the PRF. Adequate isolation can be achieved for DSRC in this way.

To achieve interoperation with DSRC, the radar array is operated to steer a null in the direction of the DSRC transmitter. Two antenna elements receive the same signal, but shifted by different phases dependant on direction. By varying the phase, it is possible to find a phase and amplitude at which to sum those signals which will effectively null them—which is known as "steering a null". This removes interference, otherwise the array and transmitter would interfere, and achieves improved isolation.

The phase variation is achieved in post-processing. A separate processing channel can be operated to demodulate and output the DSRC signals, and control a DSRC On-Board Unit to complete the DSRC transaction.

Three dimensional positioning can be achieved if the tag is observed by two multi-channel receivers simultaneously, providing two independent directions that can be triangulated, as described elsewhere. In the context of a system for a vehicle, the multi-channel receivers might for example be on the front bumper and on the side of the vehicle. In preferred arrangements, the receivers are located at each of the four corners of the vehicle.

In order to achieve three dimensional positioning and two-way messaging the tag is equipped with a receiver that detects and locks on to the radar transmitter. The lock is provided by modulating a delay between when the tag receives the pulse from the transmitter and when its transmits its own pulse. By modulating that delay it is possible to send a signal to the receiver and vice versa.

The tag transmitter may use the same pseudo-random code as the radar, providing positive identification before messaging. Alternatively the tag and the radar may operate without pulse repetition frequency coding, but once locked may use delay modulation to transfer messages that establish identity (or no recognition).

Uses of Messaging and Positioning Information System

The methods described above are particularly effective where the distance between the receiver and the object including the transmitter device is not great, and in particular where the distance is up to several tens of meters.

One particular preferred application relates to vehicles. A receiver in a first vehicle includes a UWB radar system incorporating a transmitter and array of receiver elements and arranged to determine position information, as set out, for example, in EP 0 853 768. A second vehicle includes a tag/transmitter device.

The following steps are carried out:

1. Detect Tag

The UWB radar system in the first vehicle receives a signal from the tag/transmitter in the second vehicle.

2. Measure Position of Tag

The radar system of the first vehicle then determines the position of the tag of the second vehicle using techniques described herein.

3. Modulate to Send, Receive and Acknowledge Identification Information

The signal transmitted by the tag of the second vehicle includes a messaging frequency modulated into the PRF of the tag. The system of the first vehicle analyses the signal from the tag to determine the MAC address of the tag in the second vehicle.

4. Change to Communication Mode

The radar system of the first vehicle then transmits a request to the tag in the second vehicle for the tag to switch itself into a standard DSRC or IEEE 802.11A mode.

5. Establish Communication Via, for Example DSRC or IEEE 802.11A Protocol

On request of the radar system of the first vehicle, the tag of the second vehicle transmits standard information to the radar system of the first vehicle about the second vehicle's behaviour. The information may include, for example, information regarding the speed of the vehicle, braking status, performance of the vehicle as well as other information. The receiver system would thus be able to correlate the information regarding the second vehicle received through the DSRC channel with bearing and position information obtained from the position determination. This information can therefore be taken into account where developing braking strategies and accident avoidance strategies in respect of the first vehicle through adjustment of vehicle behaviour.

6. Synchronise PDA, Service Information etc.

The vehicle can replicate the information transmitted to a mobile phone, personal digital assistant, computer etc., so synchronising the data held in any relevant databases. Should the information be, for example, that the vehicle has blown a tyre, or has been tampered with, the appropriate people can be alerted.

7. Return to Positioning Mode

This can be initiated by a request from the radar system of the first vehicle, or can be effected automatically, for example after a predetermined time in DSRC mode.

In one particular example relating to vehicles, the presence of a vehicle in front would be detected by means of a radar system. The radar system could also receive an emergency message from the vehicle in front's tag, for example indicated that the vehicle was braking hard. Knowing the position of the vehicle in front, and the relative speeds of the two vehicles and/or other information, a strategy can be formulated as to how best to respond to the emergency situation.

In a further example, tags are mounted at the edge of the road. A radar system in a vehicle determines the positions of the tags and therefore the location of the side of the road. The tags at the roadside can also be adapted to transmit information to the system in the vehicle. Such information might include, for example, weather information, traffic information, information relating to road conditions, temperature information, and/or other information.

Another use relates to using vehicles or other carriers as directional repeaters. Since the position of vehicles can be determined accurately using methods described herein, messages can effectively be repeated in certain directions or modes but not in other. For example, information relating to a traffic condition up ahead on the motorway carriageway can be repeated along one carriageway of the motorway, but not on the other carriageway for which the information is not relevant. By this method, one vehicle might communicate with another, and in turn with others, and so on. Each vehicle thus becomes a repeater. For example, a DSRC beacon could be located at the roadside to give for example a traffic warning relating to the weather, temperature, traffic conditions or queue reports. The beacon would be generating a general message and each vehicle would be a repeater so that the message is sent to vehicles along the road. The beacon might also include means for identifying where the side of the road is.

Another use relates to logistics. A tagging system could be used, for example in a warehouse, where tags are located in respect of items in the warehouse. The tags are adapted to send messages according to IEEE 802.11A protocol to detecting equipment including a radar system. The items could be located by this method more efficiently especially if in a congested area. The tags of the items might, for example be adapted to transmit on request to the detecting equipment, information as to their identity or other characteristic. For example, where the items in the warehouse comprise perishable food, a tag may be associated with each batch of a type of food. Using the detection system, not only the location of the type of food, but information regarding each batch, for example its "best before" date can easily be determined. By this method, efficient stock management of perishable items can be achieved. The system could also be arranged so that the tagging system is not only used to locate items but, having located the item, to update the information that is related to the item. A messaging system such as 802.11 can be used to send sophisticated messages to the tags. This technique enables the required items to be easily located.

Another use is in a hospital environment for example in monitoring the blood pressure or ECG of a patient (as well as his position) and in relaying that to a base station.

There is particular benefit in the system described where there are time restraints regarding the acquisition of information. The methods described herein are generally applicable to circumstances which are time and position critical. In some examples, it is possible rapidly to switch between messaging mode (for example DSRC mode) and location-determination mode and the system can be arranged such that information can be sent between the transmitting element and receiving element in packets of information which can be interrupted if necessary.

The detection algorithm employed by the control unit 300 (or equivalent processing unit) will now be described, with reference to FIG. 29.

Detection Algorithm

Figure 29:
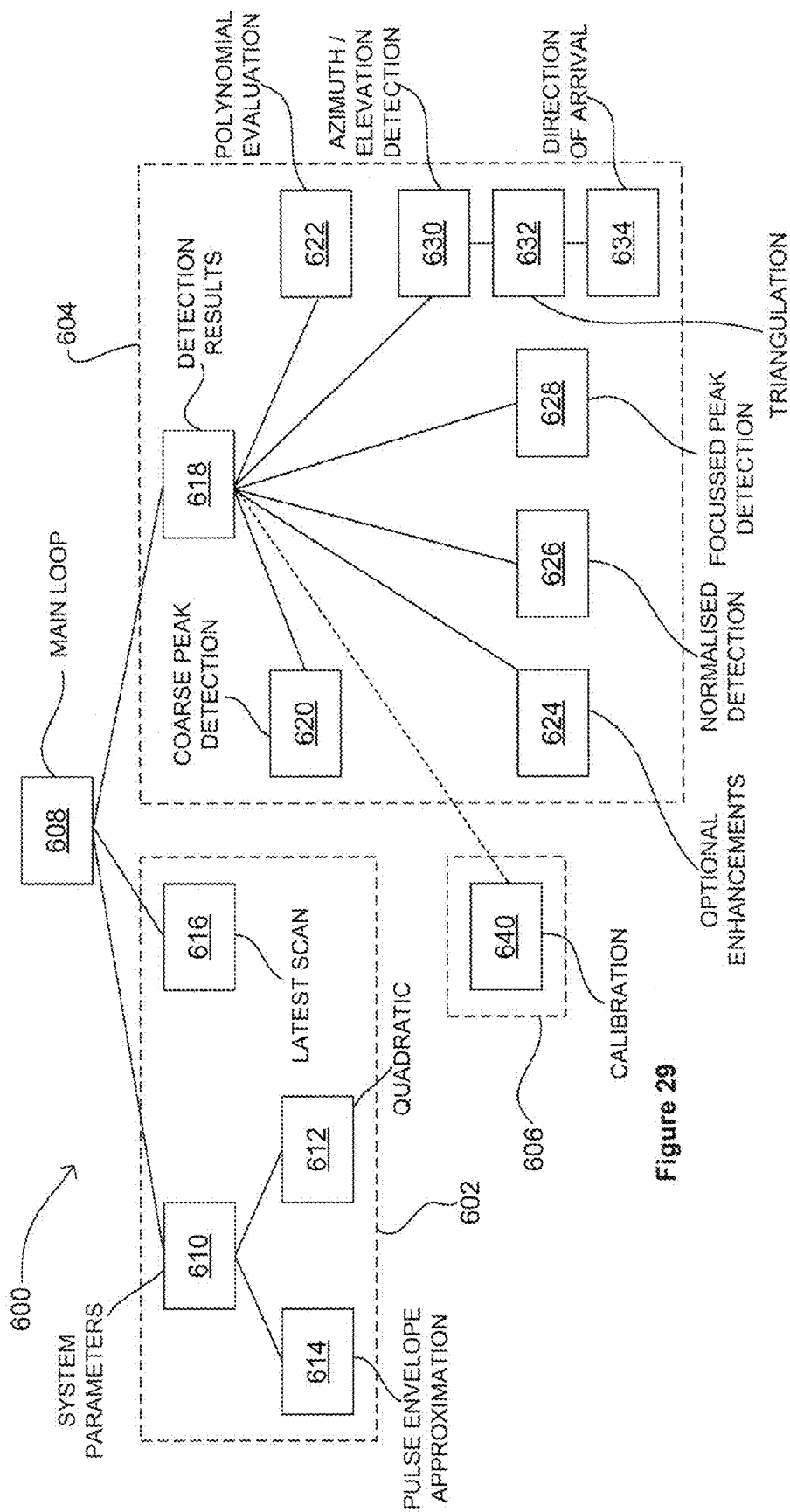
FIG. 29 is a schematic of a detection algorithm for use with a receiving unit in the positioning system.

FIG. 29 is a hierarchical list of the components making up a detection algorithm 600 for use with the positioning system described above. The detection algorithm comprises common/core functions 602, the detection algorithm proper 604, and calibration functions 606, all grouped under a 'main loop' function 608.

The elements of the detection algorithm will now be described.

The function 608 is the main loop of the program, of the initialise, do-forever variety.

The common/core functions 602 are as follows:

The function 610 takes one argument, specifying a specific radar type, and returns a record containing all fundamental system parameters for the radar.

The function 612 fits a quadratic to the data in y as a function of x. The normalisation of the data x and y into a ±1 square is carried out to ensure good numerical behaviour over a wide range of inputs.

The function 614 returns an approximation of the expected raw-data pulse envelope (typically about 10 samples). This approximate raw-data pulse envelope is the matched filter prototype used by the matched filter to detect the presence of the tag pulse.

The function 616 returns the latest scan from the radar. Each scan is (typically) an N row by 4 column matrix, with the scan starting at the top. The function includes a pre-processing step of detecting and removing any DC bias in the radar scan.

The function 616 is effectively the interface between the detection algorithm and the input/output interface 320 or the data acquisition system in the receiver-side processing unit 260 (not shown).

The components of the main detection algorithm are as follows:

The high-level function 618 takes as its input a raw radar sweep, as provided by the function 616, and returns an implementation-specific result containing the overall results of the detection algorithm. The function encapsulates the core detection algorithm functionality, and invokes many of the specific detection functions described below.

The function 620 takes as its input a raw radar sweep, as provided by the function 616. The function takes a raw radar sweep, and applies a computationally-efficient detection function by rectification and low-pass filtering of the data. The function finds the maximum peak in the left-hand side of the radar sweep, and then finds the maximum peak in the right-hand side of the radar sweep. This technique can pick out the two peaks of interest given knowledge of the maximum error (in parts per million, for example) between the transmitting and receiving clocks. During a single scan of 230 ns and a transmission pulse repetition interval of 83 ns, two or three peaks will be detected.

The function 622 evaluates a polynomial at x based on a supplied descriptor. As with the function 612, the (y, x) values are normalised into a ±1 square (y', x'). The normalisation is undertaken in order to achieve good numerical behaviour over a wide range of inputs, although this normalisation step is not essential. The function 622 can be used in curve-fitting operations.

The function 624 performs a number of generally optional enhancements to the radar data. Firstly, radar data is demodulated using a demodulation table of oscillator samples. Next, this basebanded data is matched-filtered against a pulse replica. The effect of the function is to improve the signal-to-noise ratio (SNR) of the signal and consequently to improve the accuracy of the subsequent detection algorithms.

The function 626 generates a normalised detection function from the filtered radar data by computing $I^2+Q^2$ for all sample pairs, where I and Q are in-phase and quadrature sample pairs. Essentially this provides a measure of the amplitude of the signal on which the subsequent stages can act.

The function 628 uses coarse peak estimates obtained from the function 620 (see above) to focus direct-path peak detection in sub-windows of interest in the normalised detection data. It identifies the likeliest direct-path return in the presence of multipath and long ringdowns. The function attempts to find the maximum in the subwindow, and works right to left in the subwindow, recording the last peak feature seen above threshold. Thus the most likely direct path candidate is selected.

The function 630 estimates the azimuth direction of arrival (Az) of a received signal, using array geometry and wavelength information. The elevation direction of arrival (Ez) is estimated similarly. The outputs are given in radians. This function essentially provides the angular position information for one receiving unit, which angular position information is then combined with other positional information in order to determine the displacement (that is, the location in two- or three-dimensions) of the relevant object.

Using methods described above, the function 632 triangulates the angular position information, preferably using knowledge of relative timings of signals received at the different receiving units and other pertinent information to refine the estimate.

In variants of the preferred embodiments, function 632 produces further outputs, for example providing an indication of the uncertainty of the estimation, or a measure of the velocity and/or expected future location of the object (if provided with further relevant positional information, such as the previous positional reading). In other variants, the location output (known herein as a displacement) can be in two-dimensions, or may be in polar coordinates.

The function 634 computes the feasible directions of arrivals for a channel pair, taking into account the separation of the channels, the wavelength of the signal, and the channel phase difference.

A total of 2N+1 feasible delays are returned, where arcsin (delay) gives the direction of arrival in radians. A delay of +1 represents a wavefront propagating along the axis of a receiver pair, receiver A and receiver B, from say, A to B. A delay of 0 represents a wavefront propagating at right angles to this axis and a delay of −1 represents a wavefront propagating along the axis from B to A. 'Delay-domain' processing is used to effect the angular computation.

The function 640 is a calibration function, taking as its input a record containing essentially the radar scan data in a deinterleaved complex number form for convenience, and returning a complex number representing an estimate of the frequency of the radar data sample set (in terms of inter-sample phase difference).

In summary, the embodiments described herein include an inverse angle detection/positioning system, tag encoding, a matched filter, an active/passive combination (preferably where radar is combined with a positioning system), searching in unlocked radar, synchronisation of receivers/calibration, data transmission in a UWB system by PRF modulation, a radio link tag, for example for communication purposes, and combined messaging and positioning.

A system is provided which can measure the angle of a UWB transmitter relative to a baseline where the baseline is the line drawn between two receiving elements. Although, a coded pulse train might be transmitted to achieve channelisation, an offset PRF frequency is preferably used.

Again, although a known delay might be specified between the receiving element and the impulse radio, this delay being uniquely different for each receiving element (in order to allow separation of the pulses in time from each receiving element, hence allowing the system to use the same detector circuitry), the system preferably has the same delay between receiving elements and the radio receiver. It does not need to separate the received pulses in time.

As another example, a calibration technique might be specified when measuring angle. In this case delay between the receiving element and the impulse radio is similar. Two impulse radios might be required, connected to a common clock and backplane to determine angle. However, preferably there is a similar delay between the receiving element and the detector. The same receiver unit is able to determine angle. Also the same receiving elements and detectors are placed on the same substrate where the receiving element separation is a small multiple of the UWB wavelength. Hence although a common clock may be required there is no requirement for a backplane when determining angle only.

Again, the system can be used as a radar, and the position of a passive object, that is the case where there is no UWB transmitter on the object, can be detected and/or tracked using only a single receiver unit.

It will be understood that the present invention has been described above purely by way of example, and modification of detail can be made within the scope of the invention.

Each feature disclosed in the description, and (where appropriate) the claims and drawings may be provided independently or in any appropriate combination.

We claim:

1. Apparatus for determining positional information relating to an object, incorporating a transmitter, the apparatus comprising:

a receiver configured to receive signals transmitted by the incorporated transmitter, said receiver comprising a plurality of receiving elements in a single housing or on a common substrate;

a detector for detecting a signal, received at each receiving element; and a processor operable to apply, for each receiving element, a process to the detected signal so as to obtain a respective value of a parameter representative of the time the detected signal was received at that receiving element, the processor being further operable to compare the values of the parameter thus obtained so as to obtain angular positional information relating to the object.

2. The apparatus according to claim 1, wherein the parameter comprises one of phase and time.

3. The apparatus according to claim 1, wherein the process applied by the processor comprises a process which is dependent upon a characteristic, or an expected characteristic, of the signal.

4. The apparatus according to claim 3, wherein the characteristic, or expected characteristic, comprises at least one of frequency, phase, bandwidth, and pulse width.

5. The apparatus according to claim 1, wherein the process applied by the processor comprises a process which is dependent upon the distance, or the expected distance, of the object from the receiver.

6. The apparatus according to claim 1, further comprising a selector adapted to select the process applied by the processor from a plurality of possible processes.

7. The apparatus according to claim 6, wherein:
the apparatus further comprises memory for storing a plurality of sets of process data; and
the selector is adapted to select one set of process data from the plurality of sets of process data, thereby to select the process applied by the processor.

8. The apparatus according to claim 1, further comprising means for changing the process applied by the processor in dependence upon one or both of at least one previously obtained value of the parameter and previously obtained positional information relating to the object.

9. The apparatus according to claim 1, wherein the process comprises a matched filter.

10. The apparatus according to claim 9, wherein the process comprises applying a filter to the detected signal at a plurality of different time offsets and selecting a time offset in dependence upon the outputs from the filter.

11. The apparatus according to claim 9, further comprising a matched filter generator for generating the matched filter in dependence upon the shape of the at least one time varying signal.

12. The apparatus according to claim 11, wherein the matched filter generator is adapted to fit the shape of the at least one time varying signal, or the envelope of the at least one time varying signal to a function.

13. The apparatus according to claim 9, comprising a matched filter generator for generating the matched filter in dependence upon the shape of the envelope of the at least one time varying signal.

14. The apparatus according to claim 11, wherein the matched filter generator is adapted to fit the shape of the at least one time varying signal, or the envelope of the at least one time varying signal, to a quadratic function.

15. The apparatus according to claim 1, wherein the operation of the processor comprises application of a matched filter to detect the interval between signals received by a plurality of the receiving elements, whereby to determine an angular position of the object.

16. The apparatus according to claim 1, wherein the receiver and detector are adapted to receive and detect a signal having a bandwidth greater than 5%, 10% or 20% of its frequency.

17. The apparatus according to claim 1, wherein each signal has a characteristic frequency of between 0.5 GHz and 24 GHz.

18. The apparatus according to claim 1, wherein the signals comprise pulsed signals.

19. The apparatus according to claim 18, wherein each pulsed signal comprises at least five cycles.

20. The apparatus according to claim 18, wherein each pulsed signal has a pulse length of greater than 2 ns.

21. The apparatus according to claim 18, wherein the signals comprise a pulse train having a characteristic repetition frequency of between 2 MHz and 20 MHz.

22. The apparatus according to claim 18, wherein each pulsed signal comprises at least 10, 20, 50, 100 or 500 cycles.

23. The apparatus according to claim 18, wherein each pulsed signal has a pulse length of greater than at least one of 5 ns, 10 ns, 20 ns, and 50 ns.

24. The apparatus according to claim 18, wherein the signals comprise a pulse train having a characteristic repetition frequency of between 5 MHz and 15 MHz.

25. The apparatus according to claim 18, wherein the signals comprise a pulse train having a characteristic repetition frequency of between 10.5 MHz and 13.5 MHz.

26. The apparatus according to claim 1, wherein the positional information comprises an angular position of the object.

27. The apparatus according to claim 1, further comprising a transmitter for transmitting a probe signal towards the object, and wherein the receiver is adapted to receive a reflection of the probe signal from the object.

28. The apparatus according to claim 27, wherein the transmitter is adapted to transmit a different signal to the signal transmitted by the transmitter associated with the object.

29. The apparatus according to claim 27, further comprising an encoder for encoding the probe signal, whereby it can be distinguished from the signal received from the object.

30. The apparatus according to claim 27, further comprising a circuit for determining the positional information of an object irradiated by the probe signal.

31. The apparatus according to claim 30, further comprising a comparator for comparing the positional information of the irradiated object to positional information relating to at least one known object, whereby anomalous objects can be identified.

32. The apparatus according to claim 31, further comprising an alert signal generator for generating an alert signal in dependence on the result of the comparison.

33. The apparatus according to claim 31, wherein the or each object includes or comprises an object incorporating a transmitter.

34. The apparatus according to claim 1, wherein the signals transmitted by the transmitter associated with the object comprise Ultra Wide Band (UWB) signals.

35. The apparatus according to claim 1, wherein each signal has a characteristic frequency of between 2 GHz and 12 GHz.

36. The apparatus according to claim 1, wherein each signal has a characteristic frequency of between 5.8 GHz and 7.2 GHz.

37. A method of determining positional information relating to an object incorporating a transmitter, the method comprising:
receiving signals transmitted by the incorporated transmitter at a receiver comprising a plurality of receiving elements in a single housing or on a common substrate;
detecting a signal, received at each receiving element; and
applying, for each receiving element, a process to the detected signal so as to obtain a respective value of a parameter representative of the time the signal was received at the receiving element, the applied process being further operable to compare values of the parameter thus obtained so as to obtain angular positional information relating to the object.

38. Apparatus for determining positional information relating to an object incorporating a transmitter, the apparatus comprising:
means for receiving signals transmitted by the incorporated transmitter said receiving means comprising a plurality of receiving elements in a single housing or on a common substrate;
detection means for detecting a signal, received at each receiving element; and
processing means operable to apply, for each receiving element, a process to the detected signal so as to obtain a respective value of a parameter representative of the time the signal was received at that receiving element, the processor being further operable to compare the values of the parameter thus obtained so as to obtain angular positional information relating to the object.

* * * * *